United States Patent [19]

Sasaki et al.

[11] Patent Number: 5,408,339
[45] Date of Patent: Apr. 18, 1995

[54] IMAGE AREA DISCRIMINATING DEVICE

[75] Inventors: Tomio Sasaki; Shinji Kobayashi; Masahito Obata, all of Tokyo, Japan

[73] Assignee: Ricoh Company, Ltd., Tokyo, Japan

[21] Appl. No.: 209,410

[22] Filed: Mar. 14, 1994

Related U.S. Application Data

[63] Continuation of Ser. No. 688,930, Apr. 23, 1991, Pat. No. 5,351,138.

[30] Foreign Application Priority Data

Apr. 24, 1990 [JP] Japan .................. 2-106492
Jun. 11, 1990 [JP] Japan .................. 2-149807

[51] Int. Cl.⁶ .................. H04N 1/40; G06K 9/68; G06K 9/38
[52] U.S. Cl. .................. 358/462; 382/34; 382/50; 358/445; 358/457; 358/465
[58] Field of Search .................. 358/448, 455, 456, 457, 358/458, 462, 465, 466, 429, 447, 445; 382/28, 63, 64, 27, 50, 34

[56] References Cited

U.S. PATENT DOCUMENTS

| | | | |
|---|---|---|---|
| 4,266,249 | 5/1981 | Chai et al. | 358/429 |
| 4,403,257 | 9/1983 | Hsieh | 358/460 |
| 4,495,522 | 1/1985 | Matsunawa et al. | 358/465 |
| 4,547,811 | 10/1985 | Ochi et al. | 358/455 |
| 4,570,186 | 2/1986 | Kurata | 358/455 |
| 4,577,235 | 3/1986 | Kannapell et al. | 358/462 |
| 4,607,828 | 8/1986 | Bodin | 267/140.11 X |
| 4,686,579 | 8/1987 | Sakamoto | 358/457 |
| 4,701,808 | 10/1987 | Nagashima | 358/451 |
| 4,703,513 | 10/1987 | Gennery | 382/49 |
| 4,729,035 | 3/1988 | Tanioka | 358/426 |
| 4,742,399 | 5/1988 | Kitamura | 358/261.1 |
| 4,827,433 | 5/1989 | Kamon | 395/139 |
| 4,828,234 | 5/1989 | Hoying | 248/550 X |
| 4,901,363 | 2/1990 | Toyokawa | 382/56 |
| 4,984,283 | 1/1991 | Sakano . | |
| 5,018,024 | 5/1991 | Tanioka | 358/457 |
| 5,102,105 | 4/1992 | Hamaekers | 267/219 X |
| 5,145,156 | 9/1992 | Muramatsu | 180/300 X |
| 5,150,428 | 9/1992 | Leone et al. | 382/50 |
| 5,170,998 | 12/1992 | Muramatsu | 267/219 X |
| 5,180,148 | 1/1993 | Muramatsu | 248/562 X |
| 5,217,211 | 6/1993 | Ide | 248/562 X |
| 5,242,158 | 9/1993 | Robic | 267/140.14 |
| 5,246,212 | 9/1993 | Funashashi | 248/562 X |
| 5,314,173 | 5/1994 | Ide | 267/140.13 X |

FOREIGN PATENT DOCUMENTS

| | | |
|---|---|---|
| 0126782 | 5/1983 | European Pat. Off. . |
| 0158155 | 10/1985 | European Pat. Off. . |
| 0291000 | 11/1988 | European Pat. Off. . |
| 305246 | 3/1989 | European Pat. Off. ........ 267/140.11 |
| 0349234 | 1/1990 | European Pat. Off. . |
| 0362595 | 4/1990 | European Pat. Off. . |
| 3433493 | 7/1988 | Germany . |
| 58-173975 | 10/1983 | Japan . |
| 60-128777 | 7/1995 | Japan . |
| 2195859 | 4/1988 | United Kingdom . |

OTHER PUBLICATIONS

Ibaraki, et al., "New Image Processing Method for Halftone Pictures", *Electronics and Communciations in Japan*, Part 1, vol. 71, No. 7, 1988, pp. 87-99.

*Primary Examiner*—Edward L. Coles, Sr.
*Assistant Examiner*—Kimberly A. Williams
*Attorney, Agent, or Firm*—Popham Haik Schnobrick & Kaufman

[57] ABSTRACT

An image area dicriminating device for a digital copier, facsimile machine, scanner or similar imaging equipment. The device determines whether areas constituting an input image each has undergone dot processing or not automatically.

4 Claims, 52 Drawing Sheets

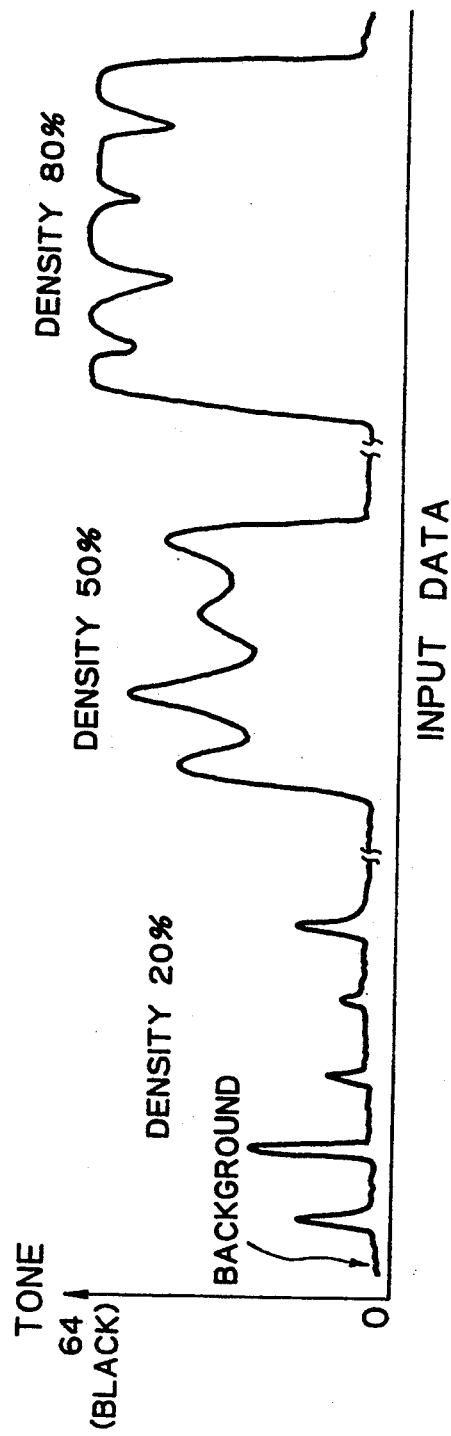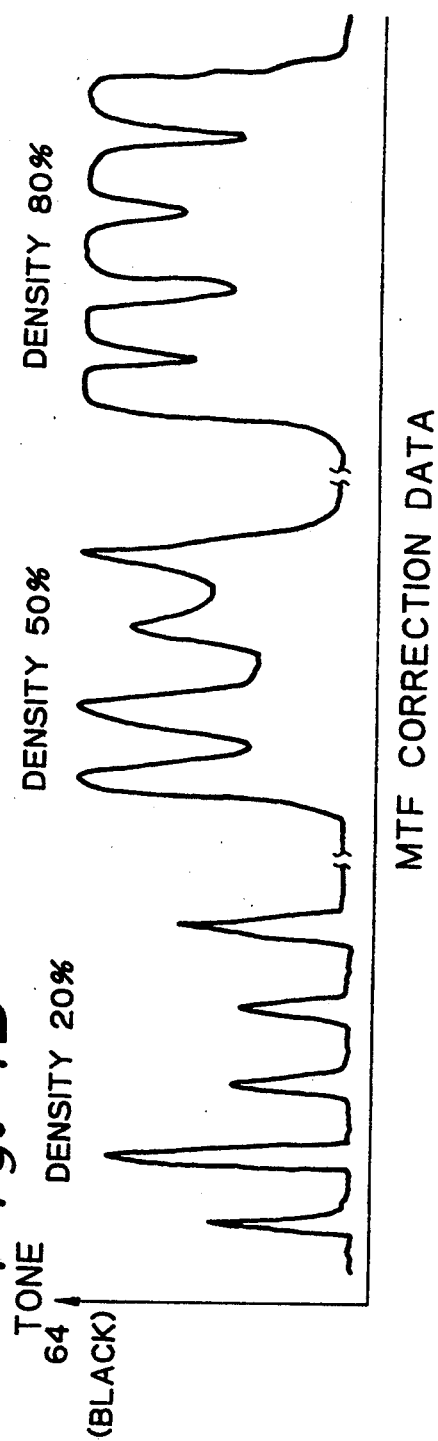

Fig. 14
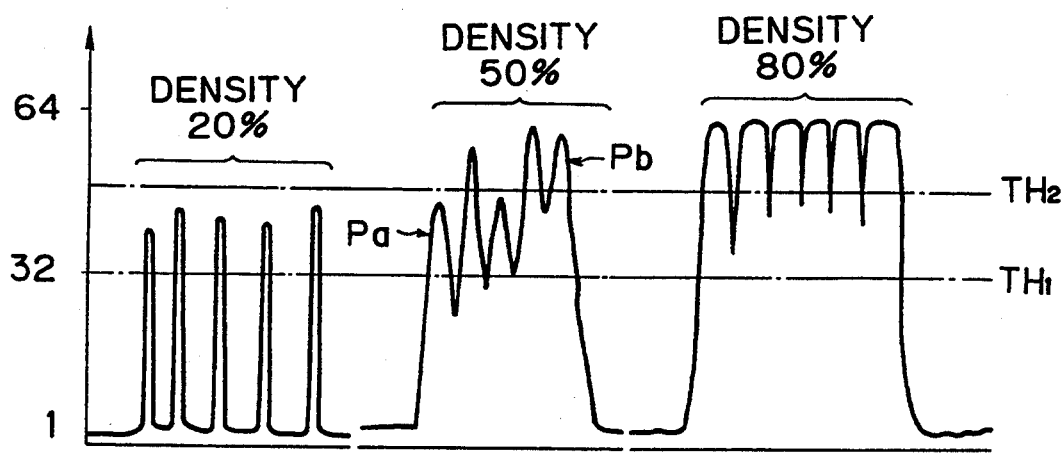
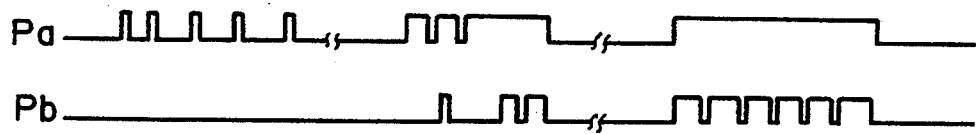
Fig. 15
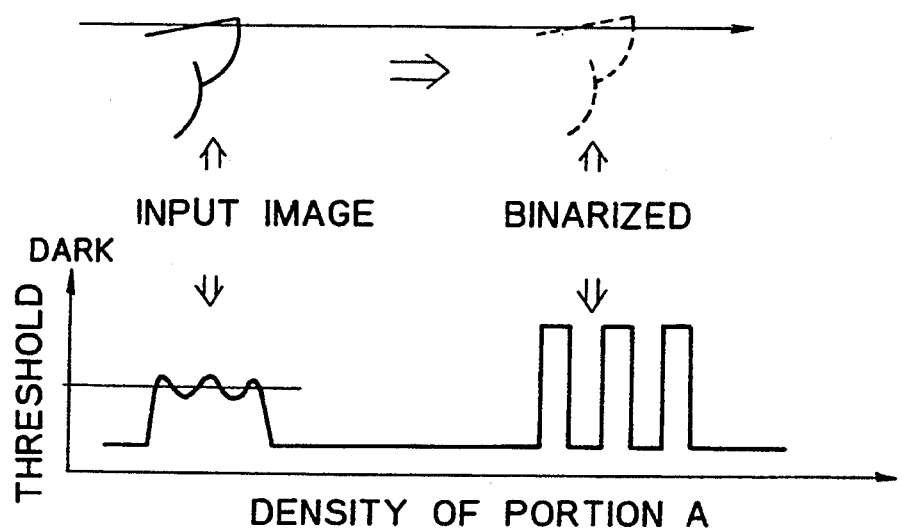

Fig. 21

MTF_L 100LINE 50% (27.110) AMITEN_5_50_MTF. IMAGE

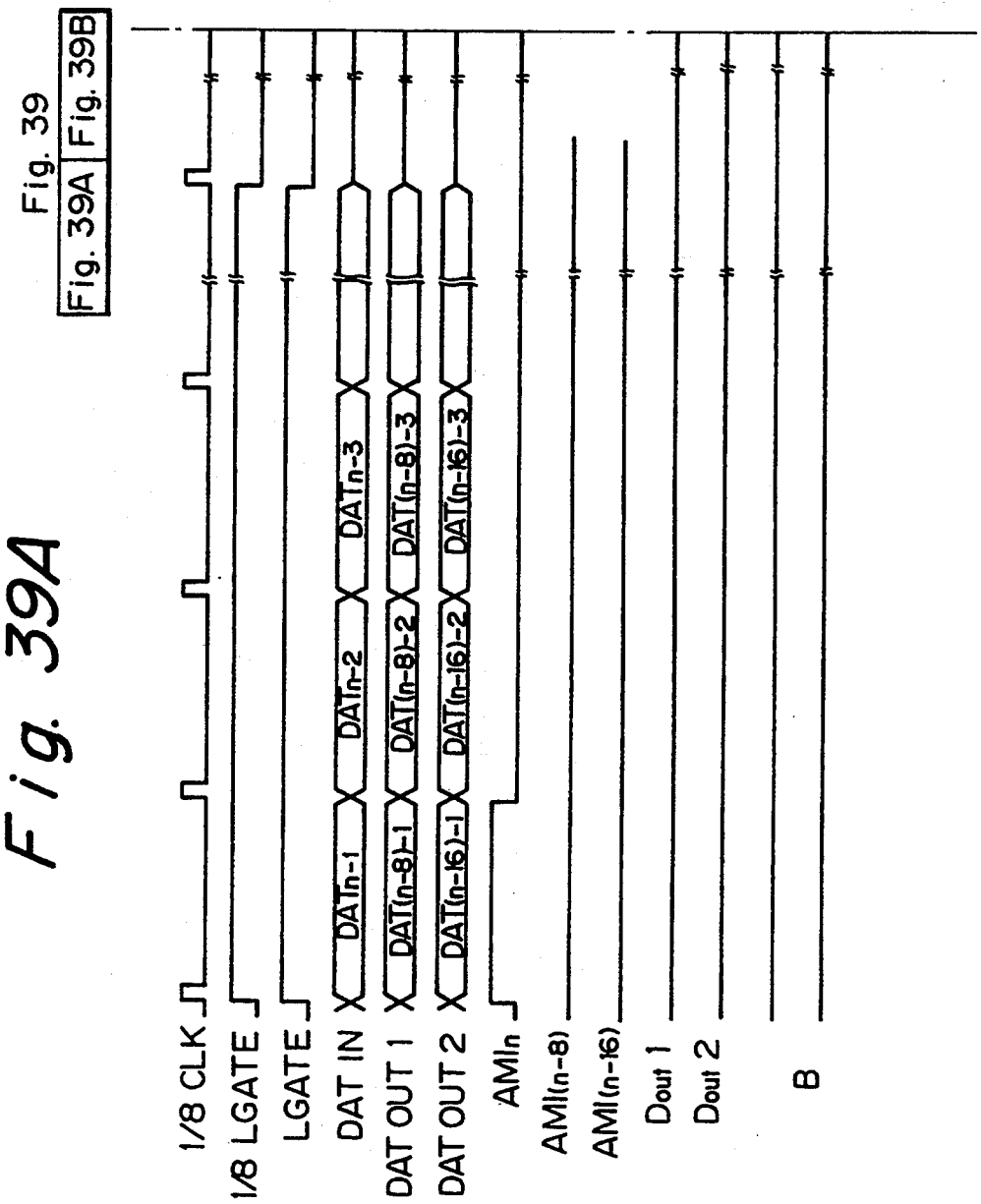

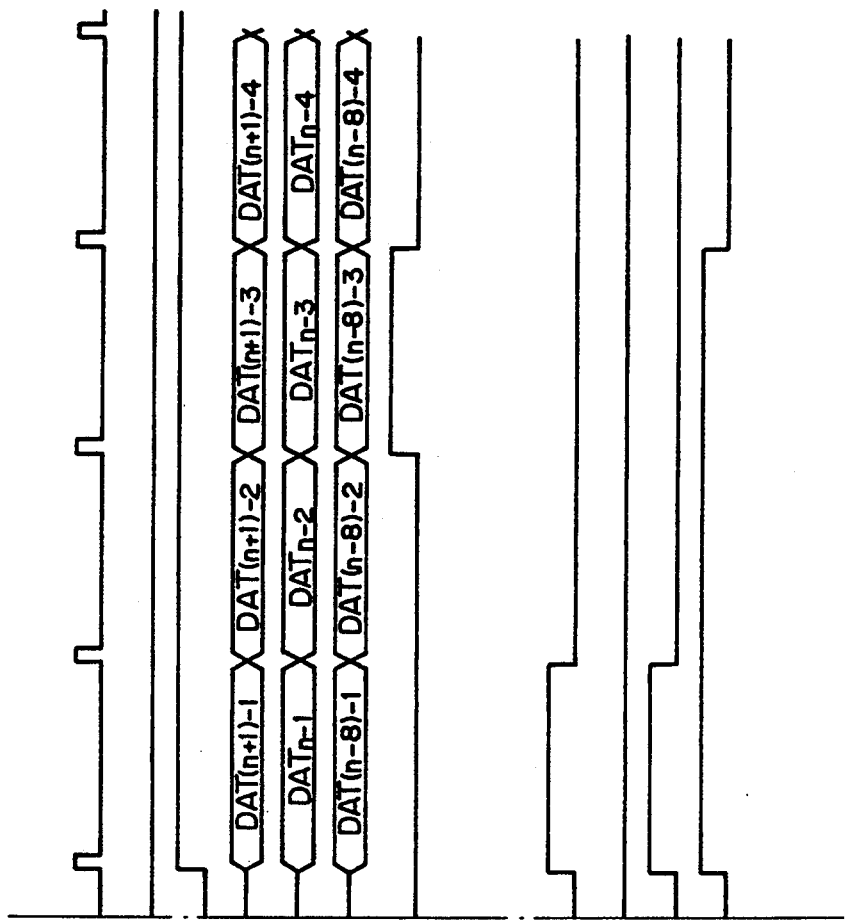

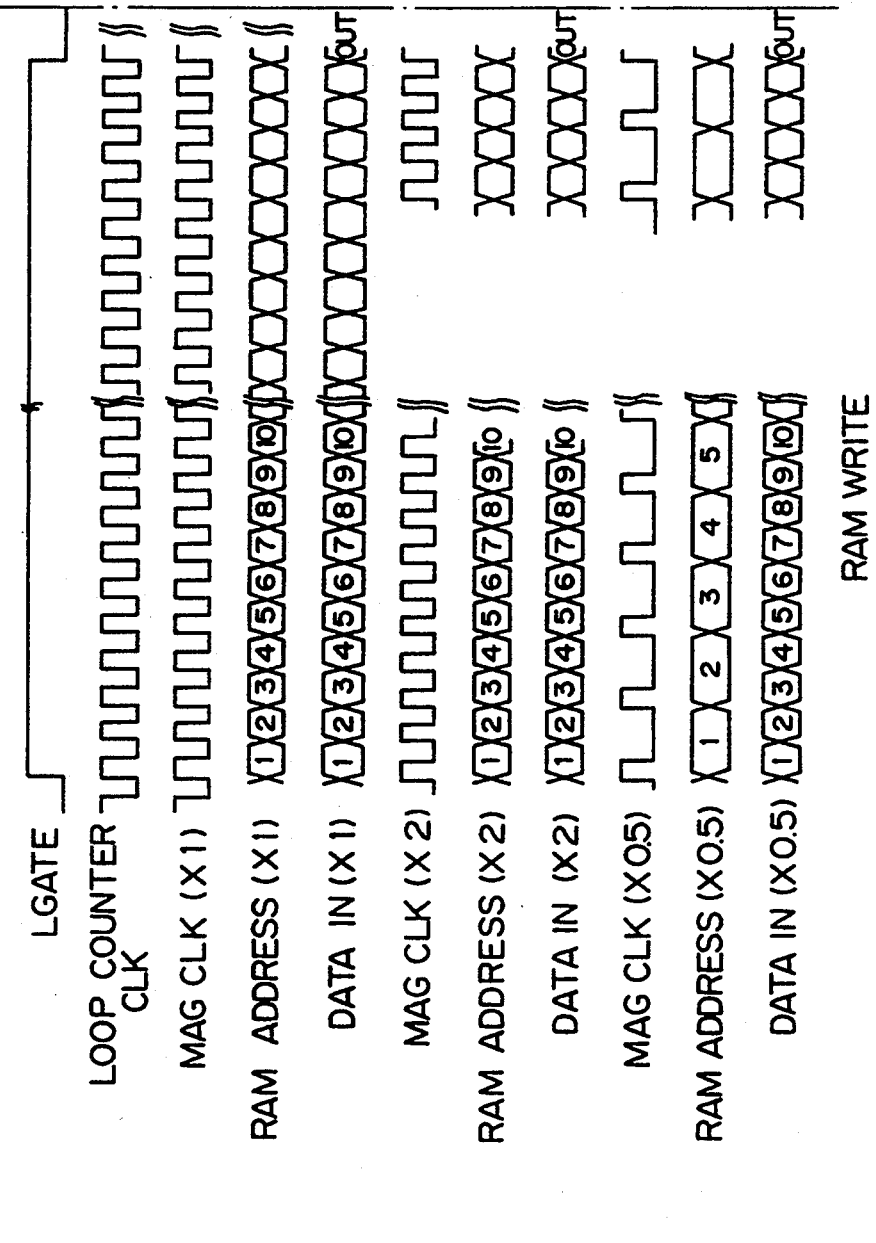

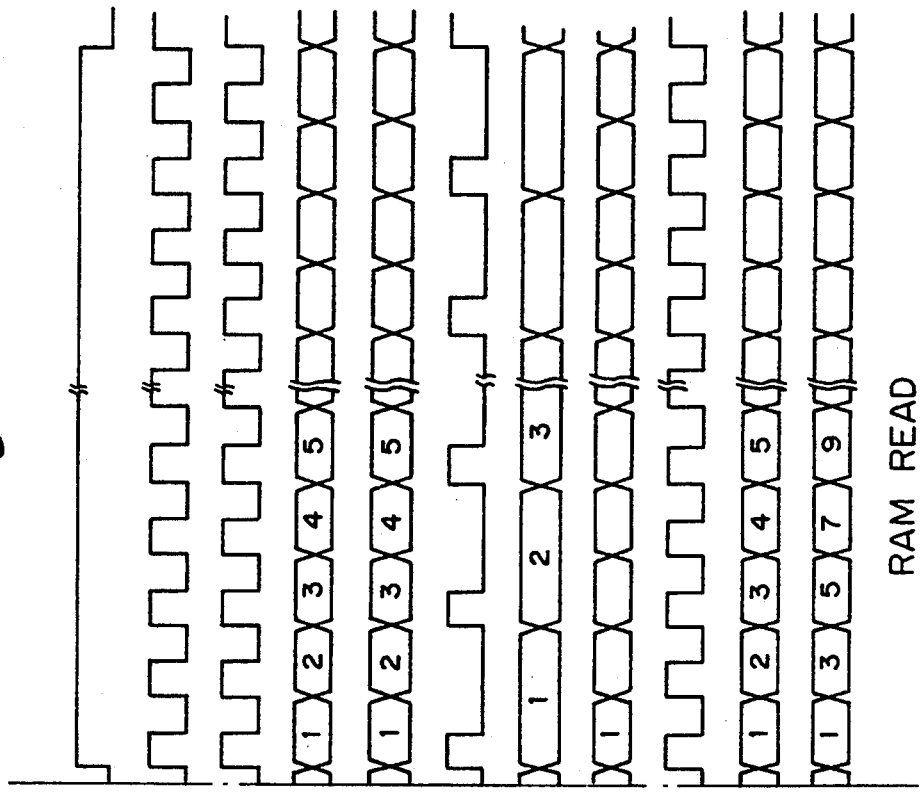

Fig. 44A

|  | Dc3 | Dc4 |  |
|---|---|---|---|
| Dc8 |  |  | Dc11 |
| Dc14 | (Dc15) |  | Dc17 |
|  | Dc21 | Dc22 |  |

|  | Dc9 | Dc10 |  |
|---|---|---|---|
| Dc14 | (Dc15) |  | Dc17 |
|  | Dc21 | Dc22 |  |

|  | Dc3 | Dc4 |  |
|---|---|---|---|
| Dc8 |  |  | Dc11 |
| Dc14 | Dc15 |  | Dc17 |
| Dc20 |  |  | Dc23 |
| Dc26 |  |  | Dc29 |
|  | Dc33 | Dc34 |  |

X 2

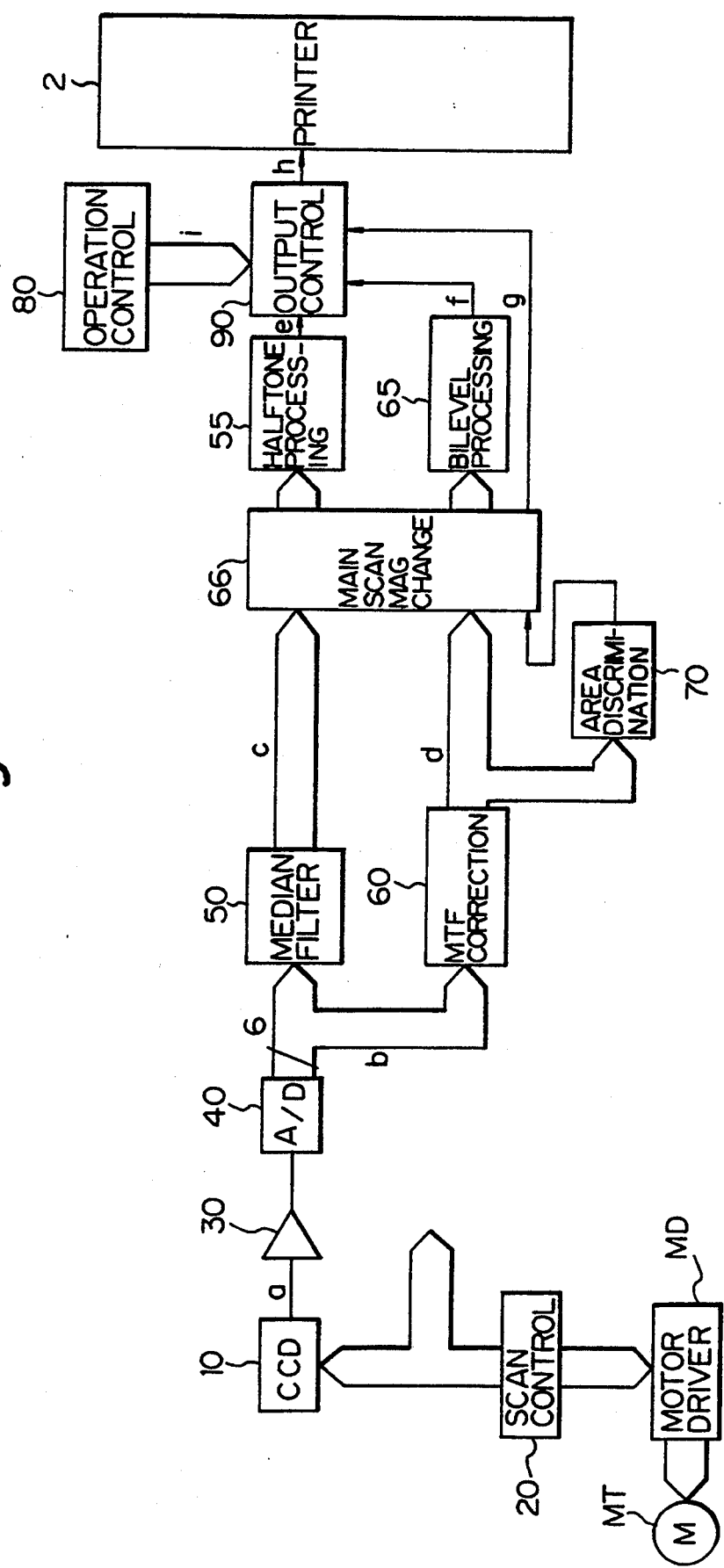

X 1

MOIRE

X 0.5

SUBSCAN DIRECTION

X 0.5

MAIN & SUBSCAN
DIRECTIONS

X 0.5

SUBSCAN DIRECTION
WITH MOIRE

X 0.5

MAIN & SUBSCAN
DIRECTIONS WITH MOIRE

X2
SUBSCAN DIRECTION

X2
MAIN & SUBSCAN DIRECTIONS

X2
SUBSCAN DIRECTION
WITH MOIRE

X2
MAIN & SUBSCAN
DIRECTIONS WITH MOIRE

IMAGE AREA DISCRIMINATING DEVICE

This application is a continuation of U.S. patent application Ser. No. 07/688,930, filed Apr. 23, 1991, now U.S. Pat. No. 5,351,138 issued, Sep. 27, 1994.

BACKGROUND OF THE INVENTION

The present invention relates to an image area discriminating device for a digital copier, facsimile device, scanner or similar imaging equipment and, more particularly, to an image area discriminating device capable of automatically determining whether or not areas constituting an input image each has undergone dot processing.

A digital copier, for example, reads a document image pixel by pixel by using a CCD (Charge Coupled Device) image sensor or line sensor. An analog electric signal appearing on the output of the image CCD image sensor is converted into a digital signal and then subjected to various kinds of processing. The processed signal is fed to a recording device to print out the document image on a recording medium. It is a common practice with such a digital copier to record the processed signal in two levels, i.e., record/non-record or in multiple levels since the recording device is unable to readily change the density level pixel by pixel. However, the copier has to reproduce even halftone images which are often carried on photographs and other similar documents. Conventional implementations for rendering halftone by use of the bilevel or multilevel recording device include a dither method, density pattern method, submatrix method, and error scattering method.

So long as the density of an image changes slowly as is the case with a photograph, conventional halftone processing successfully reproduces the image relatively attractively. However, when a character or similar image whose density changes in definite two levels is reproduced, the reproduction suffers from various defects such as illigibly blurred contours and contaminated background. For this reason, characters or similar document images should be subjected to simple bilevel or multilevel processing rather than halftone processing. If the copier is provided with an extra switch for entering the presence/absence of halftone on a document, the operator can select an adequate copy mode matching the document by operating the switch. In practice, however, many documents, typically pamphlets, carry both of halftone images and bilevel images such as characters. Then, selecting the bilevel or multilevel mode would lower quality of resultant photographs, and selecting the halftone mode would lower the quality of resultant characters.

Another and serious problem with this type of digital copier is that when the change in the density of a document has periodicity, the period or pitch of the density change and the pitch at which the cells of a CCD line sensor or similar image sensor are arranged, i.e., sampling period interfere with each other to cause moire to appear on a recorded image. For example, an image printed on a document in the form of dots has periodicity concerning the density change, so that the period of the density change interferes with the sampling frequency of the line sensor to bring about the moire problem. Specifically, assuming that the resolution of the line sensor is 400 dots per inch (dpi), moire is apt to appear in an image signal when dots are printed on a document in a density close to the resolution, i.e., 133 lines (about 10.5 pixels per millimeter) to 200 lines (about 16 pixels per millimeter). While densities outside the above-mentioned range also cause moire to occur, moire is noticeable in such a particular range and causes the signal to change over a broad range. Dot printing itself is a kind of quasi-halftone representation and changes the density in two levels, i.e., ONE and ZERO (record and non-record) concerning each pixel. To render halftone, dot printing changes the average density of the entire assembly of pixels in multiple levels by changing the pitch or the size of dots. Therefore, apart from the moire problem, a dot image will be desirably reproduced if the signal is subjected to bilevel processing. In practice, however, a document on which dots are prined in a particular density suffers from moire when reproduced, as stated above.

On the other hand, when an image signal representative of a document is transformed to a bilevel or multilevel signal by halftone processing, moire does not appear or appears little on a reproduction since the halftone processing includes a step of averaging the densities of a plurality of pixels and a step of changing the threshold level. In this case, although the densities of a reproduction are rendered in quasi-halftone by dots, the dots on the reproduction are generated by halftone processing particular to a copier and, therefore, not the faithful replica of the dots on the document. It follows that when the image to be reproduced is an assembly of printed dots or an image reproduced by dot processing by a digital copier, a copy mode which effects halftone processing is preferable despite that such an image is bilevel concerning pixels.

It is desirable to process character portions by the simple bilevel or multilevel scheme and to process dot portions by the dither scheme or similar halftone processing scheme, as described previously. For this purpose, a document may be divided on an area basis. Specifically, if dot areas are detected and subjected to halftone processing while the other areas are subjected to simple bilevel processing, characters and photographs which are rendered by dots will be reproduced attractively, as disclosed in Japanese Patent Laid-Open Publication No. 279665/1988, for example. The method disclosed in this Laid-Open Publication is such that a bidimensional pattern of input image data is compared with a predetermined pattern to detect record dots and non-record dots and, based on the result of detection, whether or not the input image data is representative of a dot pattern is determined Now, in an image undergone dot processing, record dots such as black pixels and non-record dots such as white pixels are arranged alternately at a predetermined pitch and a predetermined distance. Assume that a record pixel located at a given position and non-record pixels surrounding it are arranged in a particular pattern, or that a non-record pixel located at a given position and record pixels surrounding it are arranged in a particular pattern. If such a condition appears repetitively, the pixel of interest surrounded by the non-record pixels or the record pixels can be regarded as a pixel undergone dot processing. Therefore, whether or not an input image is a dot pattern can be determined if image data lying in a bidimensional area constitued by a pixel of interest, which is sequentially shifted, and surrounding pixels is compared with a predetermined record dot detection pattern and a non-record dot detection pattern. However, when an image undergone dot processing is actually read by an image scanner, the image pattern of the resultant signal noticeably changes to obstruct accurate identification of dots. This stems from the fact that since dot printing renders density in terms of the area of record dots in a predetemined small area, a change in the density of an image translates into a noticeable change in the shape of the dots. Especially, when the dot density is around 50% or so, nearby record dots such as black pixels or non-record dots such as white pixels are sometimes connected together. Then, neither the record dots nor the non-record dots can be detected.

To reduce the discrimination error particular to the dot density of 50%, the thresold level for binarizing image data into the record and non-record pixel levels may be adjusted. This, however, aggravates discrimination error when the dot density is higher or lower than 50%. To eliminate this dilemmatic situation, use may be made of at least two different threshold values, and two independent circuits for detecting record dots and non-record dots, respectively. Then, a dot pattern is identified on the basis of the results of detection of record dots and non-record dots with reference made to the image data derived from the two differnt threshold values.

Generally, when a dot image is read by a scanner, the resultant signal appears as shown in FIG. 14. As FIG. 14 indicates, the signal changes in the height of peaks and the depth of troughs as well as in duty in association with the density. Paying attention to the signal with a density level of 50%, for example, the height of a peak and the depth of a trough changes with the position of the image. When the signal with the density of 50% is binarized at the threshold level $TH_1$, the leading portion Pa has a peak higher than the level $TH_1$ an a trough lower than the level $TH_1$ and, therefore, the peak and the trough appear as, respectively, a record pixel and a non-record pixel in the resultant bilevel signal. However, in the trailing portion Pb, the peak and the trough both are higher than the threshold level $TH_1$ with the result that a non-record pixel does not appear in the resultant bilevel signal. More specifically, such a signal is binarized at the threshold level $TH_1$, a dot (record dot) is detected in the leading portion Pa out of a record pixel and non-record pixel pattern, but no dots can be detected in the trailing portion Pb. Assume that the signal with the density of 50% is binarized at the other threshold level $TH_2$. Then, both of the peak and trough in the leading portion Pa are lower than the level $TH_2$, so that a record dot does not appear in the bilevel signal; in the trailing portion, since the peak is higher than the level $TH_2$ and the trough is lower than the level $TH_1$, the peak and the trough appear as, respectively a record pixel and a non-record pixel in the bilevel signal. In this manner, the threshold $TH_2$ allows a dot (non-record dot) to be detected in the trailing portion Pb out of a record pixel and non-record pixel pattern while failing to do so when it comes to the leading portion Pa.

It follows that even with a dot image whose density is 50% either a record dot or non-record dot can be detected if the threshold values $TH_1$ and $TH_2$ are used to detect a dot which is a record dot and to detect a dot which is a non-record dot, respectively. When the density is low such as 20%, record dots are detected by use of the threshold value $TH_1$ while, when the density is high such as 80%, non-record dots are detected by use of the threshold value $TH_2$.

However, the conventional approach described above has some problems left unsolved, as follows. When record dots and non-record dots in a dot area do not appear as dots or appear in a defective pattern due to moire, they are not regarded as dots. The conventional approach is extremely susceptible to noise and is apt to regard even noise due to a solitary point of low density as a dot, resulting in frequent detection error. When a dot document having the same pitch and size in the main and subscanning directions is read, the density amplitude (MTF) usually differs from the main scanning direction to the subscanning direction, although the difference depends on the reading method and characteristic of the system. Further, it is likely that an area containing, for example, a line extending in the 45° direction is misidentified.

When the magnification is changed, the configuration of a dot pattern is changed. Then, prepared patterns would fail to follow such a change in the configuration of a dot pattern and would thereby aggravate the misidentification of dots in the case of magnifications other than ×1. Although this problem may be eliminated if the number of dot detection patterns is increased, this is not practicable without increasing the number of circuit components and elements.

SUMMARY OF THE INVENTION

It is therefore an object of the present invention to provide an image area discriminating device which enhances accurate detection of dot areas and reduces misidentification of areas other than dot areas.

It is another object of the present invention to provide a generally improved image area discriminating device.

A device for discriminating an image area of the present invention comprises an MTF correcting sectin for executing MTF correction with input image data, and a record dot and non-record dot detecting section for receiving an MTF corrected image signal outputted by the MTF correcting section as input image data, comparing a bidimensional pattern of the input image data with a predetermined detection pattern for detecting a record dot and a non-record dot, and then producing a result of comparison.

BRIEF DESCRIPTION OF THE DRAWINGS

The above and other objects, features and advantages of the present invention will become more apparent from the following detailed description taken with the accompanying drawings in which:

FIGS. 4A and 4B plot respectively the waveform of input data and the waveform of corrected data;

FIGS. 13A and 13E show patterns usable for pattern matching;

FIG. 14 plots the waveform of a dot image read by an image scanner;

FIG. 15 is indicative of a conventional pattern matching system;

FIG. 21 shows image data produced when a 100-line, 50% density dot image is read at a rate of 400 dots per inch;

FIG. 41 is a timing chart showing specific magnification change processing;

FIGS. 44A through 44C each shows a specific dot detection pattern associated with a given magnification;

FIG. 45 is a schematic block diagram showing another specific construction of the scanner;

DESCRIPTION OF THE PREFERRED EMBODIMENTS

Figure 2:
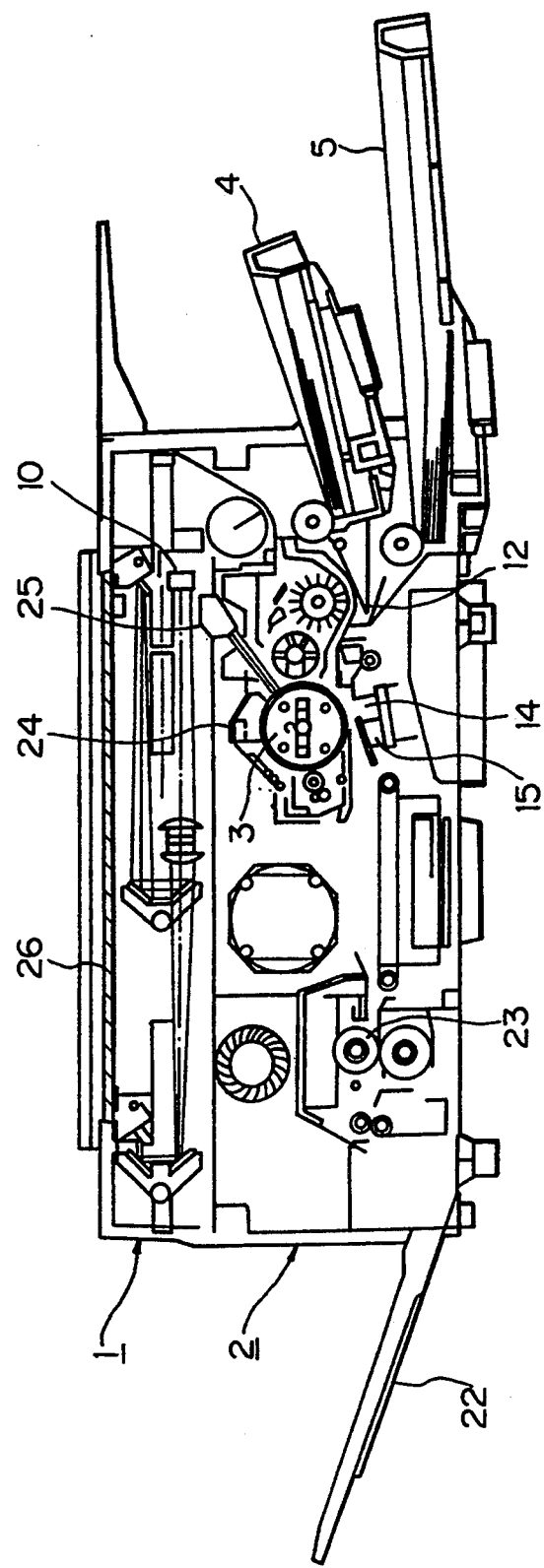
FIG. 2 is a view showing the general construction of a digital copier.

Referring to FIG. 2 of the drawings, a digital copier with which the present invention is practicable is shown and is generally made up of a scanner 1 and a printer 2. The scanner reads a document laid on a glass platen 26 by scanning it. Vertical scanning is implemented mechanically, i.e., a carriage included in the scanner 1 is driven by an electric motor MT in the right-and-left direction as viewed in FIG. 2. A reflection from the document is routed through mirrors and a lens to reach a CCD (Charge Coupled Device) line sensor 10 which is fixed in place. The CCD line sensor 10 has an array of 5,000 cells arranged in a direction perpendicular to the sheet surface of FIG. 2. In this example, the resolution is 16 pixels per millimeter of a document image when the magnification is ×1. Main scanning is effected electrically by a CCD shift register built in the CCD line sensor 10. The main scanning direction is parallel to the array of cells, i.e., perpendicular to the sheet surface of FIG. 2. The output signal of the CCD line sensor 10 is subjected to various kinds of processing and then fed to the printer. In response, the printer 2 produces a recording by two levels.

The printer 2 has a laser writing unit 25, a photoconductive drum 3, a main charger 24, a developing unit 12, an image transfer charger, 14, a paper separation charger 15, and a fixing unit 23, etc. The printer 2 is identical in construction with a conventional laser printer and, therefore, only the operation thereof will be outlined hereinafter.

The photoconductive drum 3 is rotatable clockwise as viewed in FIG. 2. The main charger 24 uniformly charges the surface of the drum 3 to a high potential. A laser beam having been modulated by a bilevel signal representative of an image is incident to the charged surface of the drum 3. The laser beam is steered mechanically to repetitively scan the drum 3 in the main scanning direction. The charged surface of the drum 3 changes the potential thereof when irradiated by the laser beam, i.e., a potential distribution corresponding to the image to be recorded is set up on the drum 3. This potential distribution constitutes an electrostatic latent image. As the portion of the drum 3 where the latent image is present reaches the developing unit 12, a toner is deposited on that portion on the basis of the potential distribution. As a result, the latent image is developed to become a toner image. The toner image is superposed on a paper sheet which is fed fed from a paper cassette 4 or 5 to the drum 3. The transfer charger 14 transfers the toner image to the paper sheet. The paper sheet carrying the toner image thereon is driven out to a tray 22 via a fixing unit 23.

Figure 3A:
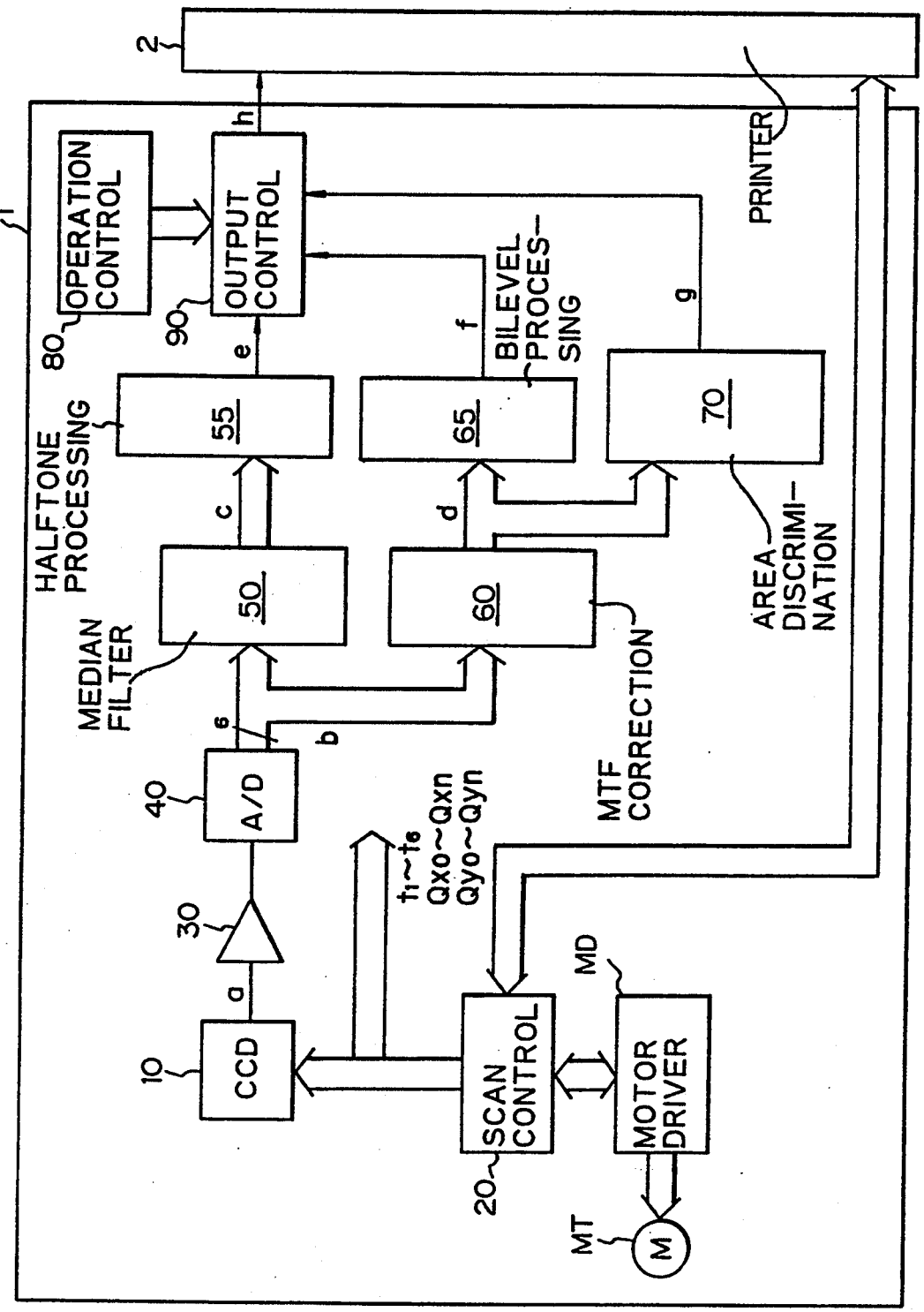
FIGS. 3A and 3B are schematic block diagrams showing a scanner.
Figure 3B:
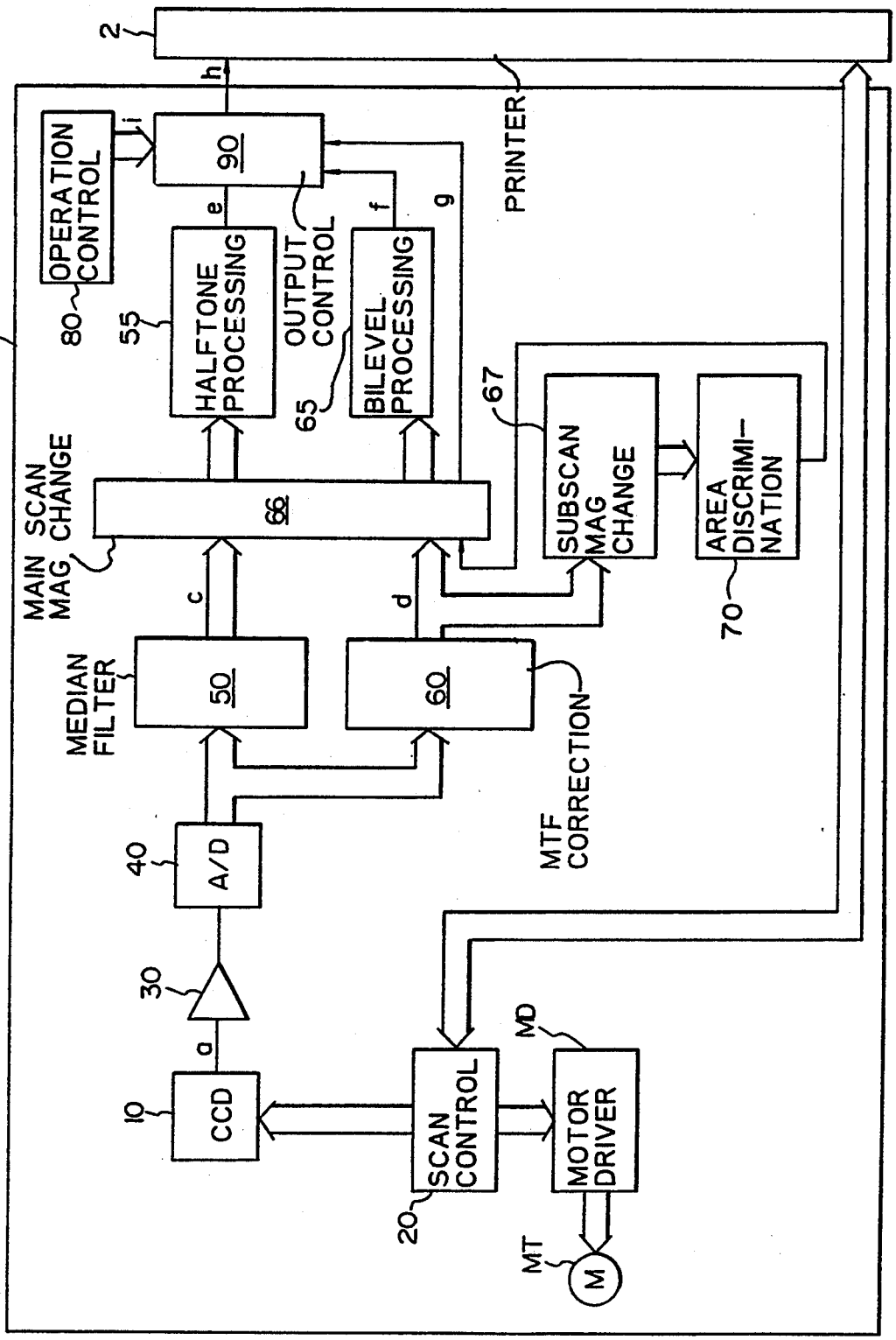

FIGS. 3A and 3B each shows particular electric circuitry which may be built in the digital copier of FIG. 2. In FIG. 3A, the scanner 1 has the CCD line sensor 10, a scanning control section 20, an amplifier 30, an analog-to-digital (AD) converter 40, a median filter 50, a halftone processing section 55, an MTF (Modulation Transfer Function) correcting section 60, a bilevel processing section 65, an area discriminating section 70, an operation control section 80, an output control section 90, the motor MT, a motor driver MD, etc. The circuitry shown in FIG. 3B has a main-scan magnification changing section 66 and a subscan magnification changing section 67 in addition the various components of the circuit of FIG. 3A.

The scanning control 20 interchanges signals with the printer 2, controls main scanning and subscanning, and generates various timing signals in synchronism with scanning timings. The printer 2 sends various status signals, print start signal, magnification signal and other various signals to the scanning control 20. The scanning control 20 in turn sends signals such as scanning synchronizing (sync) signals and status signals to the printer 2. When the scanning control 20 outputs a subscanning sync signal, signals stored in the individual cells of the CCD line sensor 10 are transferred to the bits of the CCD shift register at the same time. Thereafter, the signals are shifted in the CCD shift register in synchronism with a main scanning pulse signal. As a result, the image signals held in the register appear one pixel at a time on the output terminal as a serial signal (a, FIG. 3A). It is to be noted that signals produced from the image signals are parenthesized for distinction hereinafter.

The amplifier 30 amplifies the image signal (a) while removing noise therefrom. The AD converter 40 converts the analog video signal to a 6-bit digital signal. The digital signal produce by the AD converter 40 is subjected to various kinds of conventional processing such as shading correction, background removal and black-and-white conversion, although not shown in the figure. The so processed digital signal is outputted as a 6-bit, i.e., 64-tone digital image signal (b). The digital image signal (b) is applied to the median filter 50 and MTF correction 60. The signal (c) coming out of the median filter 50 is fed to the halftone processing section 55. The halftone processing section 55 transforms the 6-bit digital image signal (c) to a binary signal (e) including halftone data by a submatrix method.

A circuit for executing halftone processing by the submatrix method is conventional, and the construction and operation of such a circuit will not be described for simplicity. If desired, the submatrix method may be replaced with a dither method or density pattern method which are also conventional in the imaging art.

The median filter 50 is essential since it smooths image data in an n×m matrix and thereby reduces moire particular to a dot image. The median filter 50 is also implemented by a conventional circuit and will not be described specifically.

The digial image signal (d) processed by the MTF correction 60 is applied to the bilevel processing 65 and area discrimination 70 (via the magnification changing sections 66 and 67 in FIG. 3B). The bilevel processing 65 compares the input video signal with a predetermined threshold level to thereby output a bilevel signal (f). This processing is simple bilevel processing so that the signal (f) does not include data relating to medium densities. Such processing executed by the halftone processing 55 and bilevel processing 65 is derived from the assumption that the printer output has only two levels, i.e., black and white. If the printer has multiple output levels such as three levels or four levels, the halftone processing 55 will produce multi-level outputs by a multi-level dither method while the bilevel processing 65 will produce multilevel outputs by simple multilevel processing. Since scheme such as a multilevel dither method and simple multilevel processing are not the essential part of the present invention and are conventional, they will not be described herein.

The area discrimination 70 determines whether or not a document image includes dot data, as will be described in detail. This section 70 delives a bilevel signal (g) representative of the result of discrimination to the output control 90.

Figure 40:
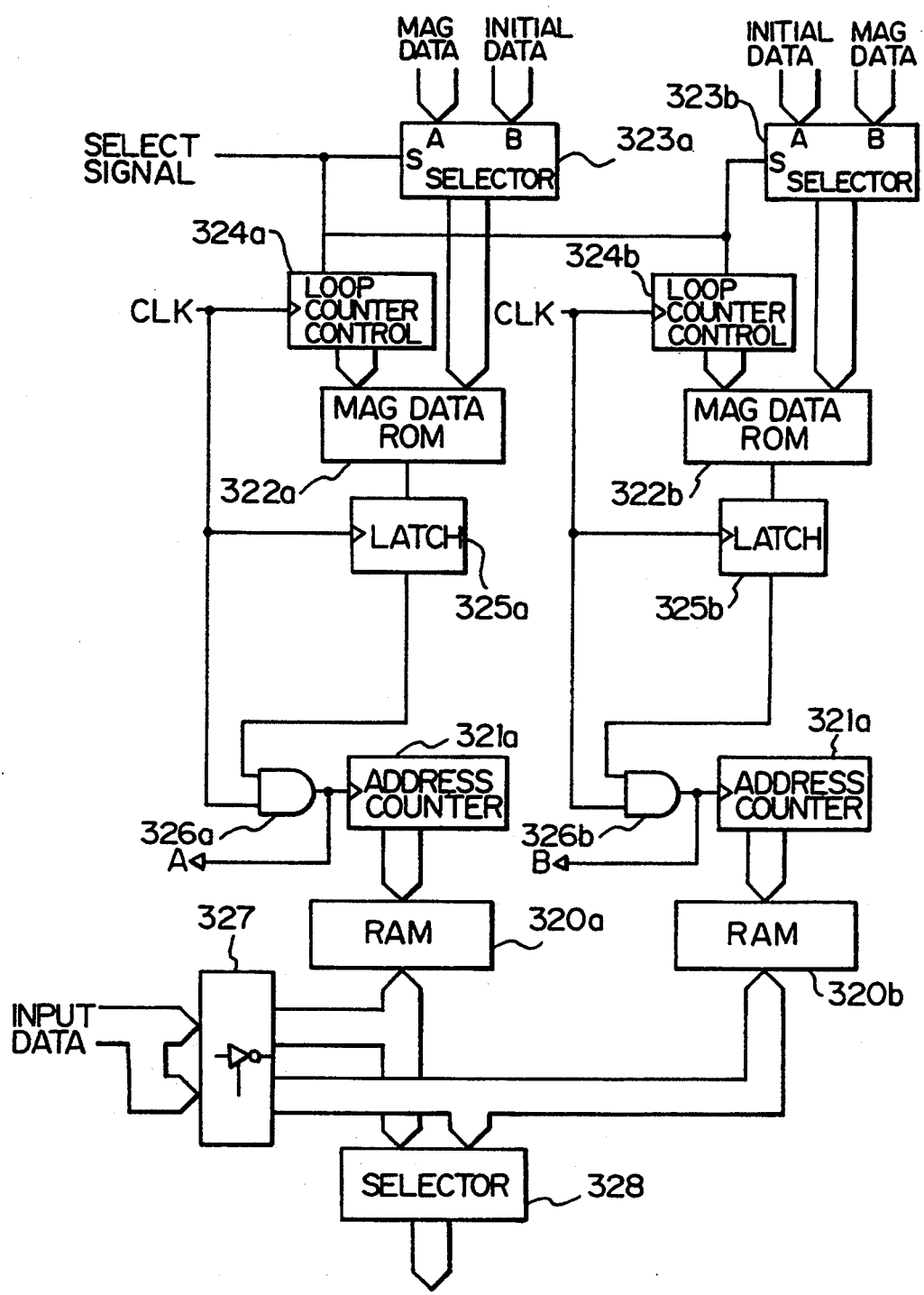
FIG. 40 is a block diagram schematically showing a magnification change processing section.

Referring to FIG. 40, a specific construction of the main-scan magnification change 66, FIG. 3B, is shown. As shown, the cicuitry has magnification data ROMs 322a and 322a for generating respectively the clock for address counters 321a and 321b which are associated with toggle RAMs 320a and 320b. Specifically, data matching a magnification is stored in ROM or RAM. Then, when the magnification is ×1, i.e., when the addresses and the data of the RAMs 320a and 320b have 1:1 correspondence, the address counters 321a and 321b each is clocked by a write clock in the event of writing in RAM or clocked by a read (image frequency) clock in the event of reading RAM. Then, the input data is outputted while maintaining the correspondence thereof to the image frequency. This is shown in a timing chart (×1) in FIG. 41.

Further, in the event of writing, the image frequency of the write clock is thinned on the basis of the relation between the addresses and the data of the RAMs 320a and 320b. For example, when the clock is thinned as represented by CLK (×0.5) in FIG. 41, the clock associated with the address counter of the RAM is thinned in the event of writing, compared to the write clock. At this time, the data corresponds to the write clock. Hence, in the case of (×0.5), when the address is incremented by 1, the data is incremented by 2. As a result, addresses 1 and 2 are associated with data 1 and 3, respectively, resulting in the data being thinned. When the data stored in the RAM is used to clock the address counter in the event of reading, the output data has the image frequency of the read clock and a magnification of ×0.5. This is indicated by (×0.5) in the timing chart of FIG. 41.

At the time of writing, the write clock is inputted for clocking the address counter and the data is written to the RAM. At the time of reading, the frequency of the read clock is thinned. This is based on the relation between the addresses and the data of the RAMs 320a and 320b. For example, when the clock is thinned as represented by CLK (×2) in FIG. 41, the clock associated with the address counter of the RAM is thinned in the event of reading, compared to the read clock. At this instant, since the data corresponds to the read clock, in the case of (×2), two data are outputted in response to the increment of the address by 1. As a result, one identical data is added to each data, i.e., data is doubled. More specifically, in a reduce mode, the write clock is thinned while, at the time of reading, data is outputted in response to the read clock; in an enlarge mode, the read clock is thinned while, at the time of writing, data is inputted in response to the write clock. In this system, the write/read clock is switched to the counter clock of the loop counter of the magnification data ROM is synchronism with the write/read of the toggle RAMs 320a and 320b. The magnification data ROMs 322a and 322b each stores magnification data matching the addresses.

Figure 42:
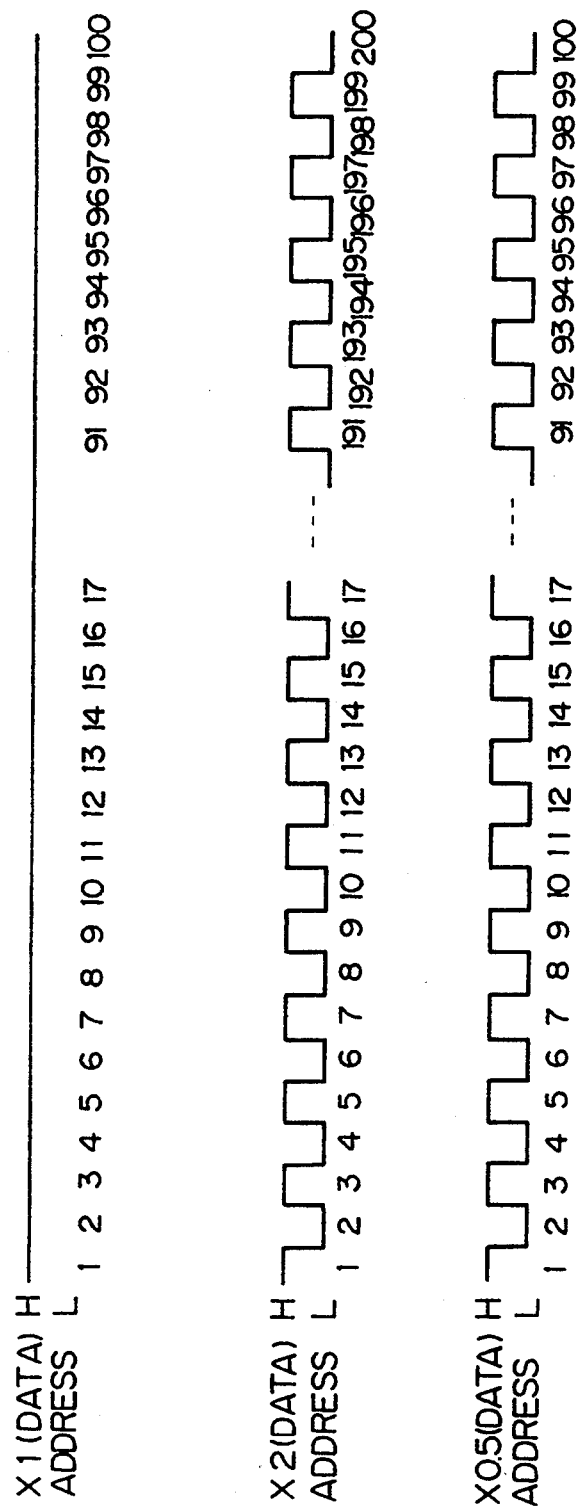
FIG. 42 show data stored in a magnification ROM.

FIG. 42 shows data stored in the magnification ROM. As shown, in the event of ×1 magnification, all the data are "H", and a clock identical with the clock applied to the gates 326a and 326b, FIG. 40, is fed to the address counter 321a. When the magnification is ×0.5, "H" and "L" appear alternatively, i.e., fifty out of one hundred are "H", so that the address clock is halved due to the gates 326a and 326b. When the magnification is ×2, one hundred out of two hundreds are "H", and the address clock is halved due to the gates 326a and 326b. In the case of the magnification of ×0.5 or ×0.2, the ROM data is switched over in synchronism with the write/read switchover of the RAMs 320a and 320b. Further, the selectors 323a and 323b switches the upper addresses of the magnification data ROMs 322a and 322b so as to switch over the ROM data at the time of read/write. The initial data are selected such that the clock to the address counters 321a and 321b is identical with the original clock, i.e., such that all "H" data are outputted.

As stated above, reduction and enlargement on a 1% basis are implemented by reduction data/100=reduced clock in the event of reduction and enlargement data/100=enlarged data in the event of enlargement. There are also shown in the figure loop counter control sections 324a and 324b, latch sections 325a and 325b, and a tristate buffer 327 which cooperate to switch over the input data to the RAMs 320a and 320b. An AND gate 328 switches over the output data of the RAMs 320a and 320b.

Figure 43:
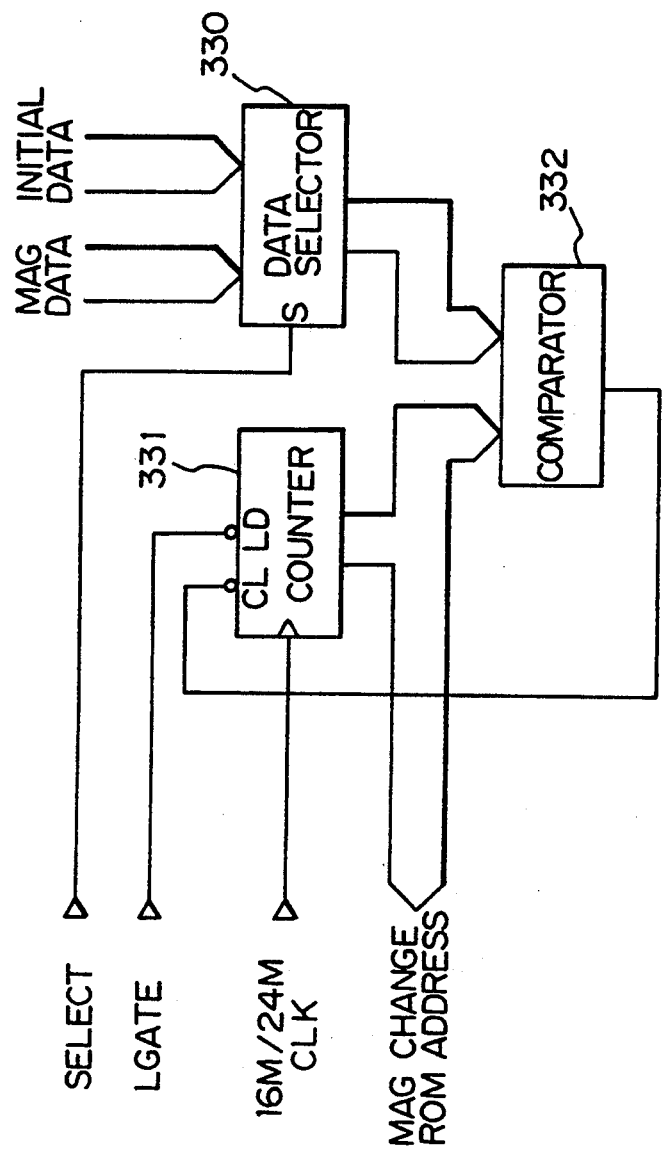
FIG. 43 is a schematic block diagram showing a specific construction of a loop counter control section.

FIGS. 43 shows the loop counter control sections 324a and 324b of the magnification data ROMs 322a and 322b. A data selector 330 selects magnification data when the magnification data is greater that 100 or selects initial data (100 in the embodiment) when the magnification data is less than 100. Specifically, when the magnification data is less than 100, i.e., in the case of reduction, initial data is selected since the amount of data to be thinned is determined by the count of the clock of the address counters 321a and 321b relative to clock of the counter 331 (here, serving as a loop counter). In the event of enlargement, should the initial data be selected, the loop counter 331 would count 100/enlargement data to produce an error. In light of this, the number of enlargement data is predetermined to be 100. Then, assuming 1-loop enlargement data, there holds enlargement data/100 and, therefore, the clock to the address counters 321a and 321b accurately matches the magnification.

In the above arrangement, the 100 loop counter 331 is set up in the event of reduction while the enlargement data loop counter is set up in the event of enlargement. Specifically, a comparator 332 compares the value of the counter 331 and the value of the selector 330 and, if the former is greater than the latter, delivers a clear signal to the counter 331. The output data from the counter 331 is fed to the lower addresses of the ROMs 322a and 322b.

Referring again to FIGS. 3A and 3B, the operation control 80 delivers to the output control 9 a mode signal (i) matching the operation of a particular mode key provided on the operation board. The output control 90 selects the bilevel image signal (e) outputted by the halftone processing 55, the bilevel image signal (f) outputted by the bilevel processing 65, or a signal of predetermined level (white level) in response to the mode signal (i) and the bilevel signal (g) fed from the area discrimination 70. The resultant output (h) of the output control 90 is fed to the printer 2 as a record signal. In response, the printer 2 modulates the laser beam to print out the image data.

Figure 1:
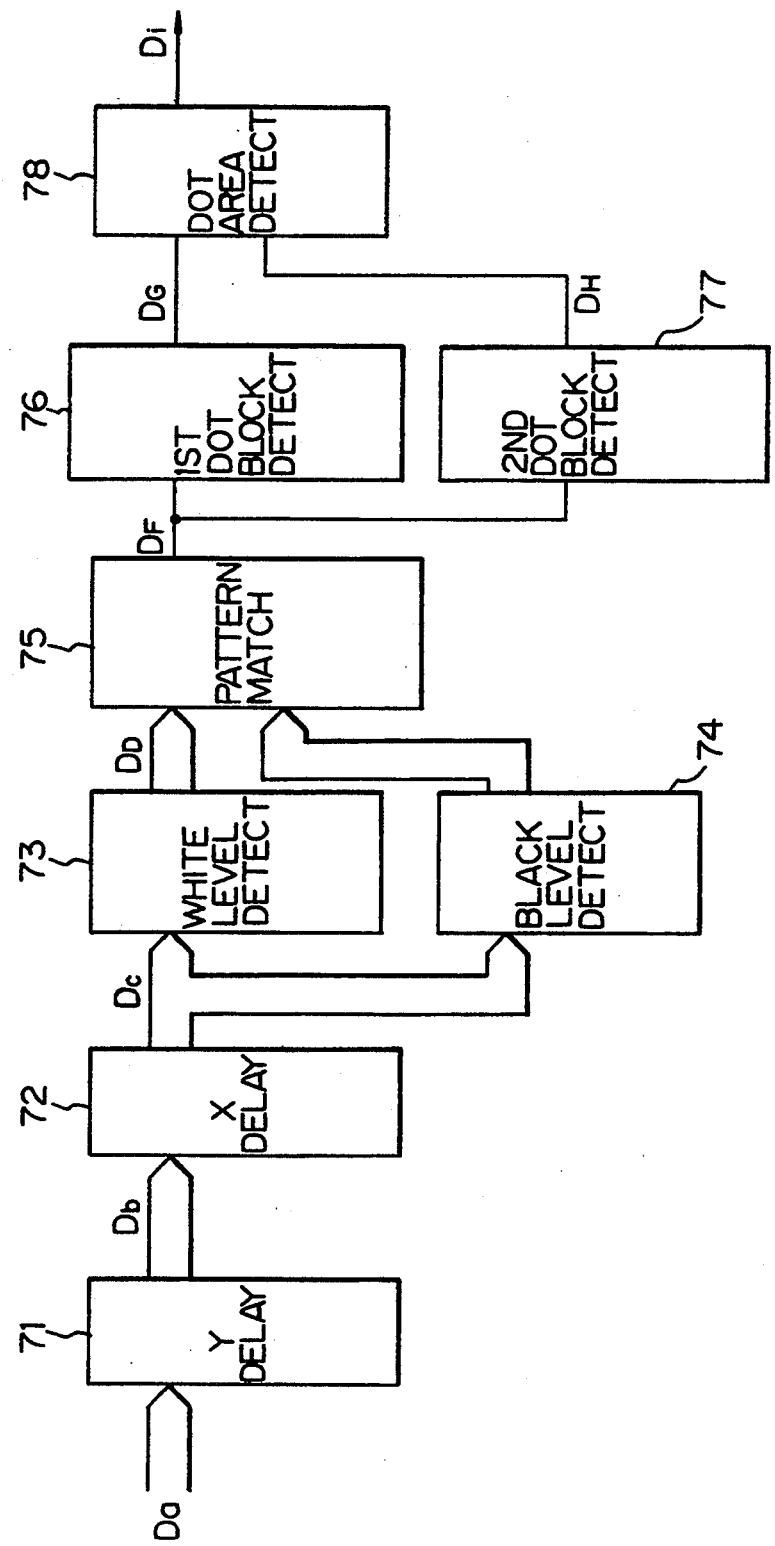
FIG. 1 is a block diagram schematically showing the general construction of a dot area detecting circuit embodying the present invention.

FIG. 1 shows a specific construction of the area discrimination 70 included in the circuitry of FIGS. 3A and 3B. At the same time, FIG. 1 shows blocks for detecting a dot area.

In FIG. 1, input image data Da is identical with the output data (d) of the MTF correction 60. Should the input data be directly applied to the area discrimination 70, the decision 70 might fail to resolve dots due to the phase difference between the CCD pitch and the pitch of the dots. Specifically, as shown in FIGS. 4A and 4B, at the density of 20% some input document dots have high density and some have low density. At the density of 50%, the dot density varies in the medium density range, and the density ratio is not constant. Further, at the density of 80%, the white core portion of dots is different in density from one point to another.

The illustrative embodiment makes decision as to a dot area by determining whether a black core exists or a white core exists. Hence, density data regarding dots is extremely important. A first characteristic feature of the embodiment is that the input data is subjected to predetermined MTF correction. Specifically, the embodiment effects MF correction by also assuming a case wherein the difference between the core density of a dot and the surrounding densities due to the difference in phase between the input dot pitch and the reading pitch of the CCD line sensor 10 is not noticeable. As shown in FIG. 4B, the data undergone such MTF correction has an enhanced difference between the core density of a dot and the surrounding density. This is successful in facilitating the detection of dots while improving the accuracy of detection, as will be described.

Figure 5:
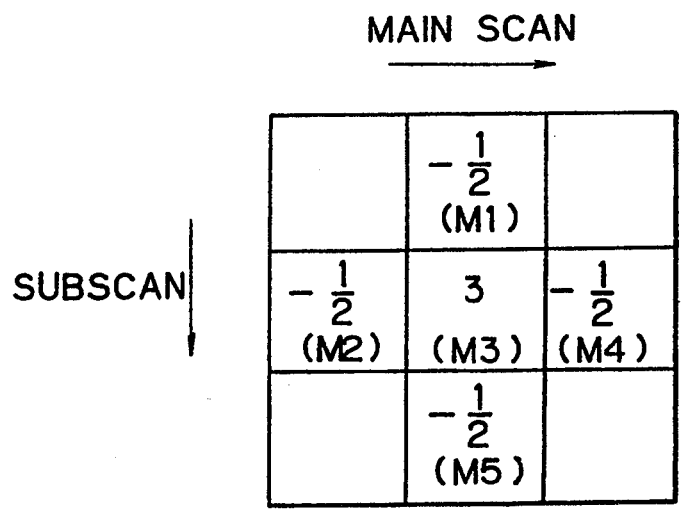
FIG. 5 shows a specific implementation for MTF correction.

FIG. 5 shows a specific MTF implementation. As shown, in the event of main and subscanning, pixels lying in a 3×3 matrix each is weighted by a particular weighing coefficient. The coefficients shown in FIG. 5 are only illustrative and may be replaced with any other coefficients or may even be changed depending on the mode magnification, for example.

Figure 6A:
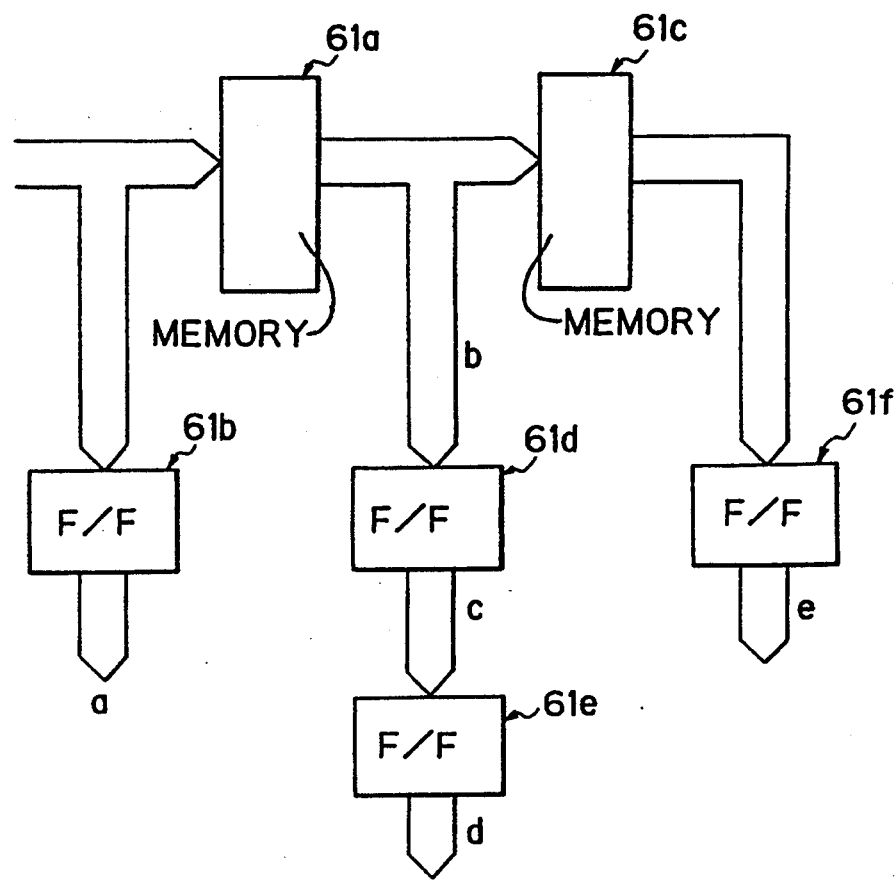
FIGS. 6A and 6B are block diagrams schematically showing circuitry for setting an MTF coefficient.
Figure 6B:
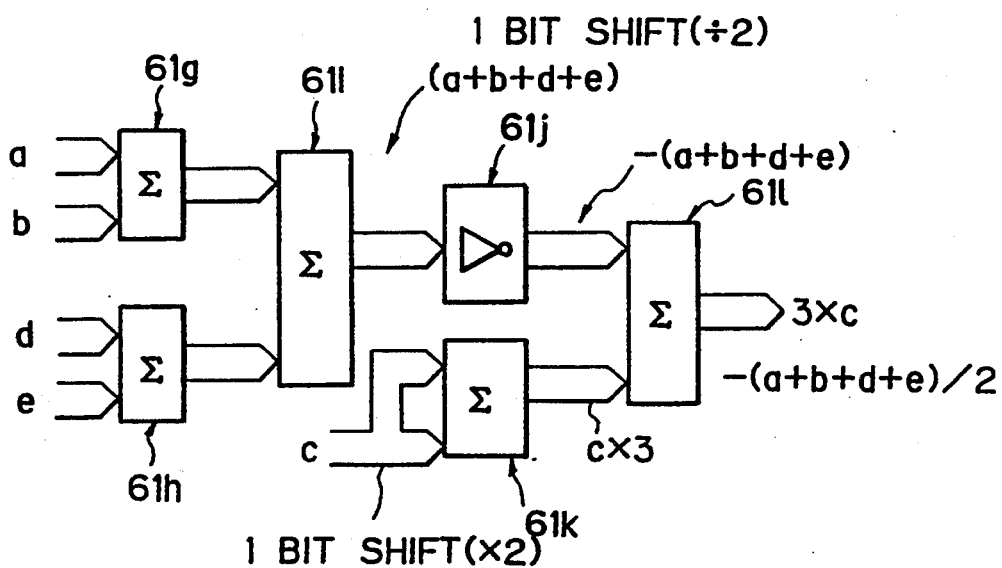

FIGS. 6A and 6B show circuitry for setting the MTR coefficients shown in FIG. 5. As shown, the circuitry has FIFO (First-In First-Out) memories 61a and 61c each effecting a 1-line delay in the main scanning direction, i.e., they implement a delay by two lines in combination. Hence, data is delayed by three lines in total, including the current line. It follows that three lines of data exist on the same time axis. Flip-flops (F/F) 61b, 61d, 61e and 61f each implements the delay of a line in the main scanning direction. Such a configuration allows picture data corresponding to the coefficients of the matrix shown in FIG. 6 to exist on the same time axis. Specifically, the image data corresponding to M1 and M2 shown in FIG. 5 are represented by b an a in FIG. 6A.

A logic circuit 61g sums the data a and b, and a logic circuit 61h sums data d and e, a logic circuit 61i sums the resulted data (a+b) and (d×e). A logic circuit 61k sums data c and data 2c doubled by the 1-bit shift. The sum (a+b+d+e) is applied to an inverting circuit 61j. The resulted data −(a+b+d+e) is applied to a logic circuit 61l while being shifted by one bit. The logic circuit 61l sums −(a+b+c+d)/2 and 3×c to produce 3×c−(a+b+c+d)/2. As a result, MTF correction using the coefficients shown in FIG. 5 is accomplished. The result 3×c−(a+b+d+e)/2 is the d output of the MTF correction 60, FIG. 3, and fed to the area discrimination 70.

The area discrimination 70 which will be described uses a density pattern matching method which determines a difference in density between a pixel of interest and surrounding pixels on the basis of the MTF correction signal d. However, even when use is made of input image data binarized with respect to a given threshold value, as described in Japanese Patent Laid-Open Publication No. 279665/1988, the density amplitude of dots will be increased to facilitate the detection of a density difference only if an MTF correction signal is inputted. In addition, from the binarization standpoint, black dots and white dots will be outputted more easily.

Referring again to FIG. 1, how the embodiment detects a dot area will be outlined. First, an area where image data are present has to be arranged on the same time axis to determine whether the image is a dot or not. When image data has been changed in magnification in the subscanning direction by the speed of the motor, the image data is reservely changed in magnification and thereby restored to $\times 1$ magnification data. In the figure, signals X and Y are representative of, respectively, the main scanning direction and the subscanning direction of the scanner 2. A Y delay circuit 71 and an X delay circuit 72 causes a given area to exist on the same time axis. A white level detecting circuit 73 and a black level detecting circuit 74 detect respectively the white core of dots and the black core of a dot. To determine whether or not a pixel of interest is the core of a dot, the detecting circuits 73 and 74 each determines a difference in density between the pixel of interest and surrounding pixels and, if the difference is greater than a threshold, determines that the pixel is the core of a white or black dot. A pattern matching circuit 75 compares the condition of the core of the dot with a predetermined pattern, thereby detecting a dot. A first dot block detecting circuit 76 determines, when one or more dots exist in a predetermined $n \times m$ area, that the $n \times m$ area is a dot block. A second dot block detecting circuit 77 determines, when two or more dots exist in the $n \times m$ area, that this area is a dot block. Further, a dot area detecting circuit 78 determines, when blocks each having two or more dots, blocks having one or more blocks and blocks having no dots exist in a predetermined ratio, that the plurality of dot blocks constitute a dot area.

Figure 7A:
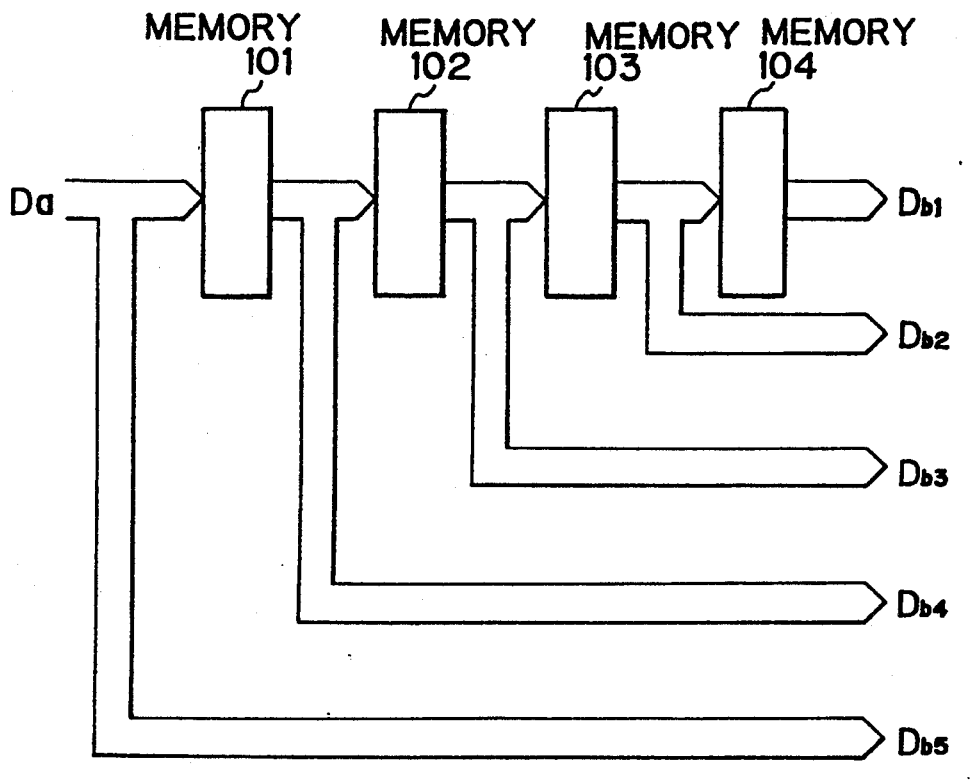
FIGS. 7A and 7B are block diagrams schematically showing a specific construction of a Y delay circuit.

As shown in FIG. 7A, the Y delay circuit 71 has memories 101-104. This circuit is only illustrative and is variable depending on the maximum size of patterns to be used for pattern matching. The Y delay circuit 71 will be described specifically with reference also made to FIG. 8A.

Figure 9:
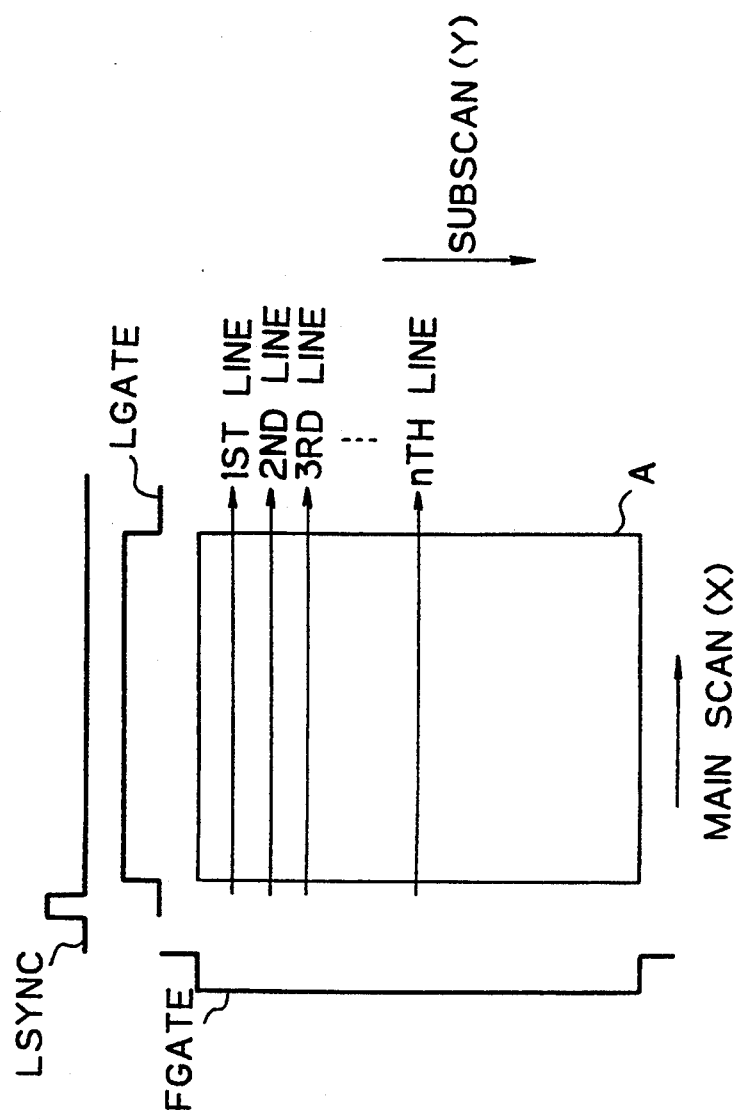
FIG. 9 show control signals for controlling timings.

First, control signals for controlling the timings will be described with reference to FIG. 9. In FIG. 9, labeled A is a document. The control signals comprise a signal FGATE representative of the effective document width in the subscanning direction (Y direction), a signal LGATE representative of the effective document width in the main scanning direction (X direction), a sync signal LSYNC for main scanning, and a reference signal CLK, not shown, meant for the entire system. The information printed on the document is read line by line in the main scanning direction in synchronism with the signal LSYNC. When both of the signals FGATE and LGATE are in a high level or "H", the resulted data is valid. The image data so read are outputted from the CCD line sensor 10 one pixel at a time in sychronism with the signal CLK.

Figure 8A:
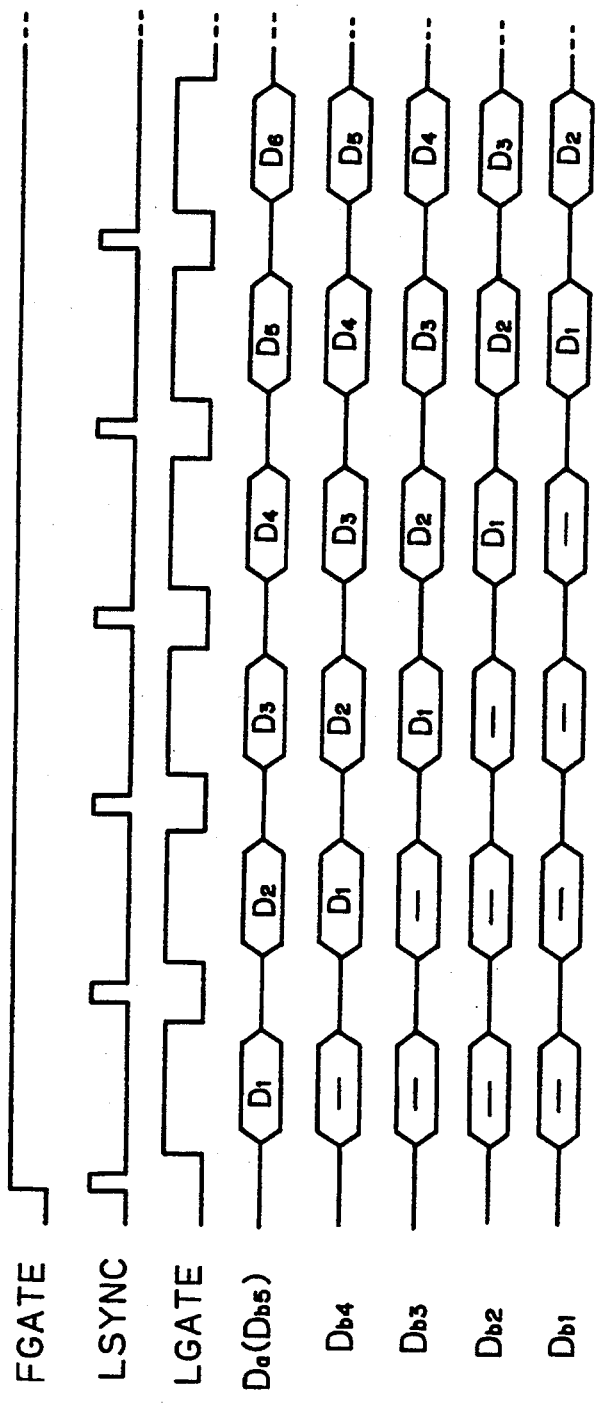
FIGS. 8A and 8B are timing charts demonstrating a specific operation of the Y delay circuit.

In FIG. 8A, after the signal FGATE has changed from a low level or "L" to "H", image data read in synchronism with the first signal LSYNC is sequentially written to the memory 101 one pixel at a time in synchronism with the signal CLK. At this instant, the data appearing while the signal LGATE is "H" is determined to be the valid image data $D_1$ on the first line. Image data $D_2$ on the second line produced in synchronism with the next signal LSYNC is also written to the memory 101, while the image data $D_1$ on the first line having been stored in the memory 101 is shifted pixel by pixel to the memory 102 in synchronism with the signal CLK as 1-line delayed image data. In the same manner, the third line and successive lines are scanned to produce image data $D_3$, $D_4$ and so on. These data are sequentially delayed by the memories 103 and 104. When the fifth line is read, the outpus of the memories 101, 102, 103 and 104 are $D_4$, $D_3$, $D_2$ and $D_1$. As a result, five lines of image data, i.e., data $D_1$-$D_1$ and the data $D_5$ on the fifth line are obtained on the same time axis.

Inputting image data undergone reverse magnificaton change to $\times 1$ magnification to the area discrimination 70 in place of the magnification-changed data is advantageous for the following reasons.

FIGS. 44A through 44C show specific dot detection patterns each being associated with a particular magnification. Specifically, FIG. 44A shows a dot detection pattern associated with $\times 1$ magnification, FIG. 44B shows a dot detection pattern associated with $\times 0.5$ magnification in the subscanning direction, and FIG. 44C shows a dot detection pattern associated with $\times 2$ magnification in the subscanning direction. When $\times 0.5$ magnification is set, for example, the document is read at a speed twice higher than the scanning speed assigned to $\times 1$ magnification; when $\times 2$ magnification is set, the scanning speed is halved. It follows that on the change in magnification, the dot detection pattern changes in the subscanning direction despite that the dot remains the same. When the area intended for pattern matching is corrected by reverse magnification in the subscanning direction, it has the dot detection pattern shown in FIG. 44A and, therefore, the patterns shown in FIGS. 44B and 44C are practically needless. Today, there are available many advanced systems capable of changing the magnification on a 1% order. With such an advanced system, it is not practicable to detect a dot unless a prohibitive number of dot detection patterns are used, for the previously discussed reasons. Conversely, reducing the circuit scale and the number of dot detection patterns would directly translate into errors. The present invention successfully promotes accurate detection and simplifies the circuitry.

Figure 7B:
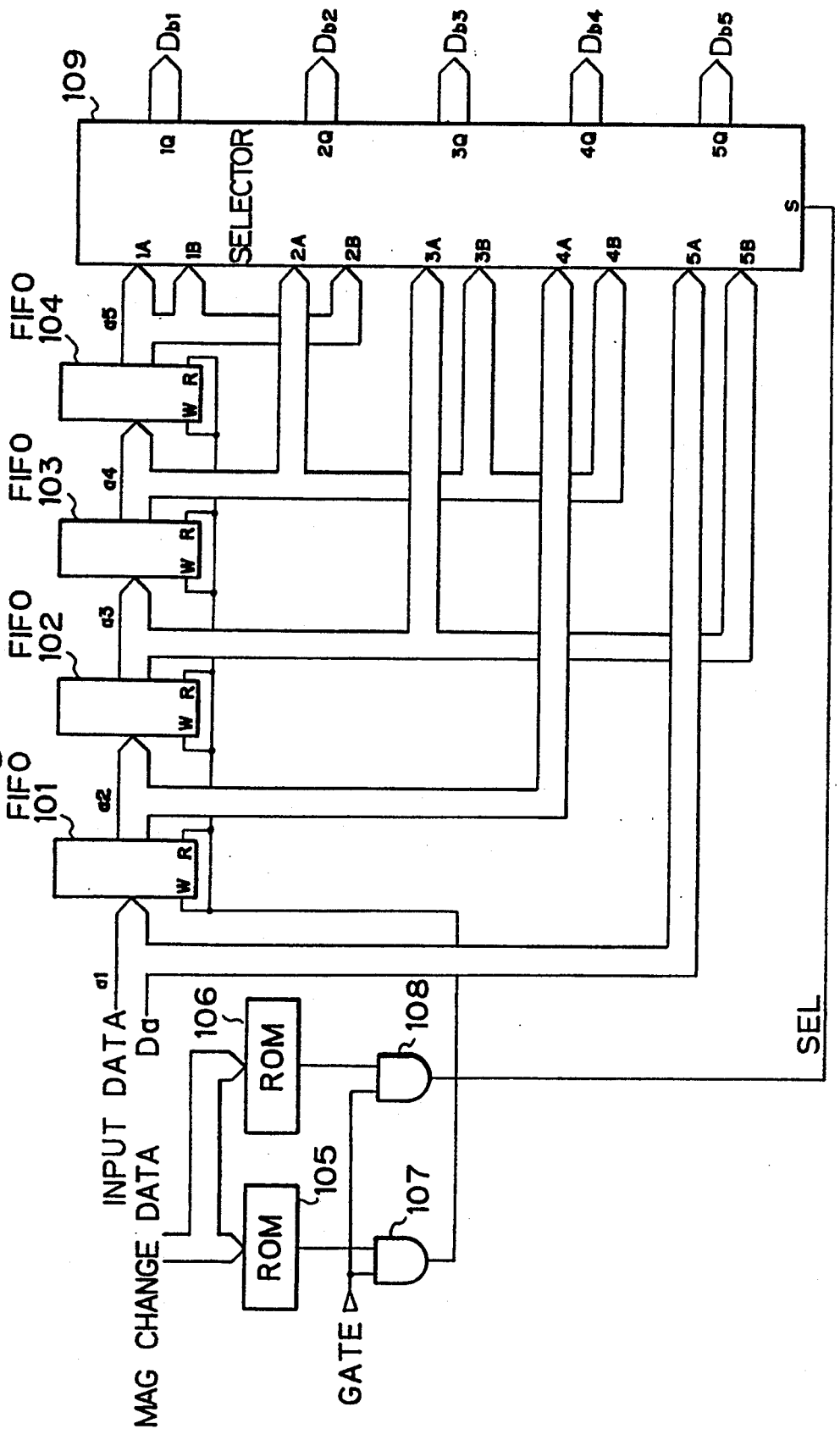

As shown in FIG. 7B, the subscan magnification change 67 and the Y delay 71 are made up of the FIFO memories 101-104, ROMs 105 and 106, AND gates 107 and 108, and a selector 109. Again, this circuit is only illustrative and variable depending on the maximum size of patterns intended for pattern matching. The change in the magnification in the subscanning direction may be implemented by any one of conventional methods. The operation of the Y delay 71 will be described with reference also made to FIG. 8B.

Figures 1, 8B:
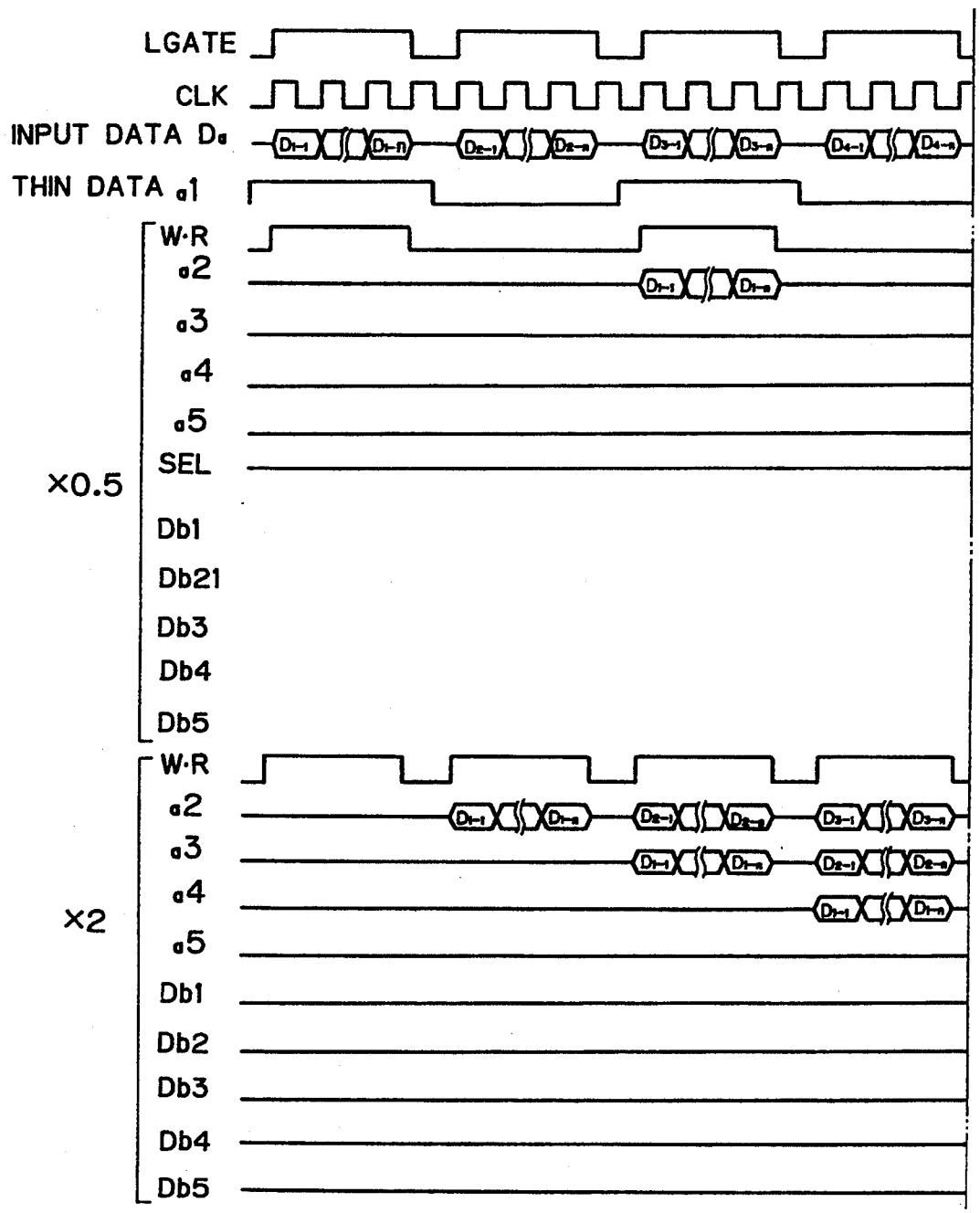
Figures 2, 8B:
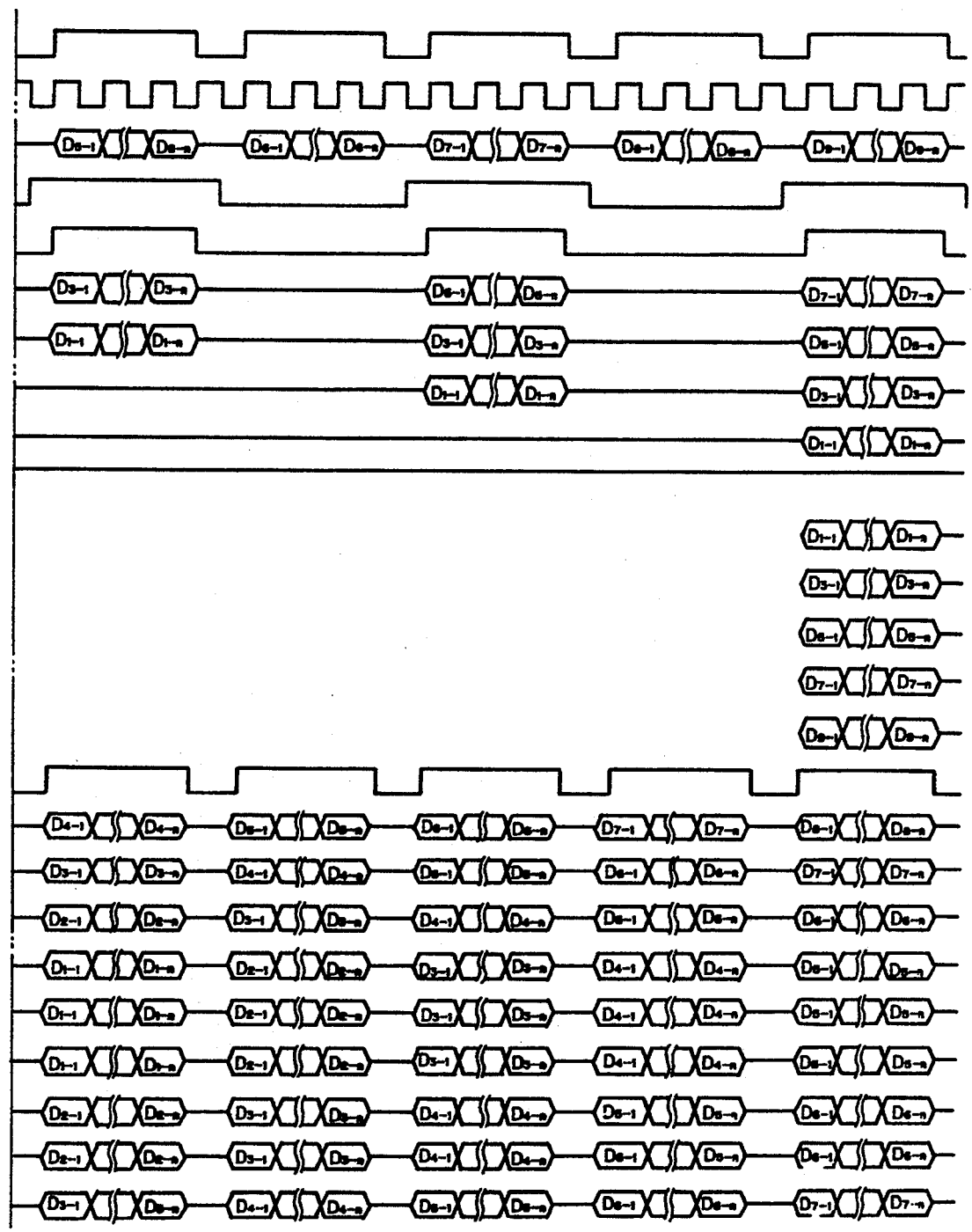

In FIG. 8B, after the signal FGATE has changed from "L" to "H", image data read in synchronism with the first signal LSYNC is sequentially written to the memory 101 pixel by pixel in sychronism with the signal CLK. At this instant, the data appearing when the signal LGATE is "H" is determined to be the valid image data $D_{1-1}$-$D_{1-n}$ on the first line. Image data $D_{2-1}$-$D_{2-n}$ on the second line produced in synchronism with the next signal LSYNC is also written to the memory 101, while the image data $D_{1-1}$-$D_{1-n}$ having been stored in the memory are written to the memory 102 pixel by pixel in sychronism with the signal CLK as 1-line delayed image data. In the same manner, the third line and successive lines are sequentially scanned to produce image data. These data are sequentially delayed by the memories 103 and 104. When the fifth line is read, the memories 101, 102, 103 and 104 output respectively the image data $D_{1-1}$-$D_{1-n}$, $D_{2-1}$-$D_{2-n}$, $D_{3-1}$-$D_{3-n}$, and $D_{4-1}$-$D_{4-n}$. These data and image data $D_{5-1}$ through $D_{5-n}$ on the fifth line just read, i.e., five lines of image data are obtained at the same time.

The above procedure is executed when the magnification change ratio is 1. Specifically, when the magnification change is applied to the ROMs 105 and 106, the ROM 105 produces subscan thinned data corresponding to the magnification change ratio. The AND gate 107 ANDs this data and the signal LGAATE. The resulted output of the AND gate 107 is used as a write reset signal and a read reset signal for the memories 101 through 104. The ROM 106 outputs a select signal SEL for controlling the delivery of the final outputs $D_{b1}$-$D_{b5}$ of this circuit. In the case of ×1 magnification, reverse magnification change is not necessary, and the outputs of the ROM 105 and 106 are "H" and "L (signal SEL)", respectively. Hence, the signal LGATE is the write reset signal and read reset signal for the memories 101 through 104, so that the image data are sequentially delayed. As a result, $\alpha_1$ which is $D_{5-1}$-$D_{5-n}$, $\alpha_2$ which is $D_{4-1}$-$D_{4-n}$, $\alpha_3$ which is $D_{3-1}$-$D_{3-n}$, $\alpha_4$ which is $D_{4-1}$-$D_{4-n}$, and $\alpha_5$ which is $D_{5-1}$-$D_{5-n}$ are applied to the A inputs of the selector 109. The select signal SEL turns from "H" to "L" with the result that the A-series inputs are outputted.

Assume that a magnification change ratio of 2 is set on the copier. Then, a scanning speed which is one half of the speed assigned to ×1 magnification, so that the amount of image data in the subscanning direction is doubled. In this circuit, revere magnification change (×0.5) is effected to transform the image data to ×1 magnification image data. Specifically, when the magnification change data (×2) is inputted, the ROM 105 produces a thinned signal. The AND gate 107 ANDs the thinned signal and the signal LGATE to output a write reset and read reset signal W. R. As shown in FIG. 8B, data on every two lines, i.e., data on the first line, third line, fifth line and so on are written to the memories 101–104, whereby data $D_{b1}$-$D_{b5}$ are produced. Therefore, versatile reserve magnification change can be implemented by the thinned output of the ROM 105. On the other hand, when a magnification change ratio of 0.5 is set, the scanning speed is doubled with the result that the image data is reduced in the subscanning direction. In this case, magnification change ratio of 2 will be executed.

In detail, on the entry of the magnification change data (×0.5), the ROM 105 outputs "H". Then, the AND gate 107 ANDs the output of the ROM 105 and the signal LGATE to produce the signal LGATE which serves as the signal W. R. The ROM 106 produces "H" which is also the signal LGATE. As a result, the selector 109 outputs the B-series inputs. Here, the B-series inputs to the selector 109 are $\alpha_5 \times 2$, $\alpha_4 \times 2$, and $\alpha_3 \times 1$. The resulted data are represented by $D_{b1}$-$D_{b5}$ in FIG. 8B. The same data are outputted twice to effect ×2 reverse magnification. To enlarge an image by reverse magnification, the combination of the outputs of the memories 101–104 is changed to output the same data in duplication.

The magnification change in the subscanning direction and the delay in the Y direction shown and described may be implemented by any of various systems inclusive of conventional technologies. This kind of pattern matching does not need strict subscan reverse magnification change. For example, reverse magnification change between 100% and 101% is not necessary. The present invention can simplify the subscan magnification change circuit by the approximation on a 10% basis or by preparing several different patterns to be produced by subscan reverse magnification change so as to roughen the steps for reverse magnificiation change. While the conventional subscan magnification circuit needs a frame memory or similar large-scale storage, the circuit 67 of the illustrative embodiment does not need it and, therefore, even the subscan maginfication change system alone is very useful.

Figure 10:
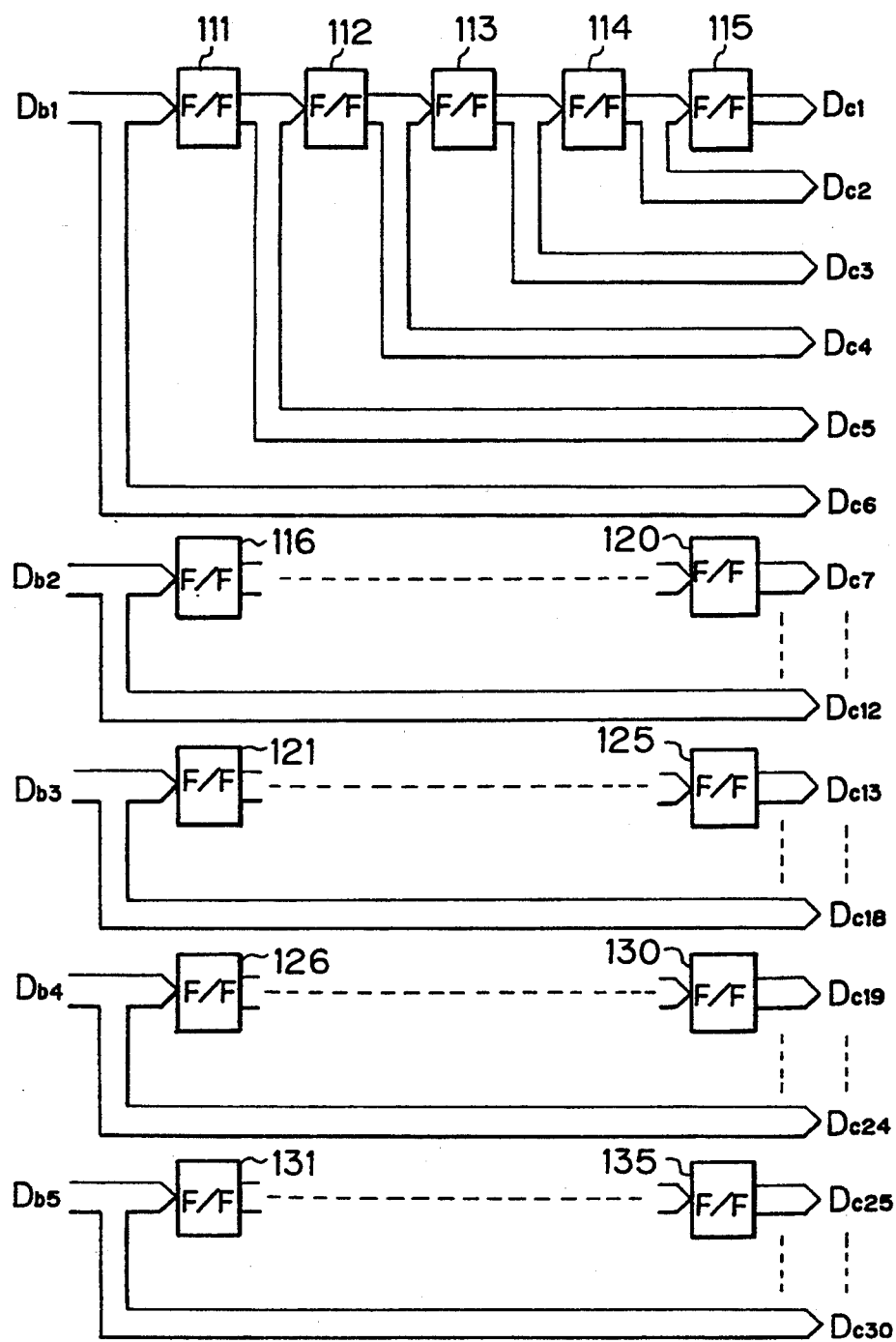
FIG. 10 is a block diagram schematically showing an X delay circuit.

As shown in FIG. 10, the X delay circuit 72 has five blocks each comprising five flip-flops (111–115, 116–120, 121–125, 126–130 or 131–135), although the circuit arranement depends on the maximum size of patterns intended for pattern matching. The five blocks each processes respective one of five lines of video data $D_{b1}$-$D_{b5}$ produced by the Y delay circuit 71. Since the operations of the five blocks are identical, let the following description concentrate on the block that deals with the image data $D_{b1}$ by way of example. The operation will be described with reference also made to FIG. 11.

Figure 11:
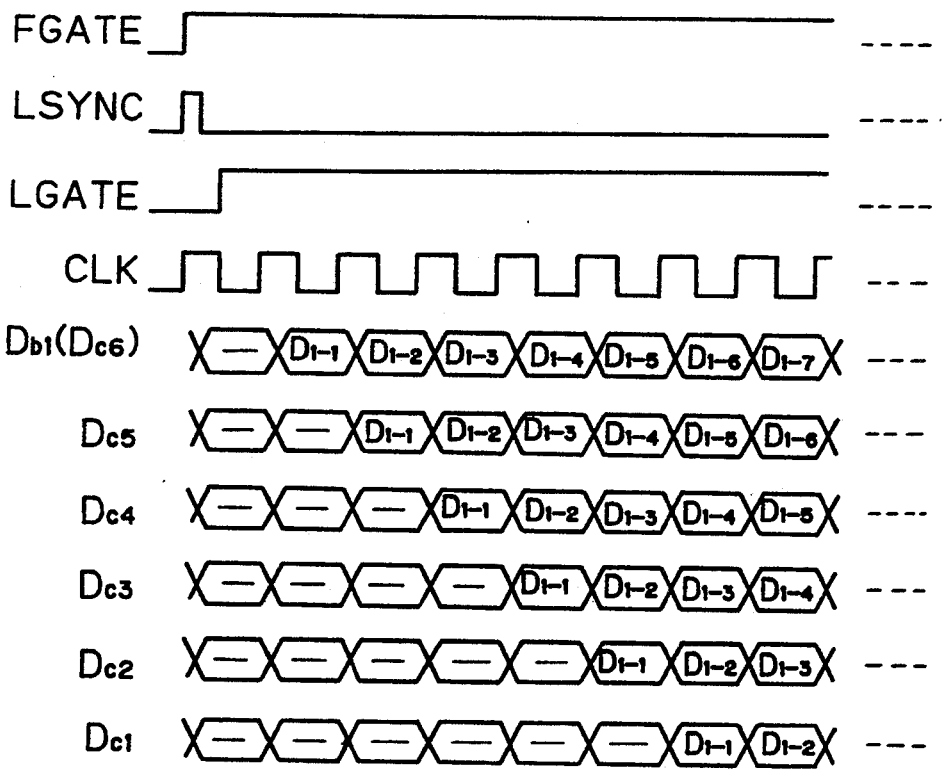
FIG. 11 is a timing chart demonstrating a specific operation of the X delay circuit.

As shown in FIG. 11, when the image data on the fifth line is read, the memory 104 outputs the data $D_1$ on the first line pixel by pixel in synchronism with the signal CLK. The image data $D_{1-1}$ of the first pixel on the first line is latched and memorized by the flip-flop 111. When the pixel data $D_{1-2}$ of the second pixel is applied to the flip-flop 111, the flip-flop 111 memorizes it while delivering the first image data $D_{1-1}$ to the flip-flop 112 as 1-pixel delayed data in synchronsim with the signal CLK. In the same manner, as the image data $D_{1-3}$, $D_{1-4}$ and so on of the third and successive pixels on the first line are sequentially produced, the flip-flops 113–115 delay them. At the time when the image data of the sixth pixel arrives, the flip-flops 111–115 produce $D_{1-5}$, $D_{1-4}$, $D_{1-3}$, $D_{1-2}$ and $D_{1-1}$, respectively. As a result, the image data of such five pixels and the image data $D_{1-6}$ of the sixth pixel, i.e., six pixels of image data in total are obtained at the same time.

Figure 12:
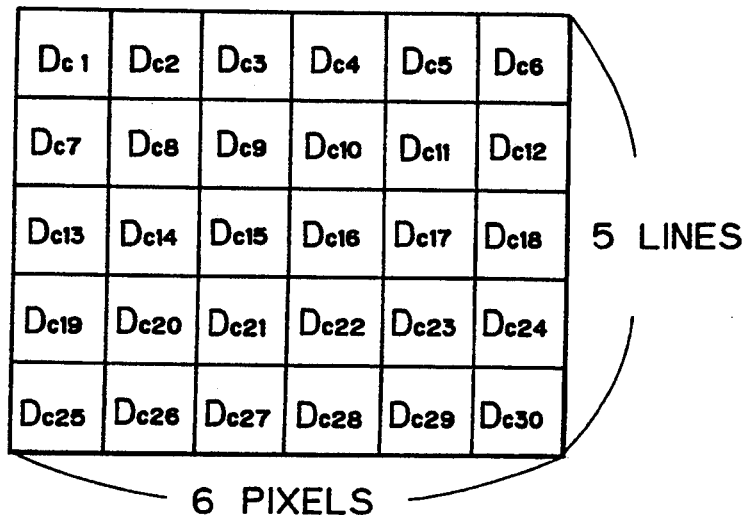
FIG. 12 shows image data produced by the X delay circuit.

Hence, as shown in FIG. 12, when the five blocks are combined, thirty pixels of image data $D_{c1}$-$C_{c30}$ (5 lines ×6 pixels) are achieved at the same time. Several of such pixels are used to effect pattern matching for the detection of a dot.

FIGS. 13A through 13E show specific patterns applicable to pattern matching. In each of the patterns, a pixel $D_{c15}$ with a circle is the pixel being observed while the pixels surrounded by solid lines are the surrounding pixels. For example, the pattern shown in FIG. 13A has a pixel $D_{c15}$ being observed and surrounding pixels $D_{c2}$-$D_{c5}$, $D_{c7}$, $D_{c12}$, $D_{c13}$, $D_{c18}$, $D_{c19}$, $D_{c24}$ and $D_{c28}$-$D_{c29}$. The pixel being observed is determined to match the pattern when it satisfies one of the following conditions:

(i) the density of the pixel of interest is higher than the densities of all of the surrounding pixels by more than a predetermined value; and (ii) the density of the pixel of interest is lower than the densities of all of the surrounding pixels by more than a predetermined value.

Such a pixel is detected as a dot. The "predetermined value" mentioned above will be referred to as a weight hereinafter.

Figure 16:
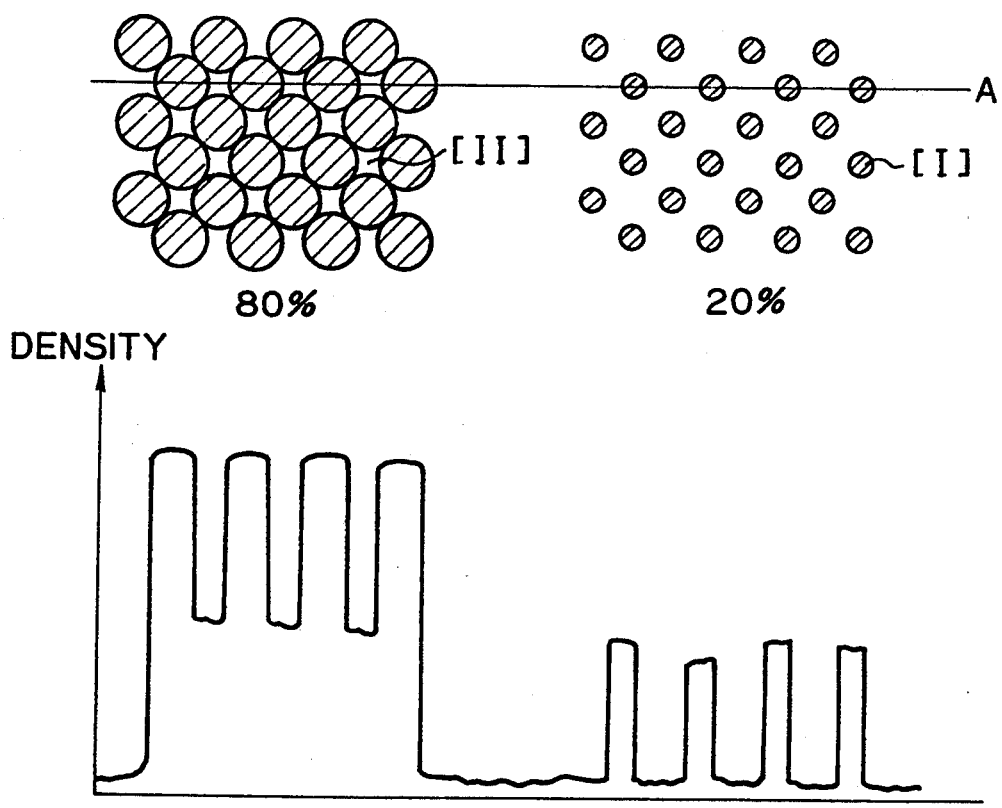
FIG. 16 shows dots and a density distribution thereof.

FIG. 16 shows dots having a density of 20% and dots having a density of 80%, together with corresponding density distributions which are viewed one-dimensionally at a specific position A for simplicity. Regarding the above-mentioned condition (i), a portion [I] shown in FIG. 16, i.e., a dot itself is detected as a dot. In the case of the condition (ii), a portion [II] shown in FIG. 16, i.e., a portion surrounded by dots is detected as a dot.

As stated above, when dots have a higher density, i.e., when black has a great area ratio to white in a given area, a white core exists. On the other hand, when the density of dots is low, i.e., when white has a great area ratio to black, a black core exists.

As shown in FIG. 14, to detect a dot, input data representative of a dot image is digitized by a plurality of threshold levels, and whether or not the resulted bilevel pattern matches a predetermined pattern is determined. The problem with such pattern matching is as follows. As shown in FIG. 15, a character or line image around the threshold level is not uniform in density due to mechanical noise ascribable to the irregular density of the image itself and irregular paper transport, irregular illumination, irregular pitch of the CCD line sensor 10, etc. In such a condition, the input image is irregular in density with the result that black in the bilevel data is not continuous. It is likely that the discontinuous black line accidentally matches the dot pattern.

The illustrative embodiment eliminates the above problem. Even when a character or line image has some irregularities in density, the level of density difference is sufficiently lower than that of dots. Hence, the embodiment eliminates the above-discussed erroneous detection by effecting pattern matching which gives a certain degree of density difference between the pixel of interest and the surrounding pixels. Since this density difference is not changed in conformity to the density (area ratio) of dots, the circuit construction is relatively simple.

The operations of the white level detector 73 and black level detector 74 will be described by taking the pattern shown in FIG. 13A as an example.

In the previously stated condition (i), the black level detector 74 weights the pixel of interest relative to the surrounding pixels. The white level detector 73 operates in the same manner as the black level detector 74 in the other condition (ii). Thereupon, the detectors 73 and 74 each compares the weighted pixel of interest with the surrounding pixels.

Figures 13A, 13B, 13C, 13D, 13E:
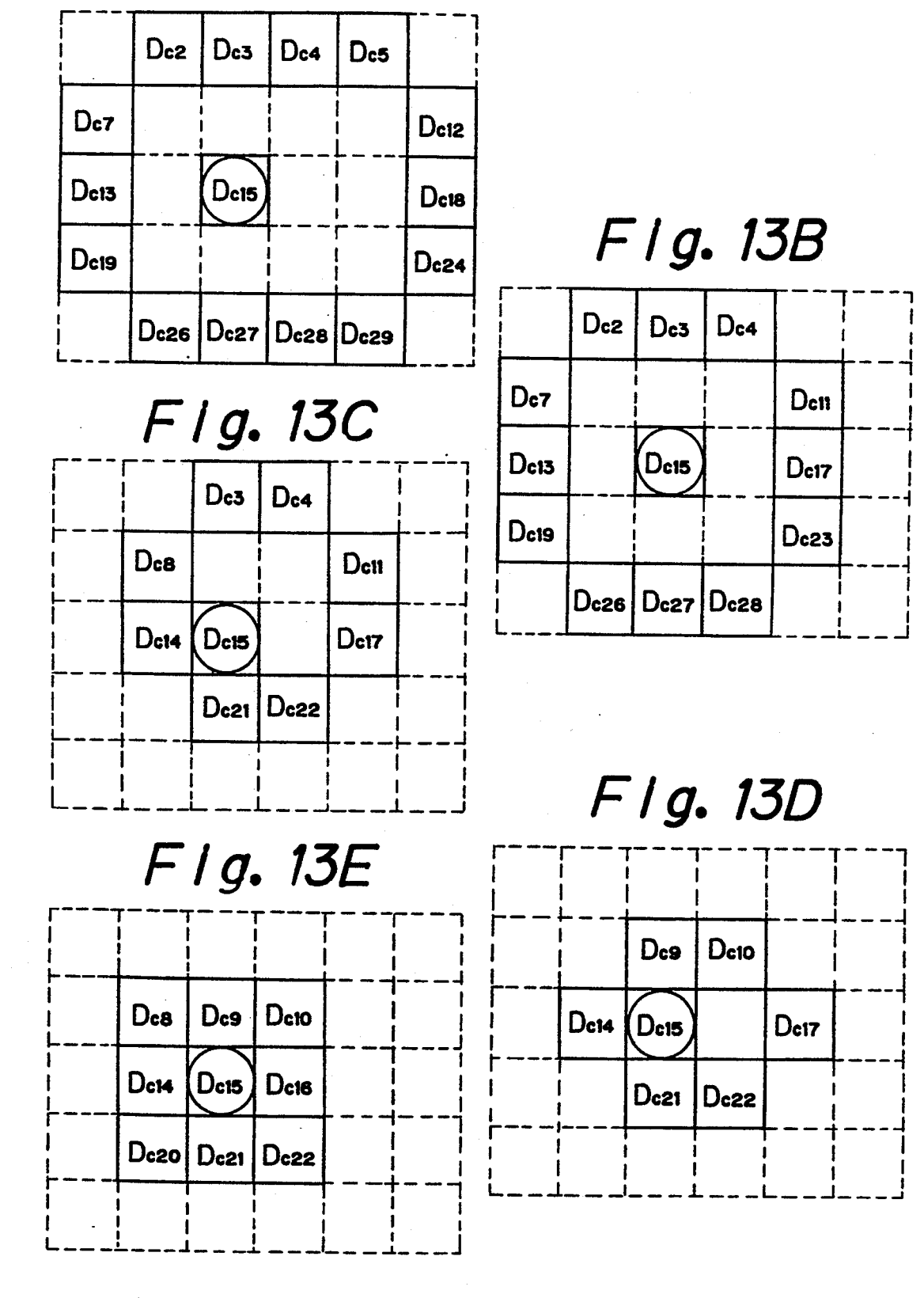
Figure 17:
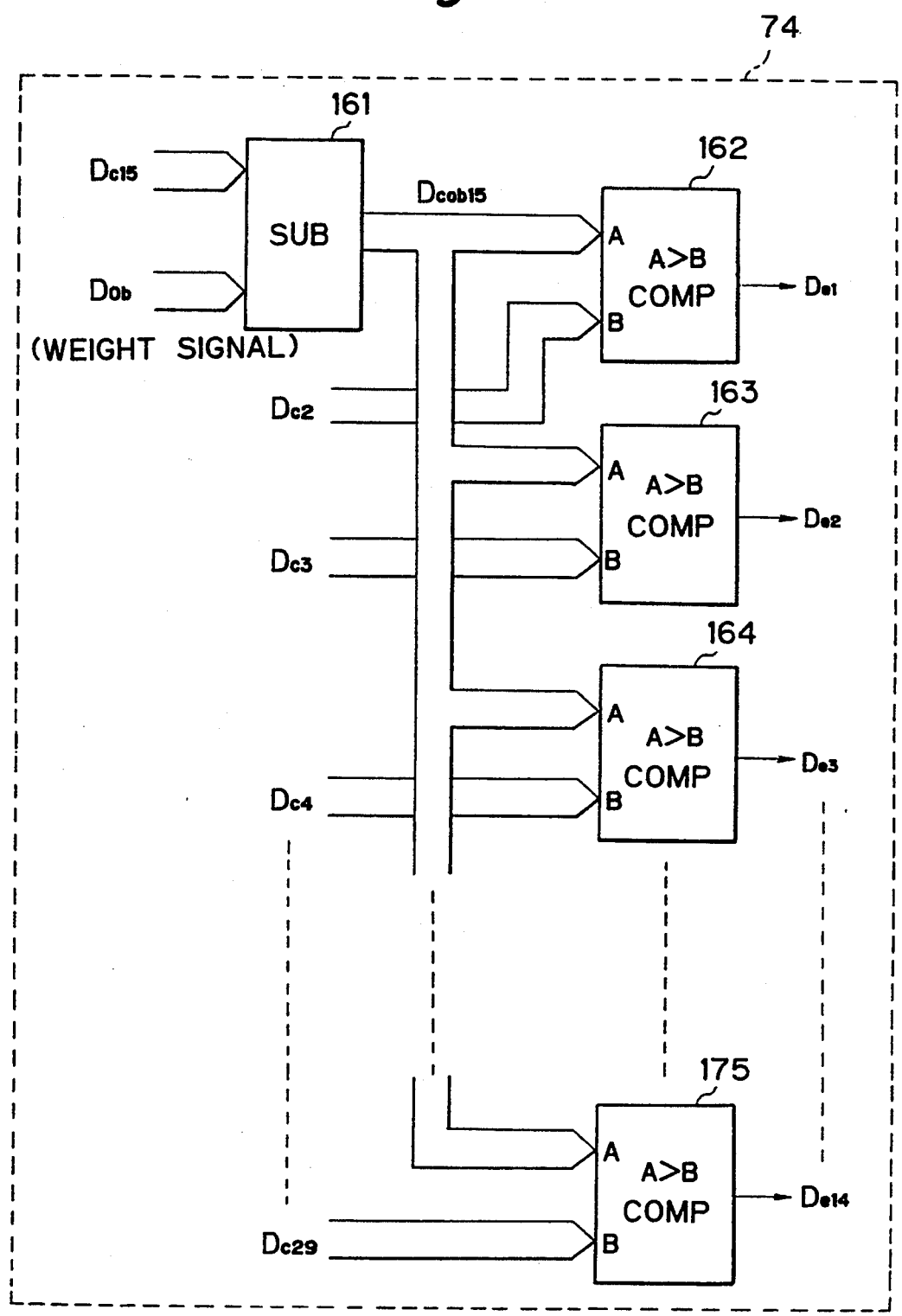
FIG. 17 is a block diagram schematically showing a black level detecting circuit.

FIG. 17 shows a specific construction of the black level detector 74 in relation to the pattern shown in FIG. 13A. As shown, the black level detector 74 has a subtractor 161 and comparators 162–175. The subtractor 161 weighs the pixel of interest relative to the surrounding pixels. Specifically, the black level detector 74 produces signals $D_{e1}$-$D_{e14}$ representative of the relation of the data $D_{cob15}$ of the pixel being observed and the surrounding pixel data (here, $C_{c2}$-$C_{c5}$, $D_{c7}$, $D_{c12}$, $D_{c13}$, $D_{c18}$, $C_{c19}$, $C_{c24}$, and $D_{c26}$-$D_{c29}$). The signals $D_{e1}$-$D_{e14}$ are "H" if the data of the weighted pixel being observed is greater than the surrounding data or "L" if otherwise.

Figure 18:
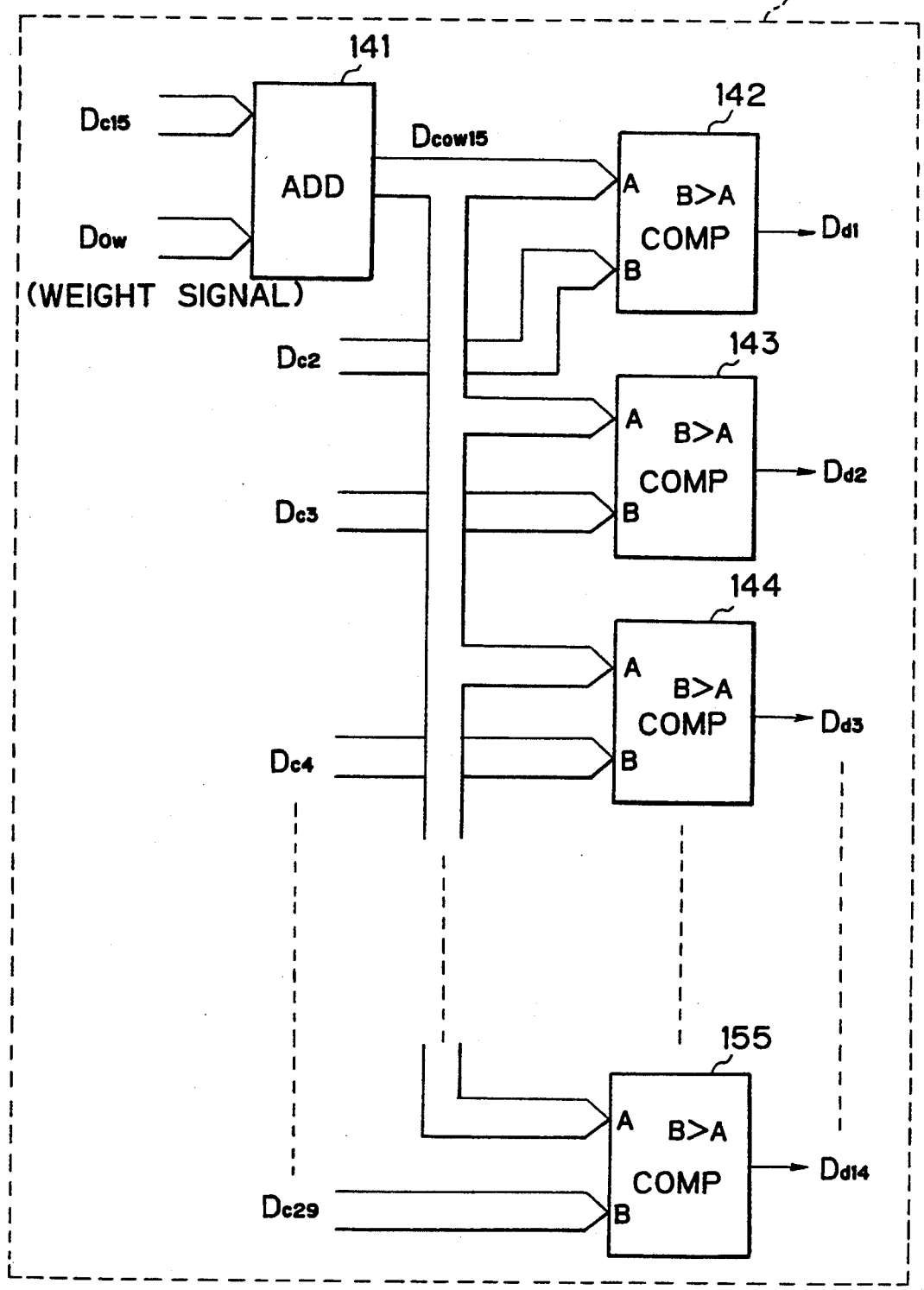
FIG. 18 is a block diagram schematically showing a white level detecting circuit.

FIG. 18 shows a specific construction of the white level detector 73 in relation to the pattern shown in FIG. 13A. As shown, the white level detector 73 has an adder 141 and comparators 142–155. The adder 141 weighs the pixel of interest relative to the surrounding pixels. The white level detector 73 differs from the black level detector 74 in that it adds weight data $D_{ow}$ to the data $D_{c15}$ to produce data $D_{cow15}$ of the weighted pixel being observed. This data $D_{cow15}$ is applied to the comparators 142–155. It is to be noted that the weight data $D_{ow}$ is freely selectable. The comparators 142–155 compare the densities of the surrounding pixels with the density of the weighted pixel of interest and thereby produce signals $D_{d1}$-$D_{d14}$. The signals $D_{d1}$-$D_{14}$ are "H" when the data of the weighted pixel being observed is smaller than the surrounding pixel data or "L" if otherwise.

Such pattern matching may be effected by use of a plurality of patterns, if desired. Then, a plurality of black level detectors 74 and a plurality of white level detectors 73 may be arranged in parallel, as shown in FIG. 19 specifically.

Figure 20:
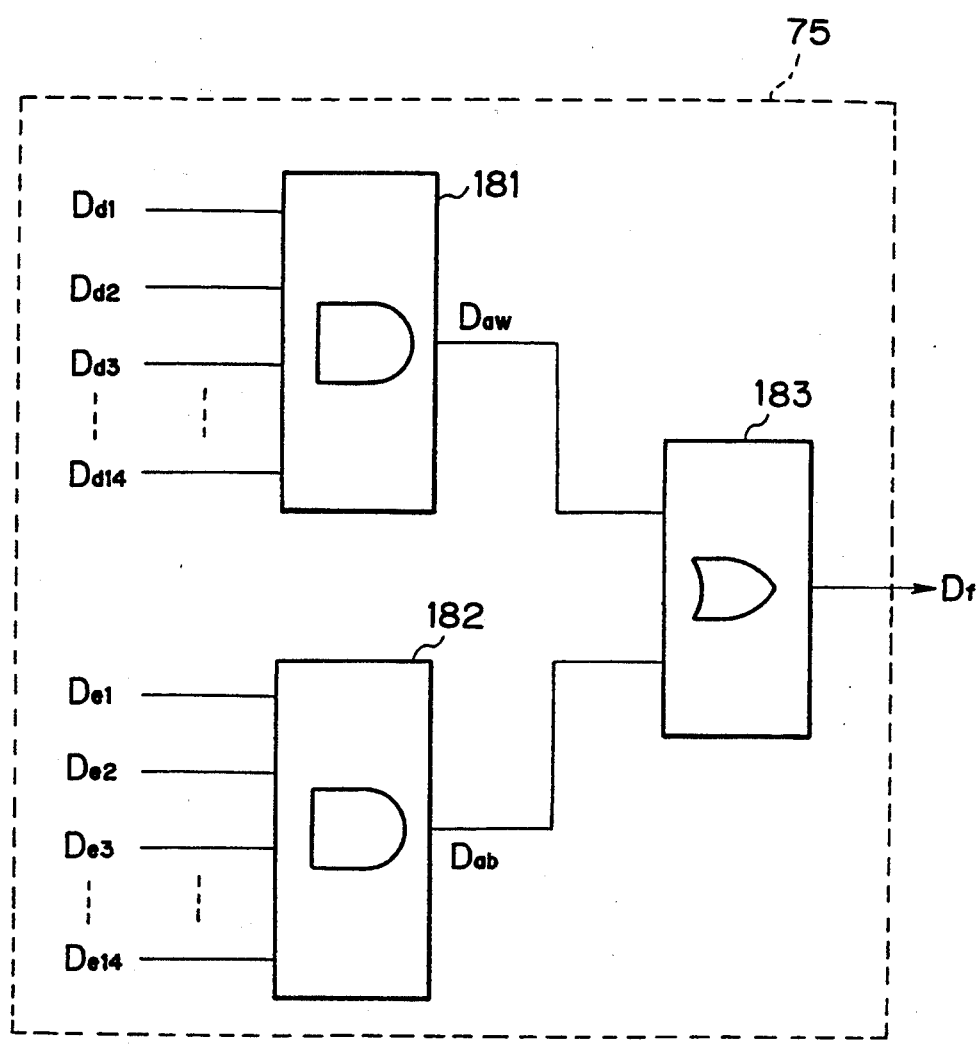
FIG. 20 is a block circuit schematically showing a specific construction of a pattern matching circuit.

FIG. 20 shows a specific construction of the pattern matching circuit 75 which is assumed to use the pattern shown in FIG. 13A. As shown, the pattern matching circuit 75 has AND gates 181 and 182 and an OR gate 183. The outputs $D_{d1}$-$D_{d14}$ of the white level detector 73 are "H" if the data of the weighed pixel being observed is smaller than the surrounding pixel data or "L" if otherwise, as stated earlier. Hence, when all the signals $D_{d1}$-$D_{d14}$ applied to the AND gate 181 are "H", i.e., when the pixel of interest is lower in density than the surrounding pixels by more than the given weight, the pixel of interest matches the pattern. Hence, the circuit 75 determines that the pixel of interest is a dot and turns a signal $D_{aw}$ from "L" to "H". Conversely, if any one of the signals $D_{d1}$-$D_{d14}$ is "L", meaning that the pixel of interest does not match the pattern, the circuit 75 determines that the pixel of interest is not a dot and turns the signal $D_{aw}$ to "L". Likewise, the outputs $D_{e1}$-$D_{e14}$ of the black level detector 74 are applied to the AND gate 182. When all the signals $D_{e1}$-$D_{e14}$ are "H", meaning that the pixel of interest is higher in density than the surrounding pixels by more than the given weight, that pixel matches the pattern. As a result, the circuit 75 determines that the pixel of interest is a dot and turns a signal $D_{ab}$ to "H". If any one of the signals $D_{e1}$-$D_{e14}$ is "L", the circuit 74 determines that the pixel of interest is not a dot and turns the signal $D_{ab}$ to "L". The signals $D_{aw}$ and $D_{ab}$ are fed to the OR gate 183. When either one of the signals $D_{aw}$ and $D_{ab}$ is "H", i.e., when the pixel of interest matches either one of the patterns and is determined to be a dot, it is finally detected as a dot. Then, the circuit 74 turns its output $D_1$ to "H". If both of the signals $D_{aw}$ and $D_{ab}$ are "L", the circuit 74 finally determines that it is not a dot and turns the signal $D_1$ to "L".

Figure 19:
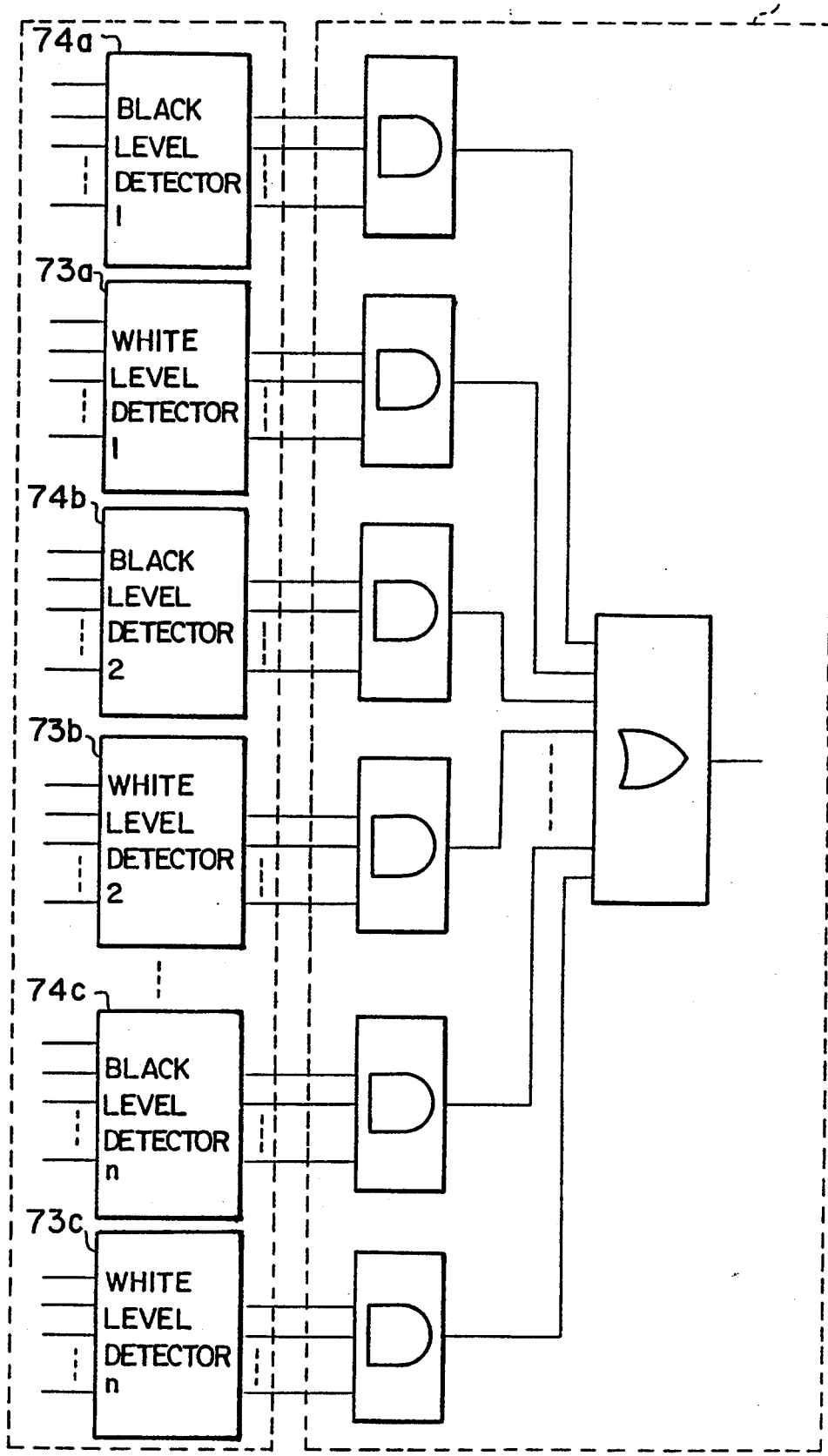
FIG. 19 is a block diagram showing a parallel arrangement of multiple black level detecting circuits and a multiple white level detecting circuits.

As shown in FIG. 19 specifically, when use is made of a plurality of patterns, an AND gate is associated with each of a plurality of black level detectors 74a–74c and a plurality of white level detectors 73a–73c to see if a pixel of interest matches a pattern. The outputs of such AND gates are fed to an OR gate. When any one of the patterns has determined that the pixel of interest is a dot, this pixel is finally determined to be a dot. If none of the patterns determines that the pixel of interest is a dot, this pixel is finally determined to be not a dot.

The first and second dot block detectors 76 and 77 each deals with a block which is made up of a plurality of pixels. The detectors 76 and 77 detect respectively a block in which one dot pixel exists (dot block 1) and a block in which a plurality of dot pixels exist. Regarding such dot blocks, it has been customary to determine a block as a dot block if even a single dot pixel exists therein. This is disadvangeous in that when one pixel existing in the block is ascribable to noise, the entire block is erroneously recognized as a dot block, as discussed earlier.

Figure 21:
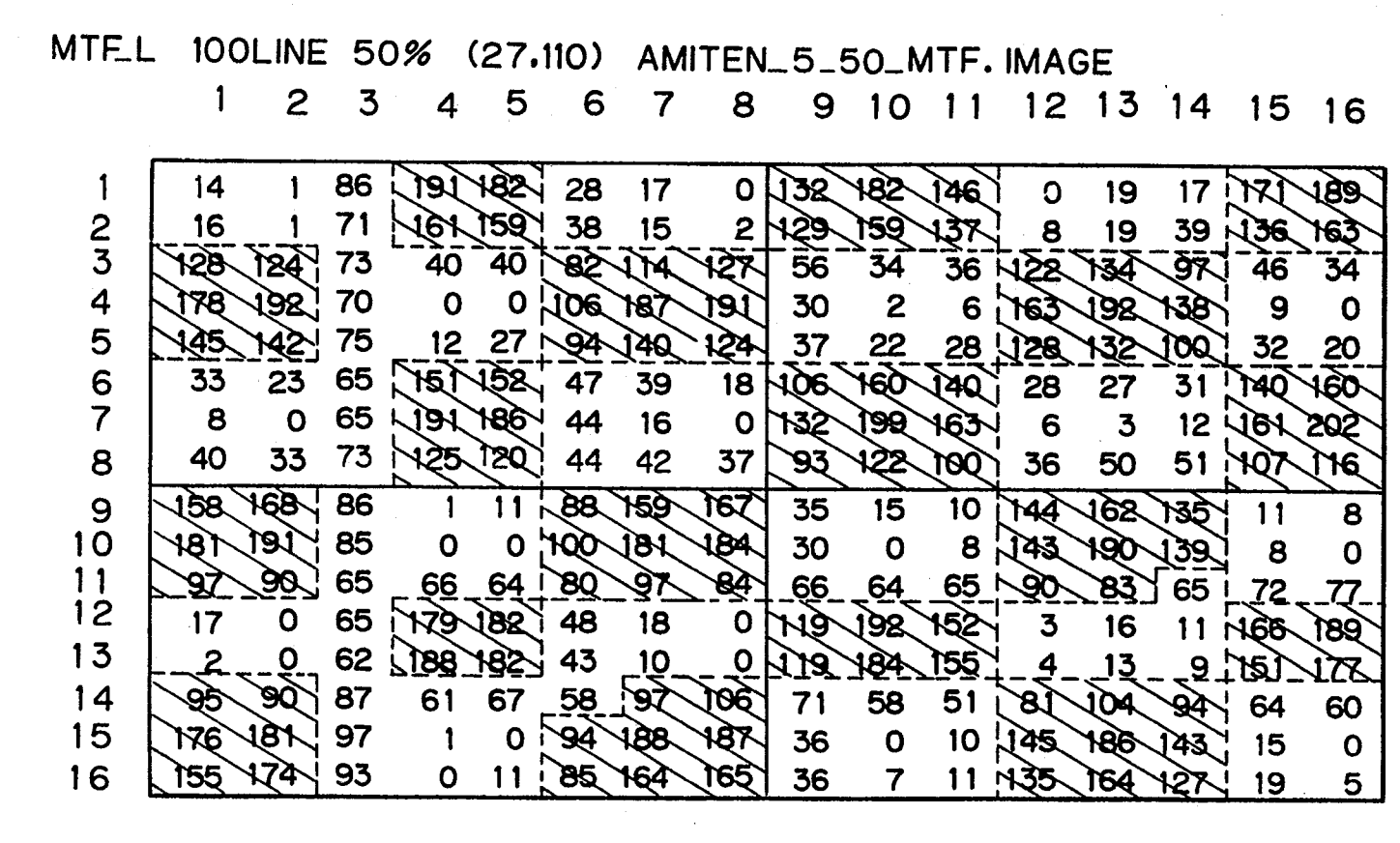

FIG. 21 shows image data representative of a 100-line dot image having a density of 50% and read at the previously mentioned rate of 400 dpi. In the figure, dots are indicated by hatching, and the numerals 1–16 printed above and at the left-hand side of the image data are indicative of pixels. As shown, the blocks each has a suitable size such as 8×8 pixels, and four to five dots exist in each of the blocks. Determining that a block having a plurality of dot pixels is a dot block is successfull in eliminating the above-stated erroneous recognition. Nevertheless, a problem is brought about when dot pixels are difficult to detect due to moire or similar cause. Specifically, when a block having a plurality of dot pixels is determined to be a dot block, a dot image portion will be erroneously determined to be a non-dot image portion. In light of this, in the illustrative embodiment, a block having a single dot pixel and a block having a plurality of dot pixels are detected as a dot block 1 and a dot block 2, respectively.

Figure 22:
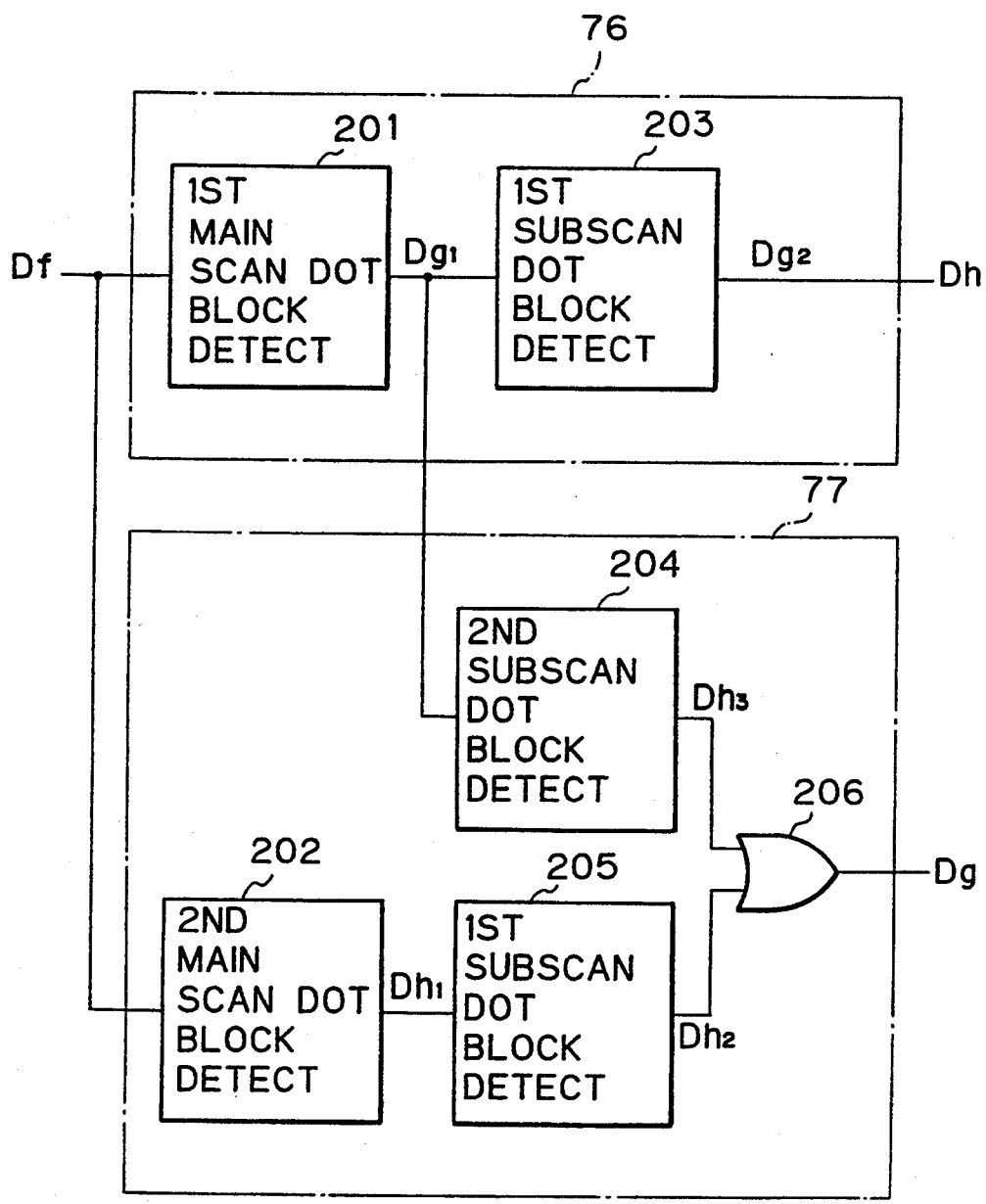
FIG.22 is a block diagram schematically showing a specific construction of a dot block detecting circuit.

FIG. 22 shows specific constructions of thr first and second dot block detectors 76 and 77. As shown, the first dot block detector 76 has a first main-scan dot block detector 201 and a first subscan dot block detector 203. The first main-scan dot block detector 201 determines whether or not a dot pixel exists in a block in the main scanning direction. The first subscan dot block detector 203 determines that a block of interest is a first dot block if even a single line having a dot pixel thereon exists therein in the subscanning direction.

The second dot block detector 77 has a second subscan dot block detector 204 which is connected to the output of the first main-scan dot block detector 201 and determines that a block of interest is a dot block 2 if a predetermined plurality of lines have dot pixels thereon. A second main-scan dot block detector 202 determines whether or not a predetermined number of dot pixels exist in a block of interest in the main scanning direction. A first sub-scan dot block detector 205 determines a block of interest to be a dot block 2 if even a single line has a predetermined number of dot pixels thereon in the subscanning direction. When either one of the first and second subscan dot block detectors 204 and 205 has detected a dot block 2, the second dot block detector 77 determines it to be a second dot block.

Figure 23:
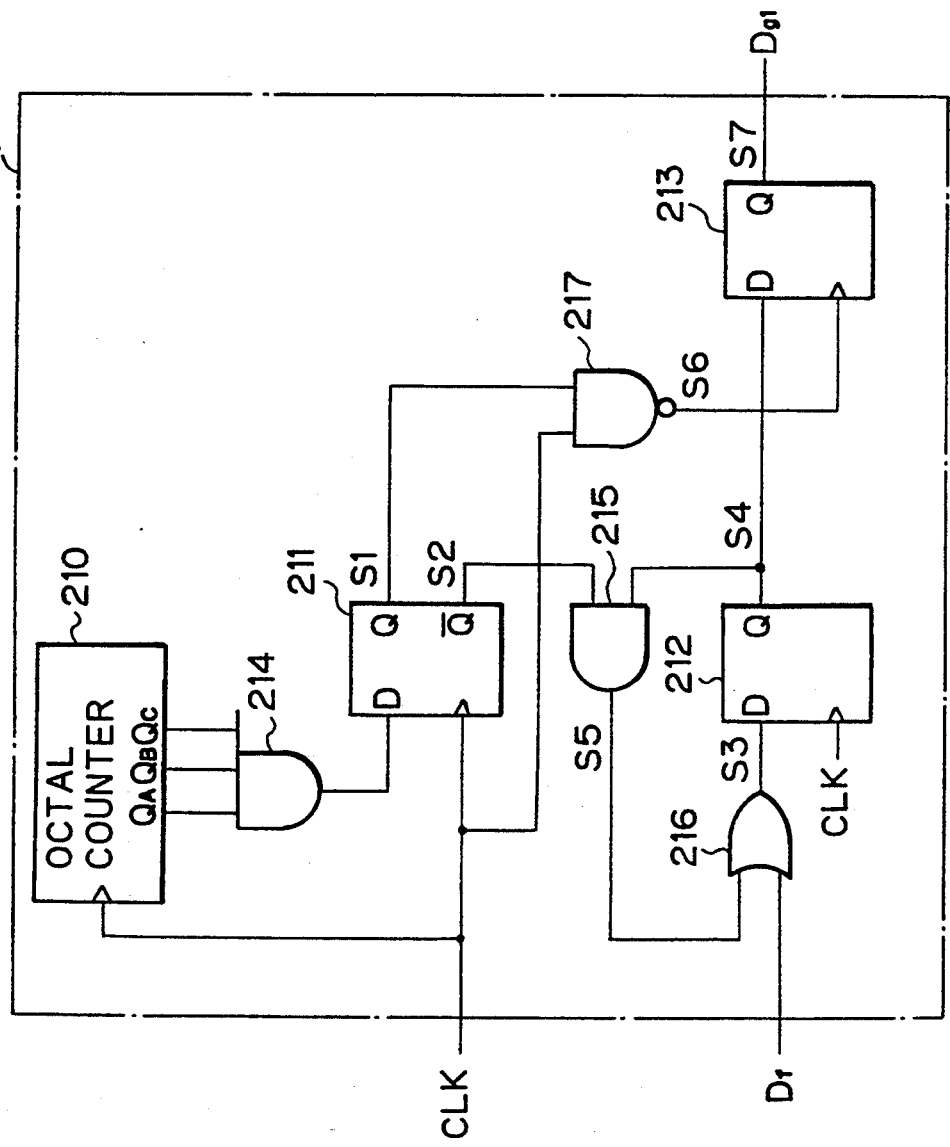
FIGS. 23 and 24 are block diagrams schematically showing a specific construction of a main-scan dot block detecting circuit.
Figure 25:
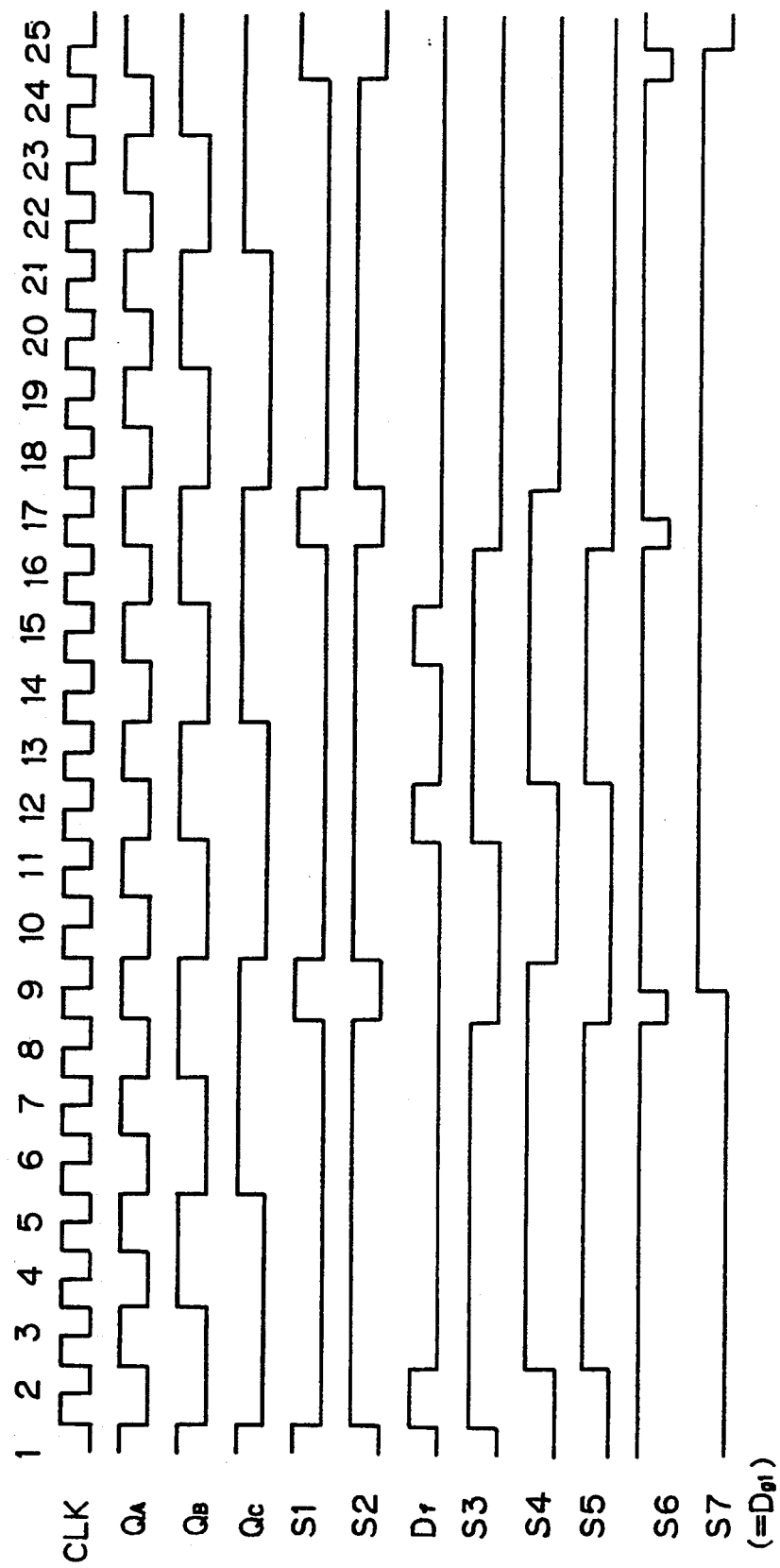
FIG. 25 is a timing chart demonstrating a specific operation of the circuit shown in FIG. 23.

The various sections constituting the first and second dot block detectors 77 will be described in detail on the assumption that each block has a size of eight pixels in the main scanning direction and eight lines in the subscanning direction, and that a second dot block should have two or more dot pixels therein. A As shown in FIG. 23, the first main-scan dot block detector 201 has an octal counter 210, flip-flops 211–213, AND gates 214 and 215, an OR gate 216, and a NAND gate 217. It should be noted that this circuitry is only illustrative and variable depending on the block size. The operation of the dot block detector 201 is shown in FIG. 25. In FIG. 25, signals S1–S7 correspond respectively to positions S1–S7 shown in FIG. 23, while the numerals printed above the signal CLK correspond to the numbers assigned to pixels.

The first main-scan dot block detector 201 determines whether or not any one of eight pixels of a block as viewed in the main scanning direction is a dot pixel. The outputs $Q_a$–$Q_c$ of the octal counter 210 are sequentially changed every time the reference signal CLK arrives, as shown in FIG. 25. As such outputs $Q_a$–$Q_c$ are applied to the AND gate 214, the outputs S1 and S2 of the flip-flop 211 turn to "H" or "L" every eight clock pulses. Assume that the second pixel, for example, is determined to be a dot pixel and, therefore, the signal $D_f$ is "H". Then, the output S3 of the OR gate 216 is "H" with no regard to the output S5 of the AND gate 215, so that this signal is latched at the next positive-going edge of the signal CLK. As a result, the output S4 of the flip-flop 212 turns from "L" to "H". As the signals S4 and S2 are applied to the AND gate 215, the AND gate 215 produces a signal S5 which is "H". This signal S5 is fed to the OR gate 216 with the result that the signal S3 and, therefore, the signal S4 is "H" with no regard to the status of the signal $D_f$. At the ninth pixel, the signal S2 turns to "L". Hence, when the signal $D_f$ is "L", the signal S3 turns to "L" and, at the next positive-going edge of the signal CLK, latched to in turn change the signal S4 to "L". When the signals S1 and CLK are applied to the NAND gate 217, the NAND gate 217 prodeus an output S6 which is shown in FIG. 25. This signal S6 is fed to the clock terminal of the flip-flop 213 with the result that the signal S4 is latched at the positive-going edge of the signal S6. As a result, when the signal S4 is "H", i.e., when a dot exists in any one of the eight pixels, the signal S7 is "H". Conversely, when the signal S4 is "L", meaning that no dots exist in the eight pixels, the signal S7 is "L".

In FIG. 25, it is assumed that that two dot pixes exist among the ninth to sixteenth pixels, and that no dot pixels exist among the seventeenth to twenty-fourth pixels by way of example.

Figure 24:
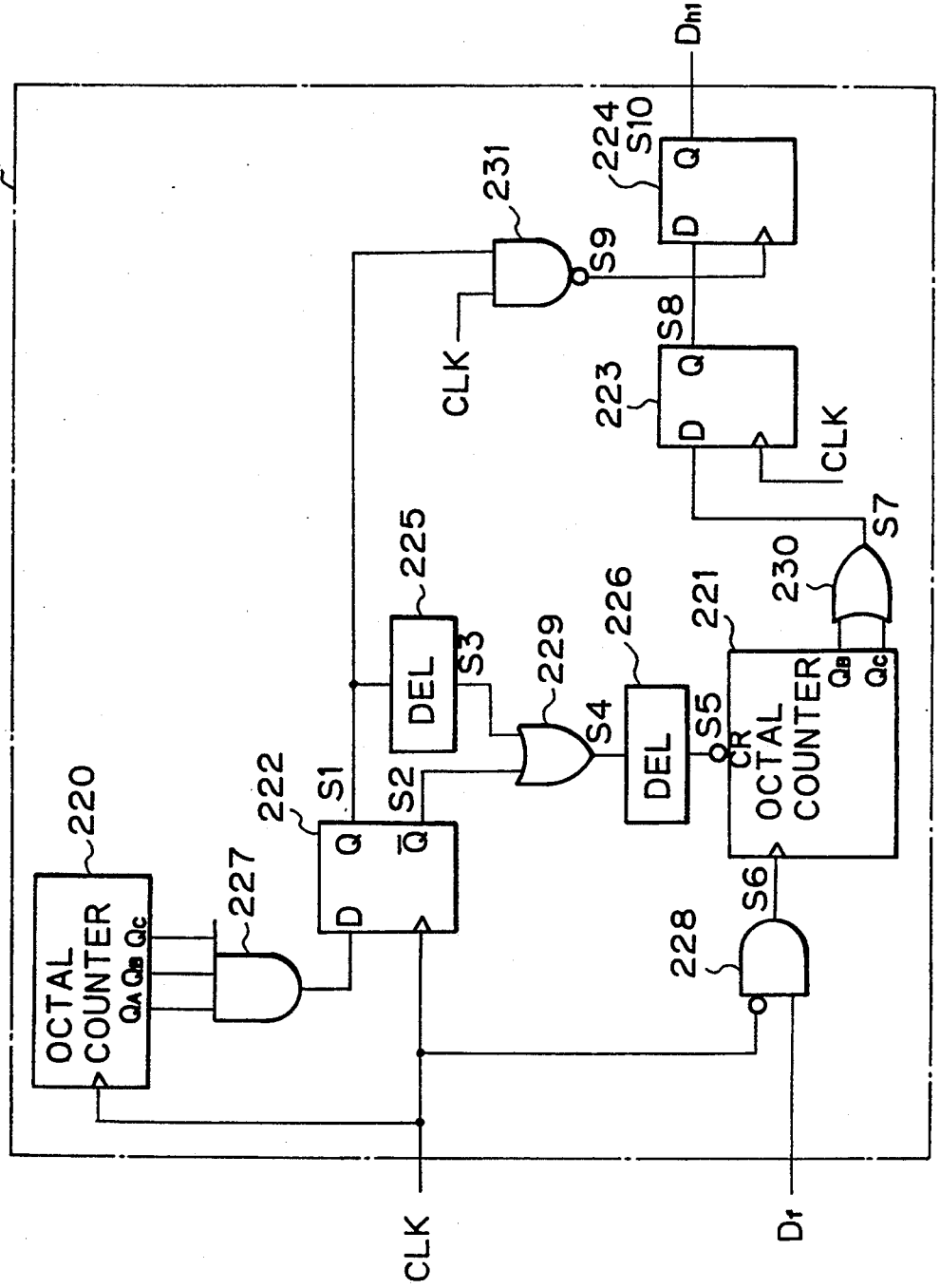
Figure 26:
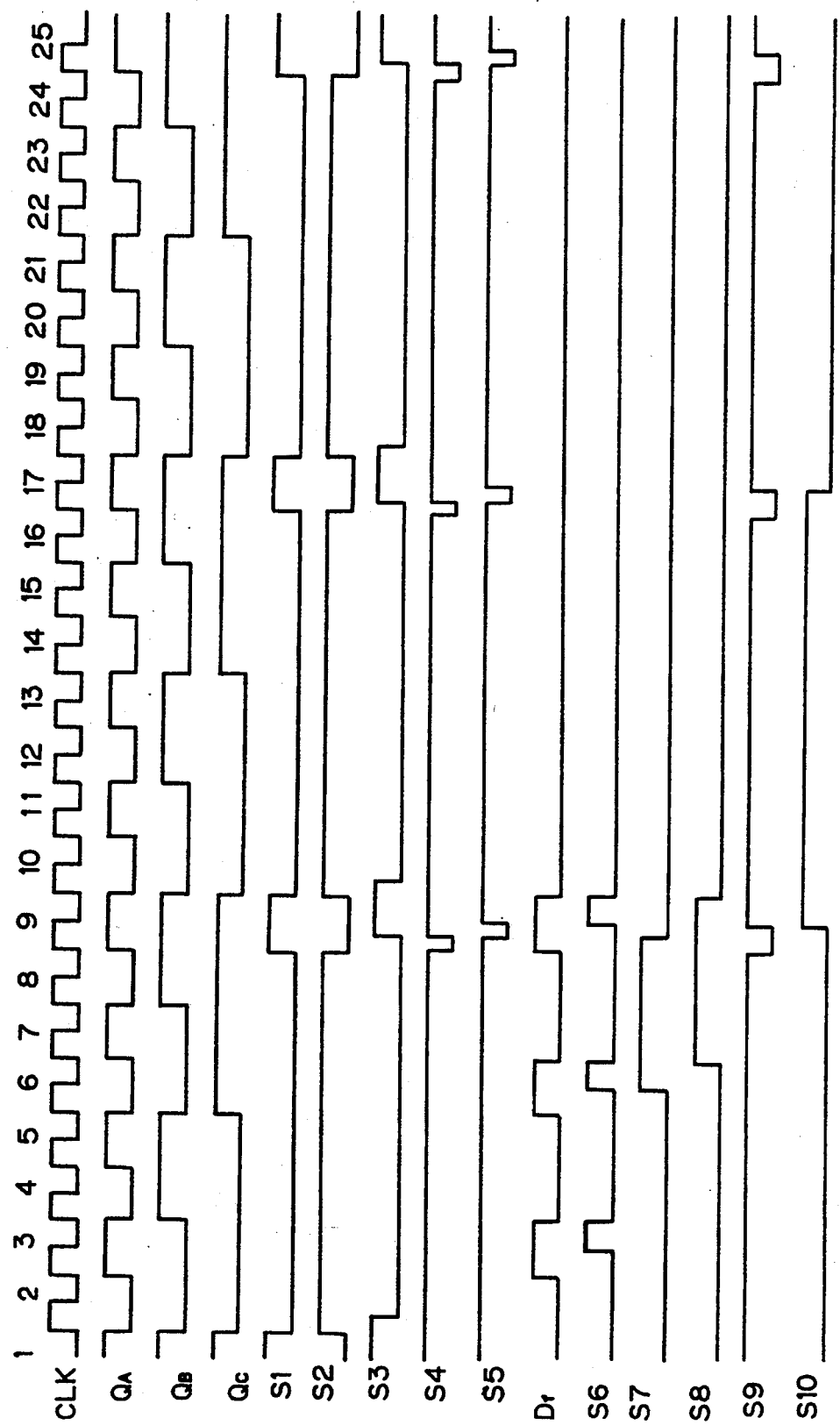
FIG. 26 is a timing chart representative of a specific construction of the circuit shown in FIG. 24.

As shown in FIG. 24, the second main-scan dot block detector 202 has octal counters 220 and 221, flip-flops 222–224, delays 225 and 226, AND gates 227 and 228, OR gates 229 and 230, and an NAND gate 231. This circuit is also variable in matching relation to the block size. FIG. 26 demonstrates the operation of this circuit. In FIG. 26, signals S1–S10 correspond respectively to the positions S1–S10 shown in FIG. 24, and numerals printed above the signal CLK correspond to pixels.

The second main-scan dot block detector 202 determines whether or not two or more of eight pixels of a block in the main scanning direction are dot pixels. The outputs $Q_a$–$Q_c$ of the octal counter 220 sequentially change every time the reference signal CLK arrives, as shown in FIG. 26. These signals $Q_a$–$Q_c$ are applied to the AND gate 227, so that the outputs S1 and S2 of the flip-flop 222 turn to "H" or "L" every clock pulses. Assume that the third and sixth pixels are determined to be dots and, therefore, the signal $D_f$ is "H". Then, as the signals $D_f$ and the inverted signal CLK are fed to the AND gate 228, the output S6 of the AND gate 228 is the inverted signal CLK when the signal $D_f$ is "H". When this signal S6 is applied to the clock input of the octal counter 221, the outputs $Q_b$ and $Q_c$ of the counter 221 both are "L" and, therefore, the output S7 of the OR gate 230 is also "L". However, when the signal S6 turns to "H" again, the output $Q_b$ of the counter 221 turns to "H" with the result that the signal S7 changes to "H". As the signal S7 is latched at the next positive-going edge of the signal CLK, the output S8 of the flip-flop 223 turns to "H". Thereafter, the output $Q_b$ remains in "H" until the counter 221 has been cleared, maintaining the signal S8 in "H". As the signals S1 and CLK are applied to the NAND gate 231, the output S9 of the NAND gate 231 changes as shown in FIG. 26. When this signal S9 is fed to the clock input of the flip-flop 224, the signal S8 is latched at the positive-going edge of the signal S9. Hence, when the signal S8 is "H", meaning that two or more of the eight pixels are dot pixels, the output S10 of the flip-flop 224 is "H". When only one of the eight pixels is a dot pixel or when none of them is a dot pixel, the output S10 of the flip-flop 224 is "L". The signal S1 is applied to the delay 225 which then produces an output S3. This signal S3 and the signal S2 are fed to the OR gate 229. The resultant output S4 of the OR gate 229 is fed to the delay 226 to produce a signal for clearning the counter 221, i.e., the output of the delay 226 is applied to the clear terminal (CR) of the counter 221. In FIG. 25, it is assumed that one of the ninth to sixteen pixels is a dot pixel, and the seventeenth to twenty-fourth pixels are no dot pixels.

Figure 27:
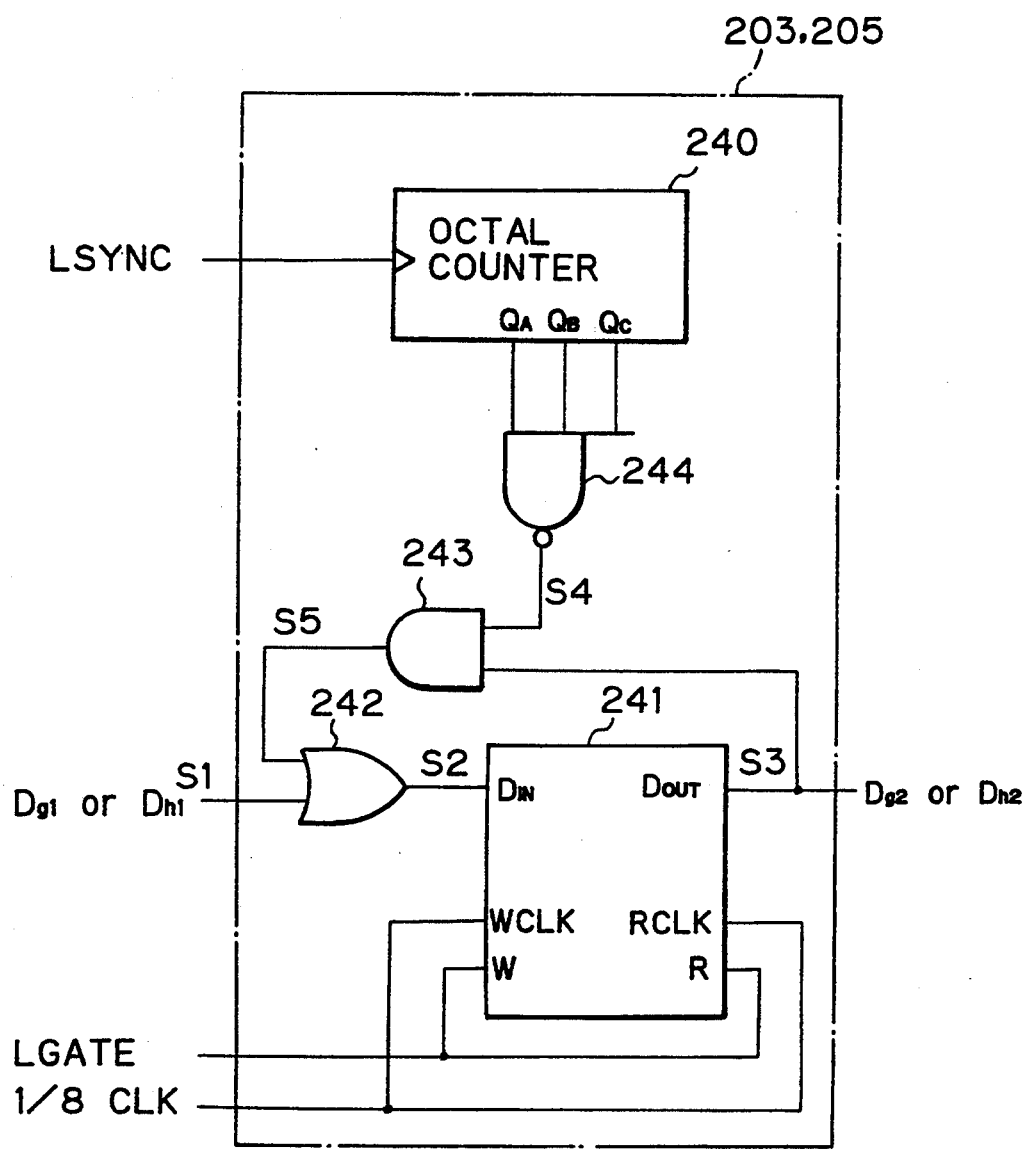
FIG. 27 is a schematic block diagram showing a specific construction of a first subscan dot block detecting circuit.
Figure 28:
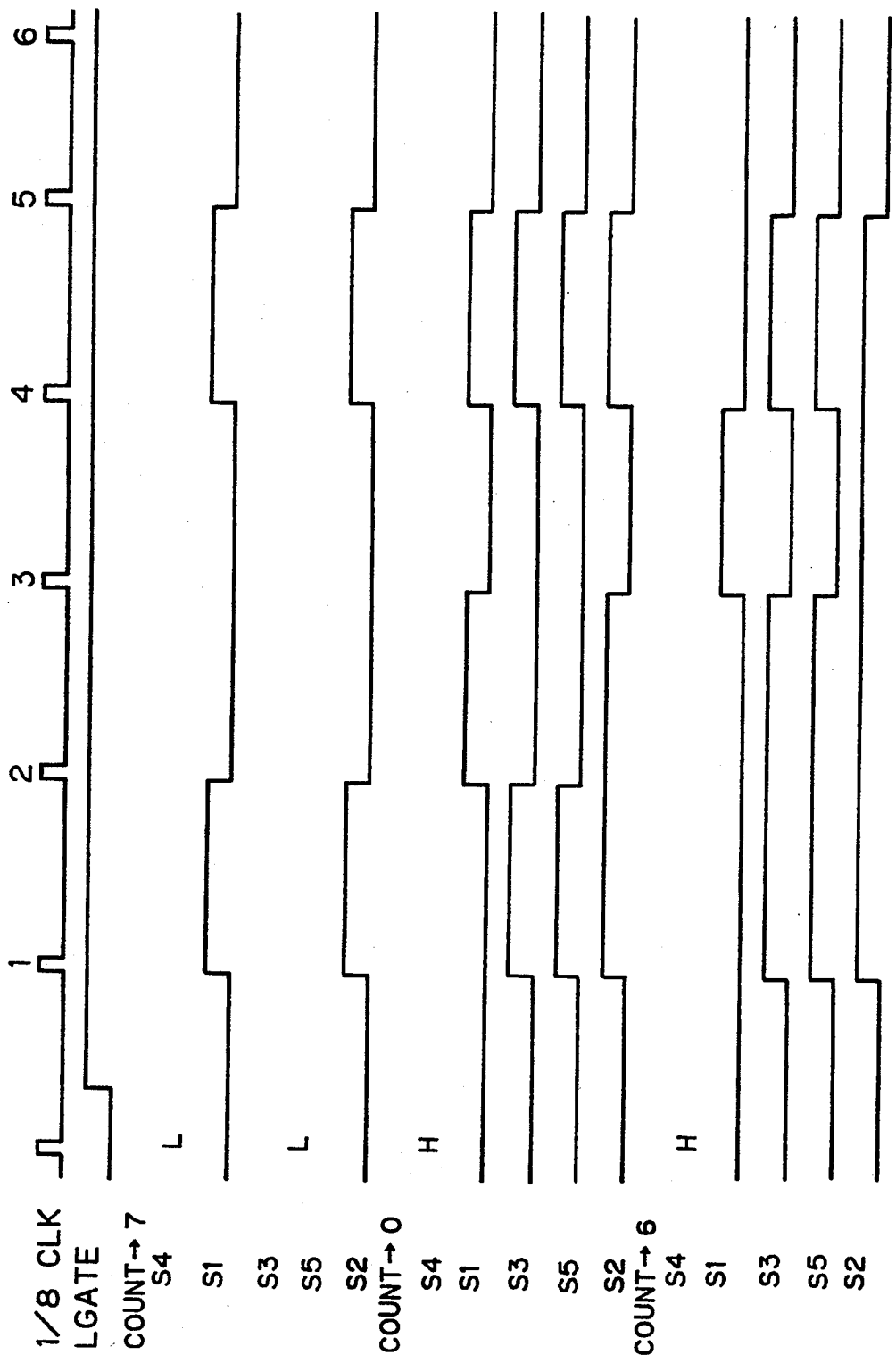
FIG. 28 is a timing chart indicative of a specific operation of the circuit shown in FIG. 27.

FIG. 27 shows a specific construction of the fist sub-scan dot block detector 203 or 205 (represented by 203 hreinafter). As shown, this circuit 203 has an octal counter 240, a memory 241, an OR gate 242, an AND gate 243, and a NAND gate 244. FIG. 28 is a timing chart demonstrating the operation of this circuit. In FIG. 28, signals S1–S5 correspond to the positions S1–S5 shown in FIG. 27, and the numerals printed above the signal ⅛ CLK correspond to the blocks.

After the first main-scan dot block detector 201 has determined whether or not any one of eight pixels in the main scanning direction is a dot pixel or after the second main-scan dot block detector 202 has determined whether or not two or more of the eight pixels are dot pixels, the first subscan dot block detector 203 determines whether or not at least one of eight lines in the subscanning direction has a dot pixel thereon. If the result of decision is positive, the detector 203 determines the block of interest to be a dot block 1. When two or more dot pixels exist on at least one of the eight lines, the detector 203 determines the block of interest to be a dot block 2.

Specifically, regarding the detection of the first dot block, the octal counter 240 is sequentially incremented every time the signal LSYNC arrives. The outputs $Q_a$–$Q_c$ of the counter 240 are applied to the NAND gate 244 to produce a signal S4. Assuming that the output of the counter 240 is "7", then the outputs $Q_a$–$Q_c$ of the counter 240 are "H" and, therefore, the signal S4 is "L". Assume that the output S1 (=$D_{g1}$) of the first main-scan dot block detector 203 indicates that a dot pixel exists in the first and fourth blocks, i.e., the output S1 is "H". Then, the signal S4 is "L" with no regard to the output S3 of the memory 241, so that the output S5 of the AN gate 243 is "L". The signals S1 and S5 are applied to the OR gate 242 to produce a signal S2. Then, the operation advances to the next line. If the output of the counter 240 is "0", the signal S4 is "H". Assuming that the signal S1 is "H" at the second and fourth blocks, then the output S3 of the memory 241 is the output signal S2 of the OR gate 242 having been latched by ⅛ CLK on the immediately peceding line, i.e., the signal which was "H" at the first and fourth blocks. Since the signal S4 is "H", the signal S3 is directly outputted as the signal S5. As a result, the output S2 of the OR gate 242 is "H" at the first, second and fourth blocks.

Assuming that the counter has reached "6", then the signal S4 turns to "H". Assume that the signal S1 has become "H" at the third block for the first time, including the preceding seven lines. Then, since the signal S4 is "H", the signal S3 having been stored in the memory 241 is directly outputted as the signal S5 and, therefore, the signal S2 is "H" at the first to fourth blocks. This signal S2 is latched by the signal ⅛ CLK and then outputted as the output S3 of the memory 241 on the next line. Consequently, when the signal S1 is "H" on at least one of the eight lines in the scanning direction, meaning that a dot pixel exists among the eight pixels in the main scanning direction, this result is held and the block of interest is determined to be a dot block 1. Conversely, when none of the eight lines has a dot pixel, i.e., when the signal S1 is "L", this state is held and this block is determined to be a non-dot block. On the next line, as the counter reaches "7" again, the signal S4 goes "L" with the result that the memory 241 is cleared.

The second dot block is detected in the same manner as the first dot block except that the signal S1 is replaced with a signal $D_{h1}$.

Figure 29:
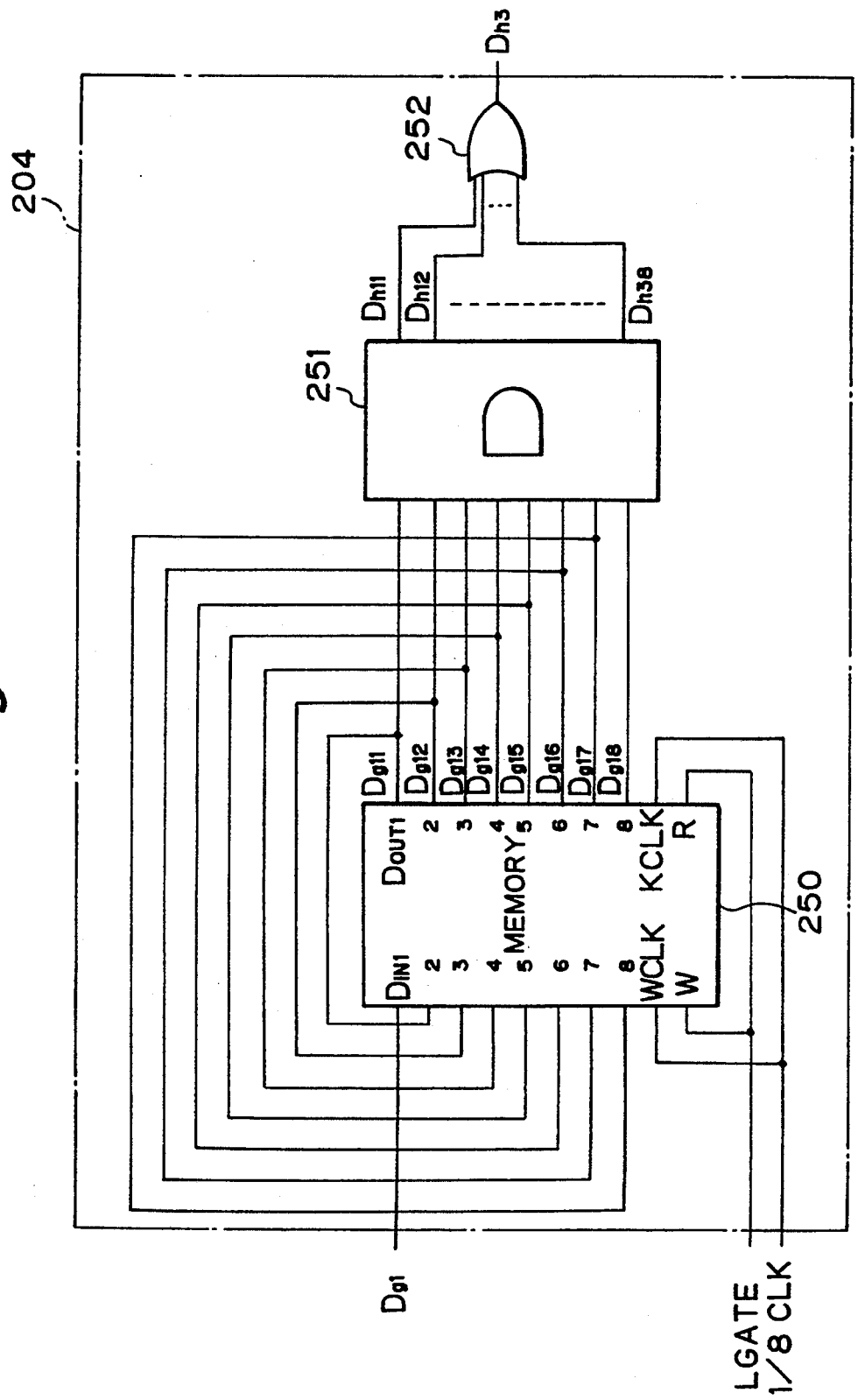
FIG. 29 is a block diagram schematically showing a specific construction of a second subscan dot block detecting circuit.
Figure 30:
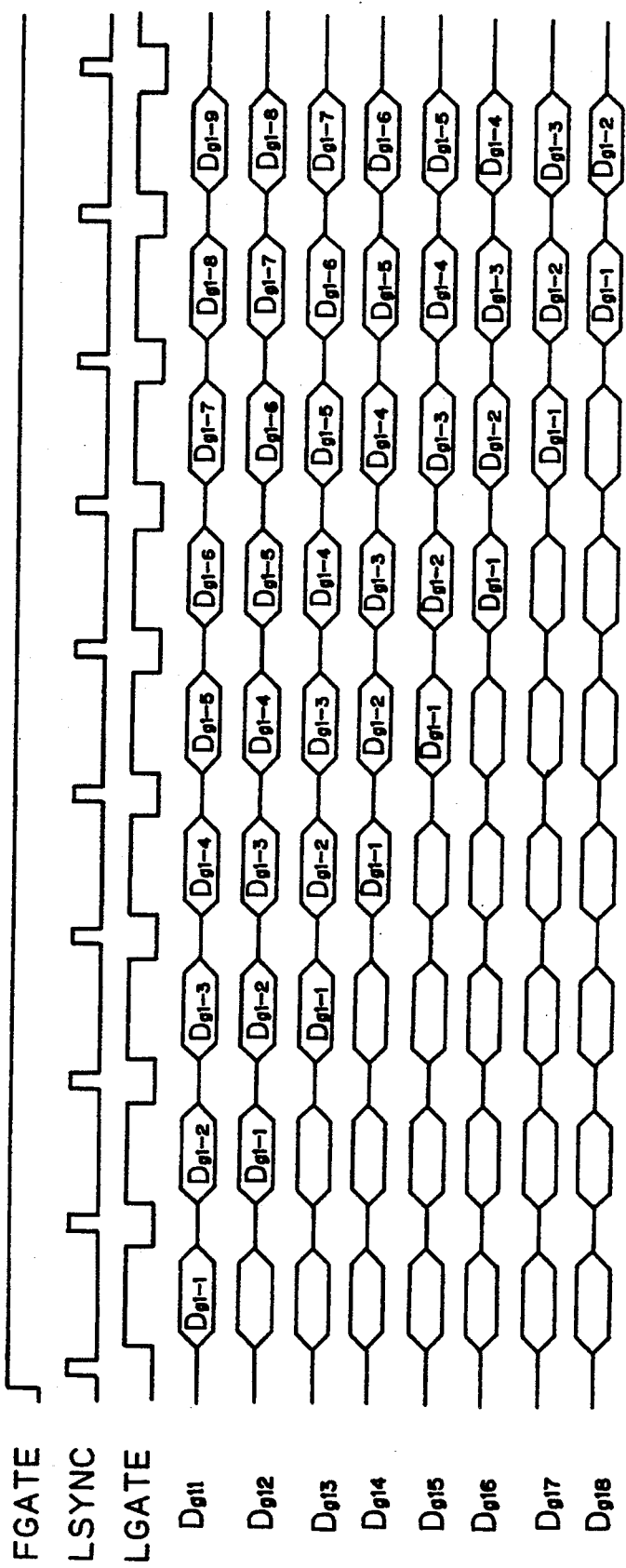
FIG. 30 is a timing chart demonstrating a specific operation of a memory included in the circuit of FIG. 29.
Figure 31:
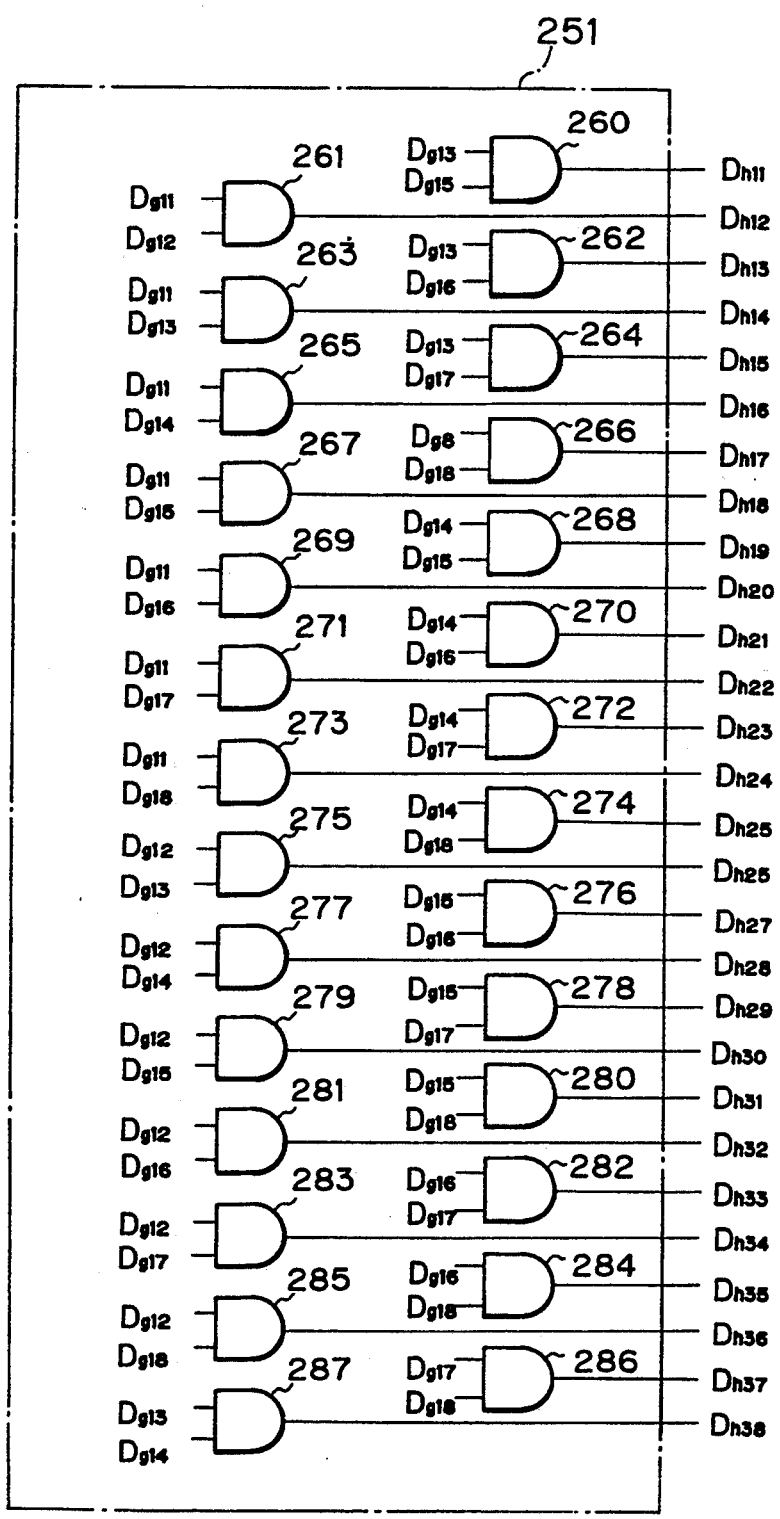
FIG. 31 is a circuit diagram showing a specific arrangement of an AND gate block included in the circuit of FIG. 29.
Figure 32:
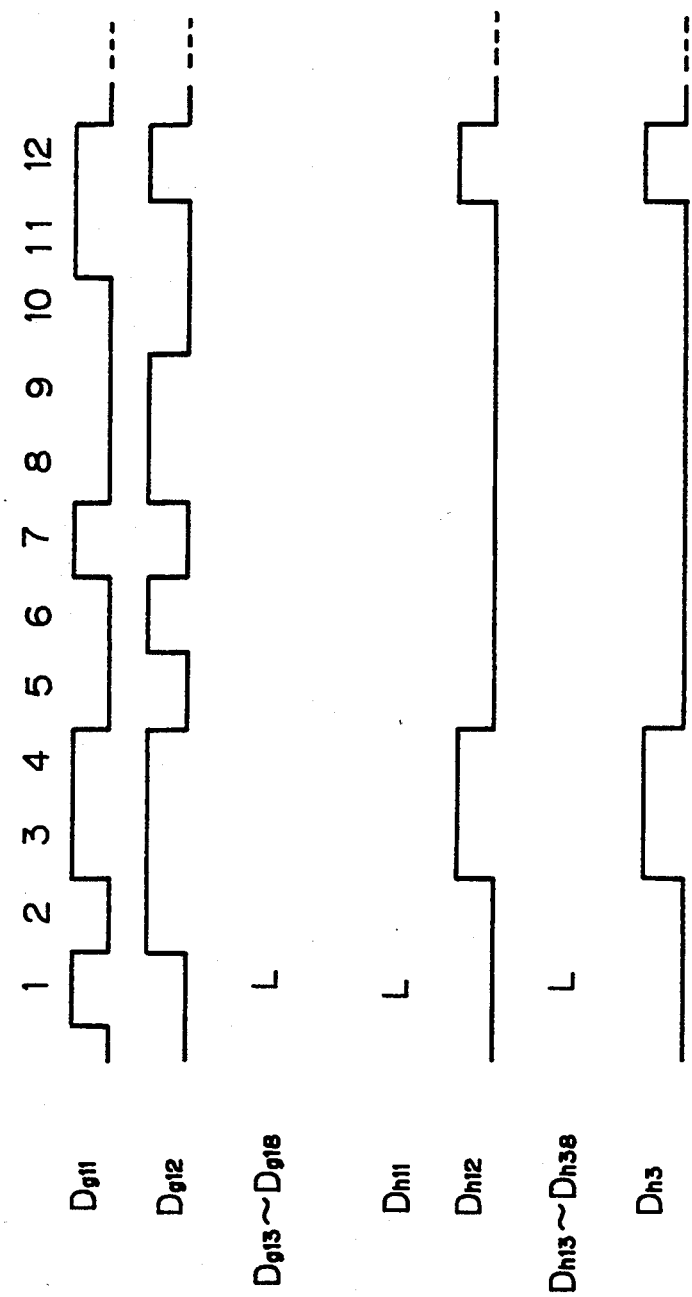
FIG. 32 is a timing chart representative of a specific operation of the circuit of FIG. 31.
Figure 33:
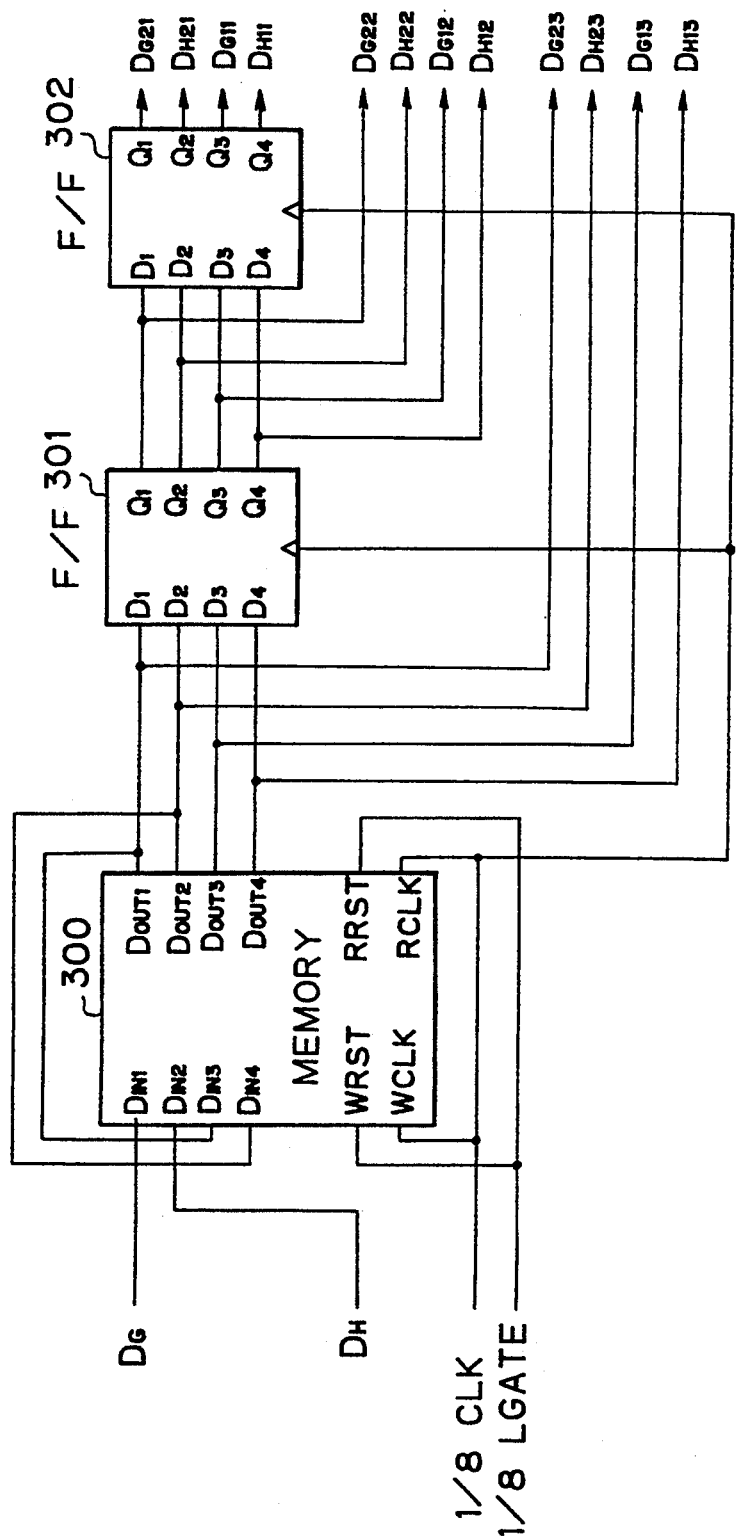
FIGS. 33, 34, 35 and 36 are block diagrams showing a specific construction of circuitry for identifying a dot area.

FIG. 29 shows a specific construction of the second subscan dot block detector 204. As shown, this detector 204 has a memory 250, an AND gate block 251, and an OR gate 252. As shown in FIG. 31, the AND gate block 251 is made up of a plurality of AND gates 260–287. Such circuitry is only illustrative and may be changed or modified, as desired. FIG. 30 shows the operation up to the output of the memory 250, while FIG. 32 shows the operation from the output of the AND gate block 251 to the output of the OR gate 252.

In operation, the output $D_{g1}$ of the first main-scan dot block detector 201 indicative of whether or not any one of the eight pixels in the main scanning direction is a dot pixel is applied to an input $D_{in1}$ of the memory 250. The output $D_{out1}$ of the memory 250 is fed back to an input $D_{in2}$. In the same manner, the output $D_{out2}$ is fed back to the input $D_{in3}$, the output $D_{out3}$ is fed back to the input $D_{in4}$, and so on. After the output $D_{g-1}$ of the first main-scan dot block detector 201 which is associated with the first line has been applied to the input $D_{in1}$, the output $D_{g1-2}$ associated with the second line is applied to the same input $D_{in1}$. As a result, the signal $D_{g1-1}$ appears on the output $D_{out2}$ after being delayed by one line.

Thereafter, signals $D_{g1-3}$, $D_{g1-4}$ and so on associated with the third line and successive lines are sequentially applied to the input $D_{in1}$. When a signal $D_{g1-8}$ associated with the eighth line arrives, signals $D_{g11}$–$D_{g18}$ appearing on the outputs $D_{out1}$–$D_{out3}$ are the first to eight line signals $D_{g1-1}$–$D_{g1-8}$, i.e., signals representative of eight lines in the subscanning direction are produced. The signals $D_{g11}$–$D_{g18}$ are fed to the AND gate block 251. As shown in FIG. 31, the AND gate block 251 ANDs each two of the signals $D_{g11}$–$D_{g18}$. Assume that the signal $D_{g11}$ turns to "H" at the first, third, fourth, seventh, eleventh and twelfth blocks while the signal $D_{g12}$, turns to "H" at the second, third, fourth, sixth, eighth, ninth and twelfth blocks due to the presence of dot pixels, and that the signals $D_{g13}$–$D_{g18}$ are "L" due to the absence of dot pixels. Then, when, among the output signals $D_{h11}$–$D_{h38}$, the signal $d_{h12}$ as well as the signals $D_{g11}$ and $D_{g12}$ is "H" at the third, fourth and twelfth blocks, it is indicated that at least two dot pixels exist in the third, fourth and twelfth blocks. As a result, the third, fourth and twelfth blocks are determined to be dot blocks 2. The other signals are "L" since none of the associated blocks is "H" on two lines. As the signals $D_{h11}$-$D_{h38}$ are fed to the OR gate 252, the third, fourth and twelfth blocks are determined to be dot blocks 2 since the signal $D_{h12}$ is "H" at such blocks.

Figure 36:
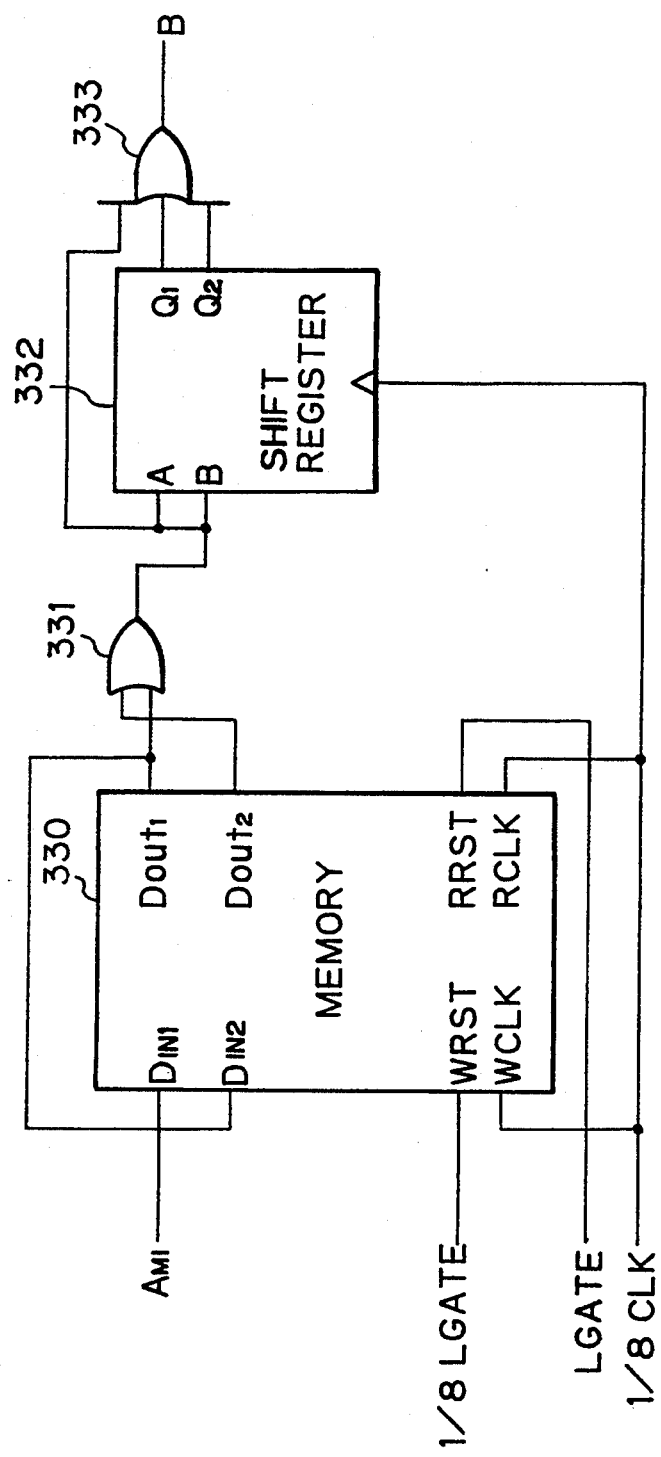
Figure 37:
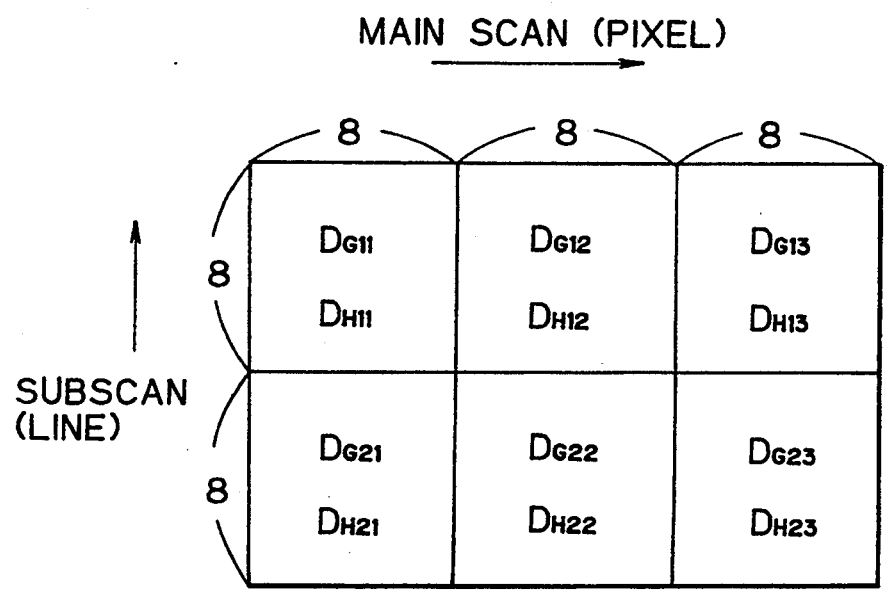
FIG. 37 shows six blocks (area)
Figure 38A:
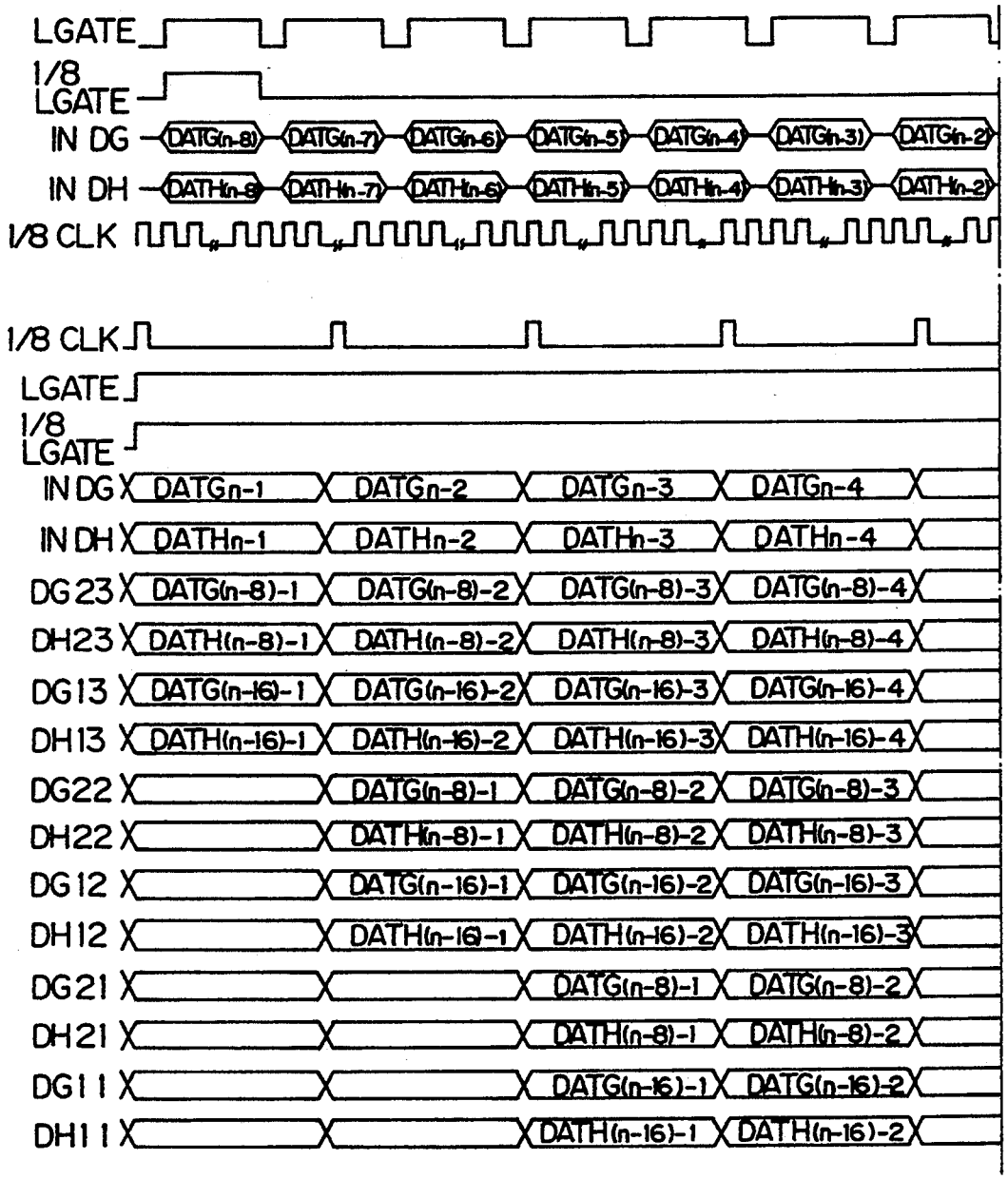
FIGS. 38 an 39 are timing charts demonstrating a specific operation of the circuitry shown in FIGS. 33 through 36.
Figure 38B:
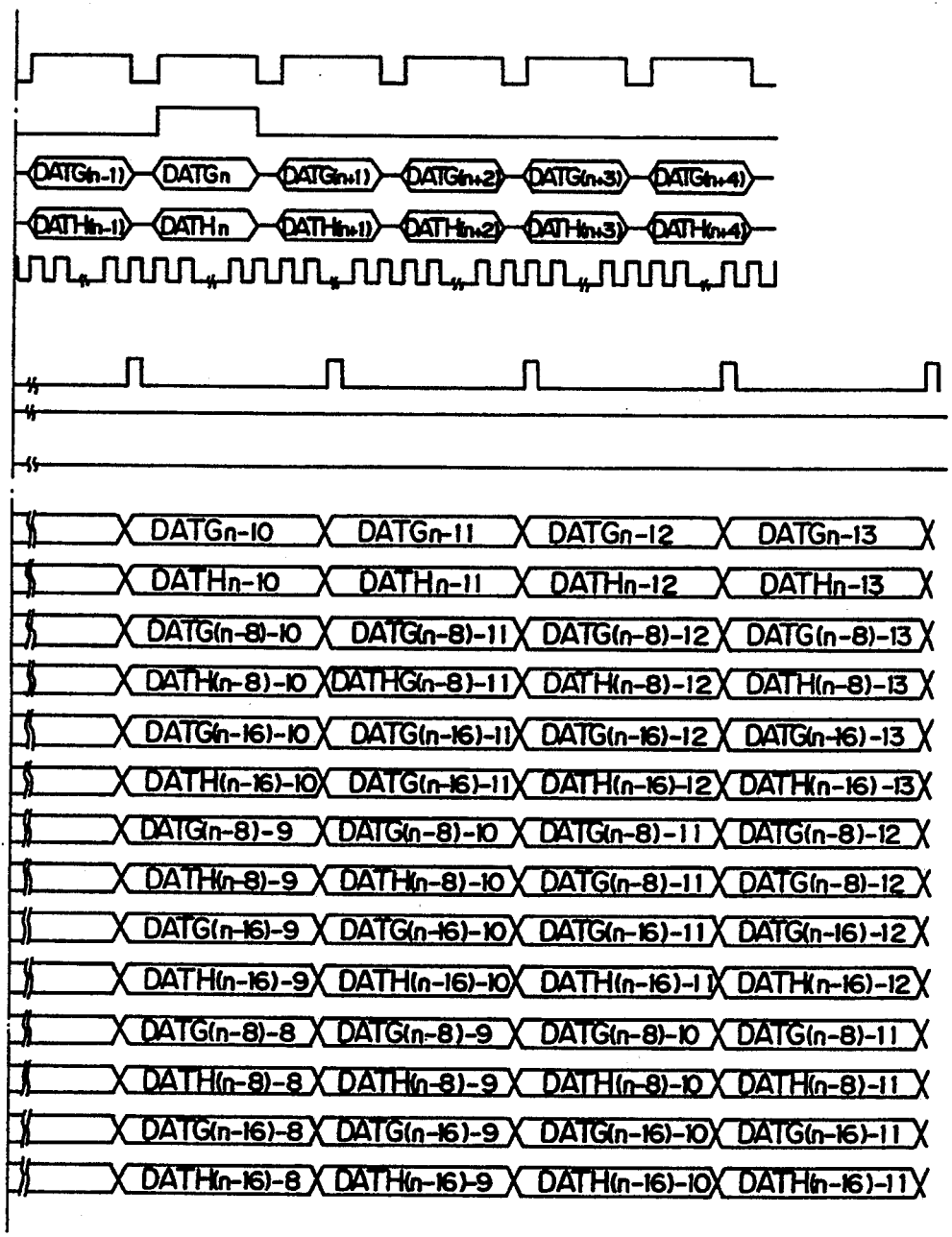

Referring to FIGS. 33 through 36, there will be described a specific circuit which, on receiving 1-dot dot block information DG and a 2-dot dot block information DH produced by the above-described circuitry, determines whether or not an area of interest is a dot area on the basis of DGs and DHs of six blocks in total, as shown in FIG. 37. Let the six blocks be collectively referred to as an area hereinafter. FIGS. 38 and 39 are timing charts demonstrating a specific operation of such a circuit.

In FIGS. 33 through 36, there are shown FIFO RAMs 300 and 330, multi-input D flip-flops 301 and 302, multi-input AND gates 303–317 and 319–325, multi-input OR gates 318, 326, 327, 329 and 333, and AND gate 328, an OR gate 331, and a shift register 332.

As shown in FIG. 38, this circuit receives the signals LGATE, ½ LGATE, ⅛ CLK, IN.DG and IN.DH (1-dot and 2-dot dot block information fed to DG and DH, FIG. 33) from the previously described circuit. Among upper five signals (LGATE, ½ LGATE, IN.DG, IN.DH and ⅛ CLK), the signals IN.DG and IN.DH have respectively portions labeled DATGn and DATHn which are shown in detail below the upper five signals in the figure. Assume that the signal IN.DG is 1, 2, 3, ..., 10, 11, 12, 13, ..., n every eight pixels on the "n" line, i.e., DATGn-1, DATGn-2, DATGn-3, DATGn-4, ..., DATGn-10, DATGn-11, DATGn-12, ..., n. Likewise, assume that the signal IN.DH is DATHn-1, DATHn-2, DATHn-3, DATHn-4, ..., DATHn-10, DATHn-11, DATHn-12, DATHn-13. Regarding the FIFO RAM 300, a read/write CLK is ⅛ CLK, and a write reset signal and a read reset signal each is ½ LGATE. Specifically, assuming that data applied to an input $D_{in1}$ is DATGn-1, the values written in at the time when the immediately preceding signal ½ LGATE turned to "H", i.e., data [DATG(n-8)-1] are sequentially read out of the FIFO RAM 300 in synchronism with the signal ⅛ CLK.

As a result, signals DG 23, DH23, DG13 and DH13 are produced. The multi-input D flip-flop 301 converts signals DG2, DH23, DG13 and DH13 to signals DG22, DH22, DG12 and DH12 by being clocked by ⅛ CLK. Likewise, the multi-input D flip-flop 302 converts signals DG22, DH22, DG12 and DH12 to signals DH21, DH21, DG11 and DH11. As a result, the 1-dot and 2-dot dot information DG and DH of the individual blocks of the area shown in FIG. 37 are outputted on the same time axis and fed to a dot area discriminating circuit which follows. Regarding the timings shown in FIG. 38, after the signal ½ LGATE has turned to "H" on the "n" line, eight pixels are counted. Then, the above procedure will be understood from the fact that when the third DATGn-3 and DATHn-3 are inputted:

the third DATG(n-8)-3 DATH(n-8-3) are produced from DG23 and DH23 after the signal ½ has turned to "H" eight lines before the "n" line;

DATG(n-8)2 and DATH(n-8)-2 which are one ⅛ CLK before DG22 and D22 (second after the turn of ½ LGATE to "H") are produced from DG22 and DH22;

the first DATG(n-8)-1 and DATH(n-8)-1 are produced from DG21 and DH21 after the signal ½ LGATE has turned to "H";

the third DATG(n-16)-3 and DATH(n-16)-3 are produced from DG13 and DH13 after the signal ½ LGATE has turned to "H" sixteen lines before the "n" line;

DATG(n-16)-2 and DATH(n-16)-2 are produced from DG12 and DH12; and

DATG(n-16)-1 and DATH(n-16)-1 are produced from DG11 and DH11.

The circuit determines an area of interest is a dot area if the area shown in FIG. 37 satisfies either one of the following conditions:

1) four of the 2-dot dot information DH are "H", and one or more of the 1-dot dot information are "H"; and 2) five or more of the 2-dot dot information DH are "H".

Of course, the above two conditions are not limitative and may be changed depending on the system.

A plurality of dot detection signals exist in a dot block, as stated earlier. While the dot area detecting section may effect 2-dot dot detection, DH, with the six dot blocks, a dot document suffers from moire due to the particular reading pitch of the CCD line sensor 10. Moire sometimes prevents a block having dots therein from being detected as a dot block. Moreover, part of a character or a spot on the background is sometimes determined to lie in a dot area. The 1-dot dot detection, therefore, aggravates such erroneous detection when used alone, while the 2-dot detection prevents a dot area from being detected when effected alone. For this reason, the 1-dot and 2-dot dot detection blocks and, further, blocks where no dots are detected are combined.

Figure 34:
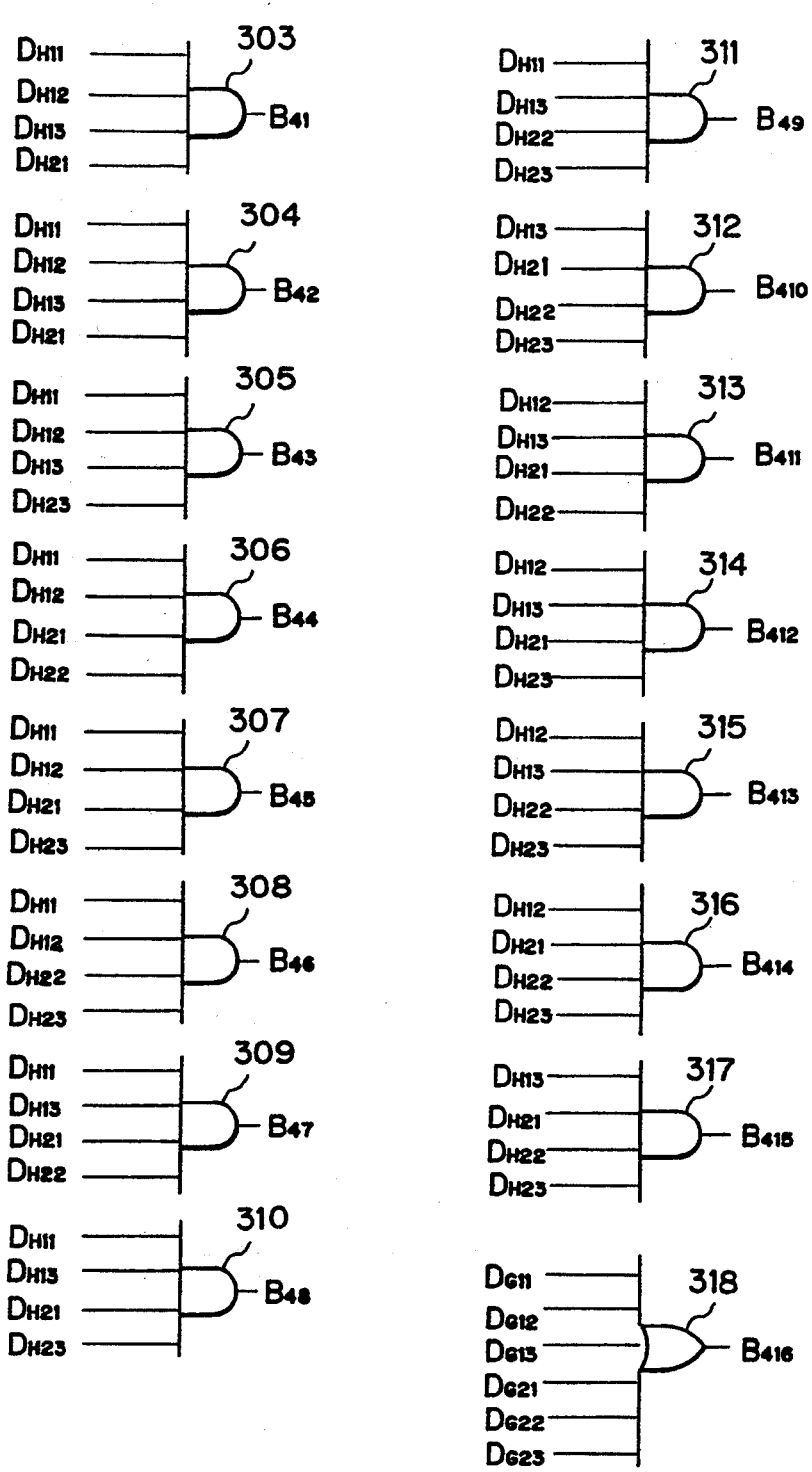
Figure 35:
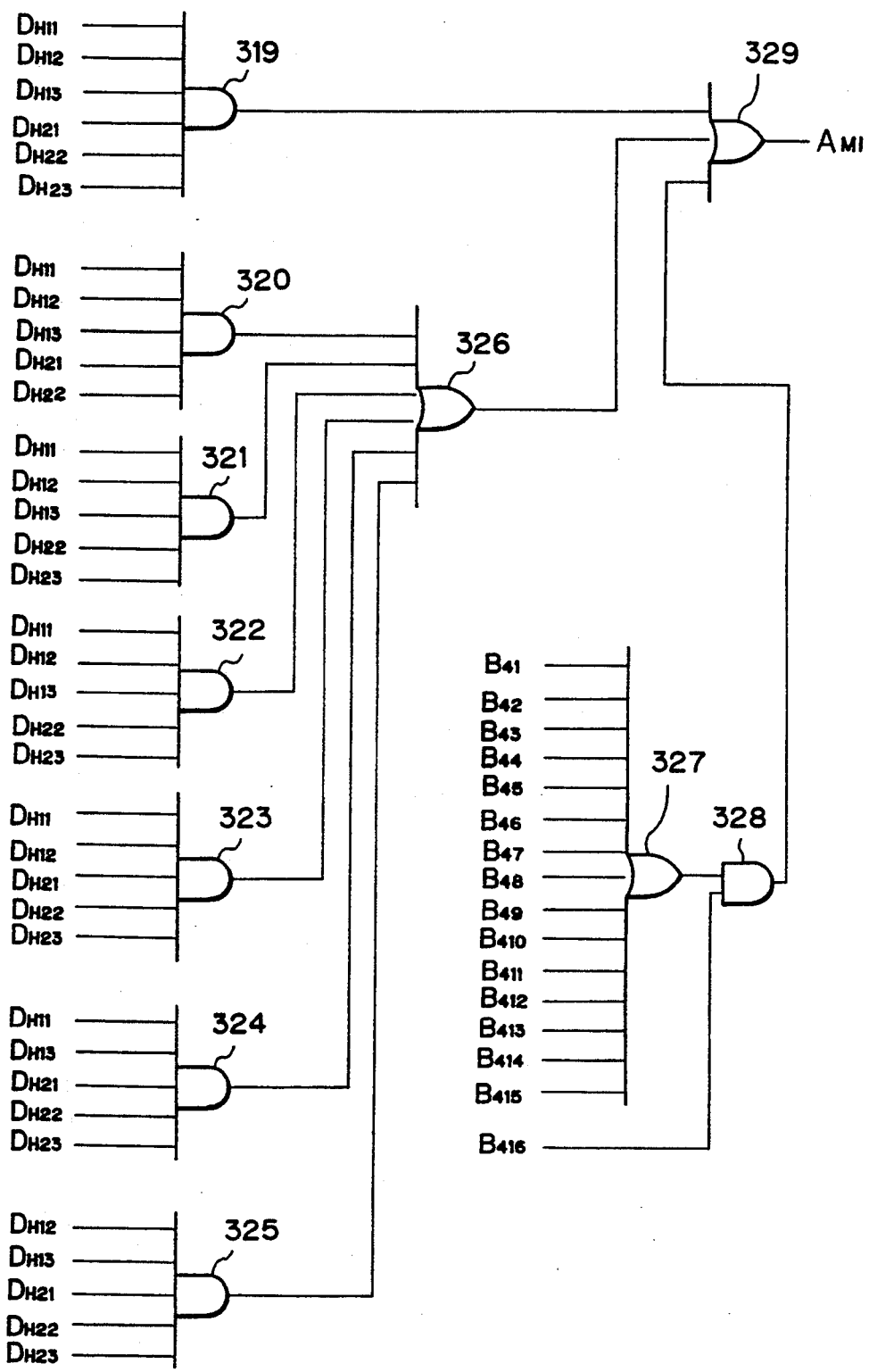

In FIG. 34, the multi-input AND gates 303–317 select all the possible combinations of the 2-dot dot information DH11–DH13 and DH21–DH23, four each, and show whether or not four 2-dot information are "H" (condition 1)). The outputs $B_{41}$–$B_{49}$ and the outputs $B_{410}$–$B_{415}$ are applied to the multi-input OR gate 327. In response, the OR gate 327 feeds to one input of the AND gate 328 information showing whether or not at last one of the inputs thereof is "H". The multi-input OR gate 318 feeds to the other input of the AND gate 328 information showing whether or not at least one of the inputs DH11–DG13 and DG21–DG23 is "H". Therefore, the AND gate 328 determines whether or not the condition 1) is satisfied.

The multi-input AND gates 320–325 selects all the possible combinations of the 2-dot dot information DH11–DH13 and DH21–DH23, five each, and deliver them to the multi-input OR gate 326. In response, the OR gate 326 feeds to the OR gate 329 whether or not all the 3-dot dot information DH11–DH13 and DH21–DH23 are "H". This is representative of the condition 2). The OR gate 329, therefore produces a signal AMI which is "H" if the conditions 1) and 2) are satisfied or "L" if otherwise.

FIG. 36 shows a circuit which determins, when the area shown in FIG. 37 is a dot area (signal AMI being "H"), that all the data (8 pixels × 8 lines) to represent a dot area. The operation of this circuit is demonstrated in FIG. 39.

Assume that image data DAT.IN appears as shown in FIG. 39 with the signals ⅛ CLK, ⅜ LGATE and LGATE serving as a reference. In the figure, DATn-1 is representative of the first image data on the "n" line after the positive-going edge of the signal LGATE and counted on an 8-pixel basis. There are also shown dot area information AMI (n-8) and AMI (n-16) associated with the "n-8" line and "n-16" line, respectively. The FIFO RAM 330 has a read/write CLK which is 1/9 CLK, a write reset signal which is ⅛LGATE, and a read reset signal which is LGATE. Hence, the FIFO RAM 330 sequentially reads out the dot area information written when the signal ⅛LGATE was "H" or reads out the dot area information written one line before when the signal LGATE turns to "H", in synchronism with the signal ⅛ CLK.

In FIG. 39, assume that AMIn is "H" when image data DATn-1 and DAT (n+1)-3 appear, and that AMI (n-8) and AMI (n-16) both aee "L" throughout the range of image data shown in FIG. 39. The FIFO RAM 330 produces on the output terminals $D_{out1}$ and $D_{out2}$ thereof signals which are "H" only in association with the image data DTn-1. The output of the OR gate 331 is applied to the shift register 332. The multi-input OR gate 333 ORs the output of the OR gate 331 and the outputs $Q_1$ and $Q_2$ (latched once and latched twice) of the shift register 332, thereby producing a signal B. This means that in an area where the image area DATn-1, DATn-2, DATn-3, DAT (n-8) -1, DAT (n-8) -2 and DAT (n-8) -3, "H" of the dot area information of the block DATn-1 is translated into "H" of the entire area.

With the illustrative embodiment, it is also possible to separate characters and halftone from each other. Specifically, an arrangement may be made such that image data is delayed in association with the delay ascribable to the FIFO RAM, multi-input D flip-flops used in the embodiment, and image data undergone character processing and image data undergone halftone processing are separated by a selector on the basis of the dot area information which serves as a control signal. The dot discrimination area shown in FIG. 37 may be changed in size in matching relation to the input and output characteristics of an apparatus as well as the characteristics of documents in such a manner as to reduce discrimination errors.

Referring to FIG. 45, another specific construction of the scanner is shown which is identical with the scanner of FIG. 3B except that it lacks the subscan magnification change 67. Why applying only the data changed in magnification in the vertical direction to the area discrimination 70 is advantageous will be described hereinafter.

Figure 46A:
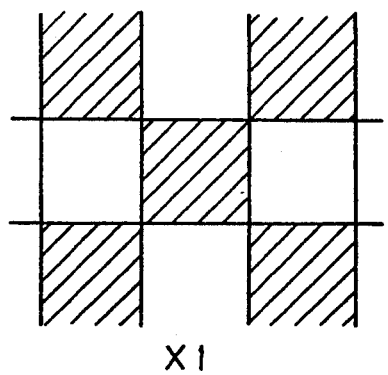
FIGS. 46A through 46J show models each representing a dot configuration associated with a particular magnification.
Figure 46B:
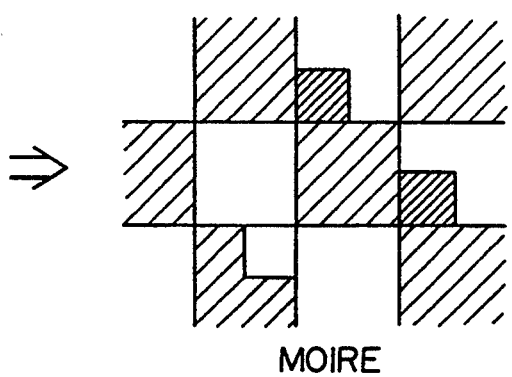
Figure 46C:
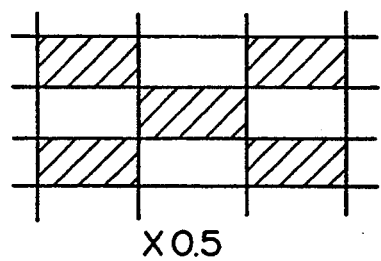
Figure 46D:
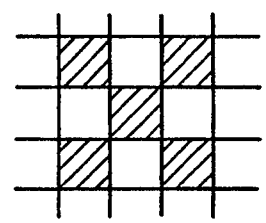
Figure 46E:
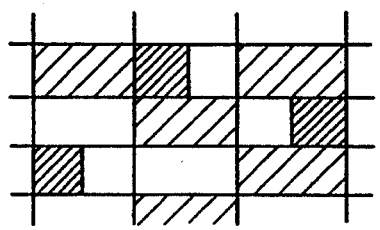
Figure 46F:
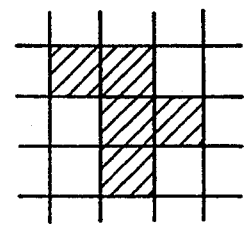
Figure 46G:
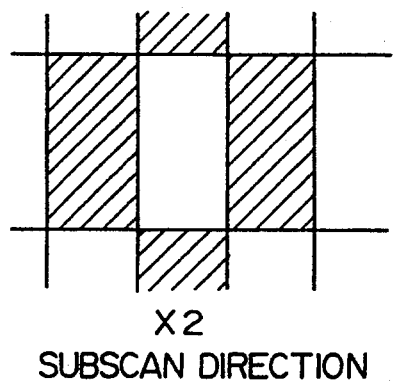
Figure 46H:
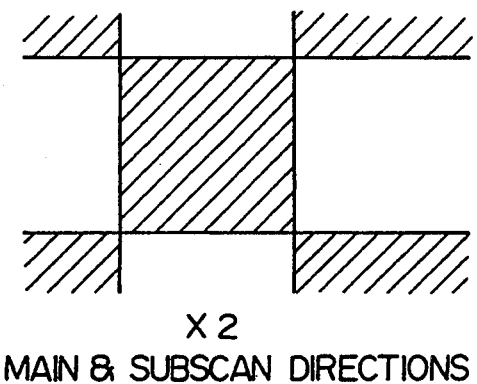
Figure 46I:
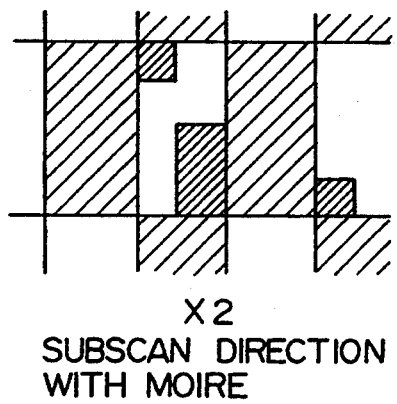
Figure 46J:
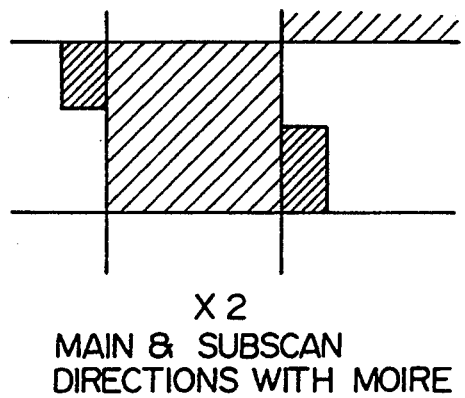

FIGS. 46A through 46J show models representative of dot configurations in relation to magnifications. Specifically, FIG. 46A shows dots in ×1 magnification while FIG. 46B shows ×1 magnification dots with moire. In FIG. 46A, dots are clearly resolved. In FIG. 46B, despite moire, the dots can be recognized. FIG. 46C shows dots which are reduced by 50% in the subscanning direction, and FIG. 46D show dots which are reduced by 50% in both of the main and subscanning directions. Assuming that moire has occurred, dots are resolved in the case of FIG. 46E but not resolve in the case of FIG. 46F. This stems from the fact that the input data are thinned in the main scanning direction, as stated earlier. Obviously, therefore, effecting pattern matching with only the data in the substanning direction is preferable when it comes to dot detection. FIGS. 46G to 46J show dot configurations reduced by 200% and in which the dots are successfully resolved with no regard to moire. It will be seen that a pattern enlarged in the subscanning direction needs a minimum area for pattern matching and, therefore, can be simplified in the circuit aspect. Hence, if only the data undergone magnification change in the subscanning direction is applied to the dot detection 70, the detection ratio will be increased and the circuitry will be simplified.

Figure 47:
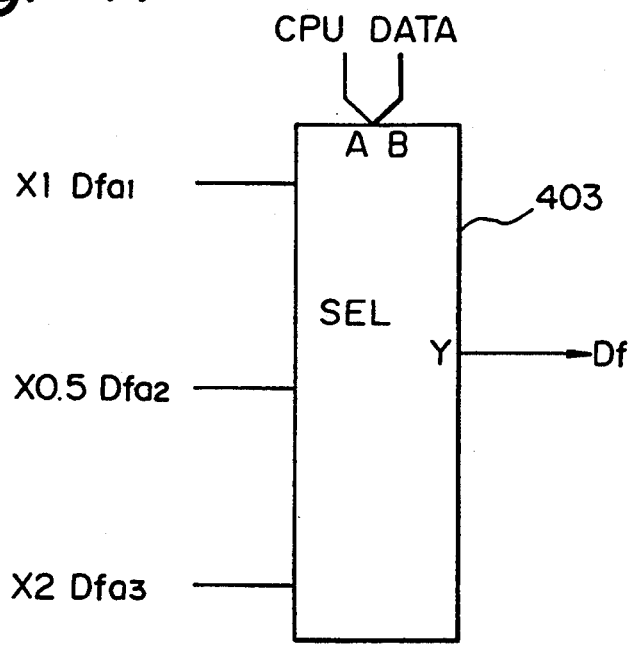
FIG. 47 shows the contents of inputs and output of a selector.
Figure 48:
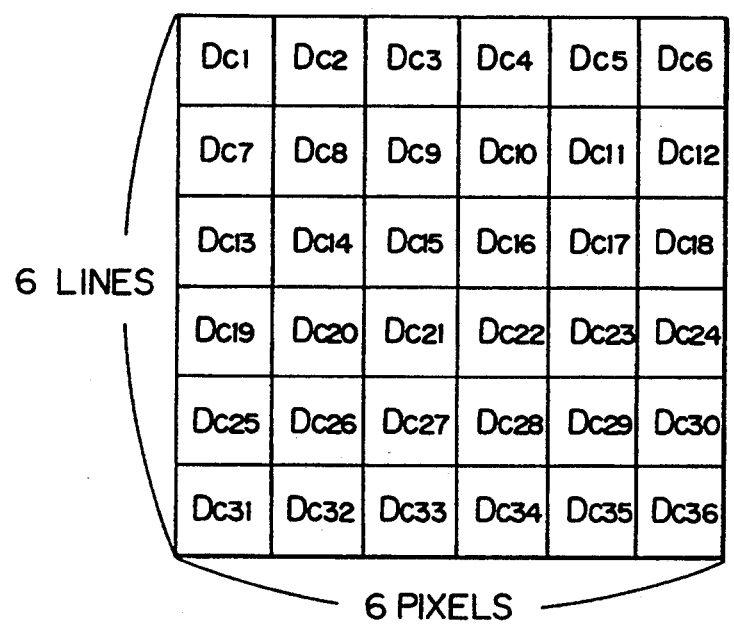
FIG. 48 shows image data produced by the X delay circuit.

Assume that the pixels associated with the area shown in FIG. 12 are replaced with pixes associated with an area shown in FIG. 48. This can be done if the Y delay circuit 71, FIG. 7B, is provided with an extra memory and if an extra flip-flop is incorporated to cope with the delay in the X direction. FIGS. 44A through 44C shows the pattern of FIG. 13C in some different magnifications. Specifically, FIG. 44A is identical with FIGS. 13C, 44B shows a pattern reduced by 50%, and FIG. 44C shows a pattern enlarged by 200%. These patterns will be readily understood from the description relating to FIGS. 46A through 46J. The white level detection and black level detection are executed in the previously stated manner. As shown in FIG. 47, ×1 data $D_{fa1}$, 50% reduced data $D_{fa2}$ and 200% enlarged data $D_{fa3}$ are outputted, as shown in FIGS. 17 through 20. The signals $D_{fa1}$, $D_{fa2}$ and $D_{fa3}$ are applied to a selector 403, FIG. 47. When the signals associated with the respective patterns are switched over on a magnification data key, a dot pattern matching adequate for a particular magnification is realized.

In summary, in accordance with the present invention, input image information for effecting dot pattern matching is implemented as MTF corrected image data. The input image data, therefore, corrects the decrease in the amplitude of dot density due to moire and thereby allows the cores of dots (record dots and non-record dots) to be detected with accuracy.

Further, in accordance with the present invention, image data changed in magnification in the vertical direction is subjected to reverse magnification to ×1 image data by subscan magnification changing means. The reverse-magnified image is compared with a dot area discrimination pattern in the bidimentional area. This is successful in promoting accurate identification of dot images without increasing the number of circuit components or elements.

Various modifications will become possible for those skilled in the art after receiving the teachings of the present disclosure without departing from the scope thereof.

What is claimed is:

1. A device for discriminating an image area, comprising:
   a) density difference detecting means for determining whether or not a difference between:
      (1) density data of a pixel of interest included in input image data and
      (2) density data of pixels surrounding said pixel of interest, is greater than a predetermined large value; and
   b) record dot and non-record dot detecting means including:
      A) means for comparing, by referencing an output signal of said density difference detecting means:
         (1) a bi-dimensional pattern of said input image data with
         (2) a record dot and non-record dot detection pattern; and
      B) means for producing a result of the comparison.

2. A device for discriminating an image area, comprising:

a) density detecting means for determining that, among pixels associated with a pixel of interest of input image data:
   (1) a pixel having a high density or
   (2) a pixel having a low density, is to be the pixel of interest;
b) density difference detecting means for determining whether or not a difference between:
   (1) density data output by said density detecting means and
   (2) density data of pixels which surround said pixel of data, is greater than a predetermined large value; and
c) record dot and non-record dot detecting means including:
   A) means for comparing, by referencing an output signal of said density difference detecting means:
      (1) a bi-dimensional pattern of said input image data with
      (2) a predetermined record dot and non-record dot detection pattern; and
   B) means for outputting a result of the comparison.

3. A device for discriminating an image area, comprising:
a) density difference detecting means for determining whether or not a difference between:
   (1) density data of a pixel of interest included in input image data and
   (2) density data of pixels surrounding said pixel of interest, is greater than a plurality of predetermined large values; and
b) a plurality of record dot and non-record dot detecting means including:
   A) means for comparing, by referencing an output signal of said density difference detecting means:
      (1) a bi-dimensional pattern of said input image data with
      (2) a plurality of record dot and non-record dot detection patterns;
wherein each of the patterns is associated with a respective one of said plurality of predetermined values.

4. A device for discriminating an image area, comprising:
a) averaging means for averaging input image density data in a first bi-dimensional arrangement;
b) selecting means for selecting a plurality of predetermined large values in response to an output of said averaging means;
c) density difference detecting means for determining whether or not a difference between:
   (1) density data of a pixel of interest included in input image data and
   (2) density data of pixels surrounding said pixel of interest, is greater than said predetermined large values selected by said selecting means; and
d) record dot and non-record dot detecting means including:
   A) means for comparing:
      (1) an output signal of said density difference detecting means with
      (2) a predetermined record dot and non-record dot detection pattern; and
   B) means for outputting a result of the comparison.

* * * * *